US012609370B2

(12) United States Patent
Futamura et al.

(10) Patent No.: US 12,609,370 B2
(45) Date of Patent: Apr. 21, 2026

(54) TEMPERATURE ESTIMATION DEVICE, TEMPERATURE ESTIMATION METHOD, PROGRAM, AND STORAGE MEDIUM

(71) Applicant: HONDA MOTOR CO., LTD., Tokyo (JP)

(72) Inventors: Yuichi Futamura, Wako (JP); Takahito Fujita, Wako (JP); Takashi Iwasa, Wako (JP); Takao Sato, Wako (JP); Shinya Agatsuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 536 days.

(21) Appl. No.: 18/036,905

(22) PCT Filed: Nov. 19, 2021

(86) PCT No.: PCT/JP2021/042689
§ 371 (c)(1),
(2) Date: May 15, 2023

(87) PCT Pub. No.: WO2022/107895
PCT Pub. Date: May 27, 2022

(65) Prior Publication Data
US 2023/0420758 A1 Dec. 28, 2023

(30) Foreign Application Priority Data

| | | |
|---|---|---|
| Nov. 19, 2020 | (JP) | 2020-192781 |
| Aug. 23, 2021 | (JP) | 2021-135665 |
| Sep. 1, 2021 | (JP) | 2021-142576 |

(51) Int. Cl.
*H01M 10/633* (2014.01)
*B60L 53/302* (2019.01)
(Continued)

(52) U.S. Cl.
CPC ......... *H01M 10/633* (2015.04); *B60L 53/302* (2019.02); *B60L 53/80* (2019.02);
(Continued)

(58) Field of Classification Search
CPC ............. H01M 10/633; H01M 10/486; H01M 10/613; H01M 10/625; H01M 10/6556;
(Continued)

(56) References Cited

U.S. PATENT DOCUMENTS

| | | |
|---|---|---|
| 6,498,457 B1 | 12/2002 | Tsuboi |
| 2006/0172188 A1 | 8/2006 | Okuda et al. |

(Continued)

FOREIGN PATENT DOCUMENTS

| | | |
|---|---|---|
| JP | 11-098613 | 4/1999 |
| JP | 2000-341868 | 12/2000 |

(Continued)

OTHER PUBLICATIONS

International Search Report and Written Opinion for International Application No. PCT/JP2021/042689 mailed on Jan. 25, 2022, 8 pages.

(Continued)

*Primary Examiner* — Mohammad Ali
*Assistant Examiner* — Sheela Rao
(74) *Attorney, Agent, or Firm* — Amin, Turocy & Watson, LLP

(57) ABSTRACT

A temperature of a power device to which a power storage device is attached is estimated on the basis of a temperature detected by a temperature detector provided in a power storage device detachably held in the power device.

18 Claims, 34 Drawing Sheets

(51) Int. Cl.

| | |
|---|---|
| *B60L 53/80* | (2019.01) |
| *B60S 5/06* | (2019.01) |
| *G05B 13/02* | (2006.01) |
| *H01M 10/48* | (2006.01) |
| *H01M 10/613* | (2014.01) |
| *H01M 10/625* | (2014.01) |
| *H01M 10/6556* | (2014.01) |
| *H01M 10/6563* | (2014.01) |
| *H01M 10/6568* | (2014.01) |
| *H02J 7/00* | (2006.01) |

(52) U.S. Cl.
CPC ............ *B60S 5/06* (2013.01); *G05B 13/0265* (2013.01); *H01M 10/486* (2013.01); *H01M 10/613* (2015.04); *H01M 10/625* (2015.04); *H01M 10/6556* (2015.04); *H01M 10/6563* (2015.04); *H01M 10/6568* (2015.04); *H02J 7/007194* (2020.01); *H01M 2220/20* (2013.01)

(58) Field of Classification Search
CPC ......... H01M 10/6563; H01M 10/6568; H01M 2220/20; H01M 10/425; H01M 10/42; H01M 10/615; H01M 10/48; H01M 10/6571; H01M 50/20; B60L 53/302; B60L 53/80; B60S 5/06; G05B 13/0265; H02J 7/007194; Y02E 60/10
See application file for complete search history.

(56) References Cited

U.S. PATENT DOCUMENTS

| | | |
|---|---|---|
| 2019/0195961 A1 | 6/2019 | Komiyama |
| 2019/0202416 A1 | 7/2019 | Lai et al. |
| 2020/0067148 A1 | 2/2020 | Kim et al. |
| 2020/0072105 A1 | 3/2020 | Korenaga |

FOREIGN PATENT DOCUMENTS

| | | | | |
|---|---|---|---|---|
| JP | 2003185504 A | * | 7/2003 | |
| JP | 2005-265825 | | 9/2005 | |
| JP | 2006-210190 | | 8/2006 | |
| JP | 2010-029012 | | 2/2010 | |
| JP | 2015-211529 | | 11/2015 | |
| JP | 2017-038437 | | 2/2017 | |
| JP | 2019-135696 | | 8/2019 | |
| JP | 2019-164989 | | 9/2019 | |
| JP | 2020-510280 | | 4/2020 | |
| WO | WO-2019142550 A1 | * | 7/2019 | ........... H01M 10/48 |

OTHER PUBLICATIONS

International Search Report for International Application No. PCT/JP2021/042692 mailed on Dec. 21, 2021, 4 pages.
Japanese Notice of Allowance for Japanese Patent Application No. 2022-516326 mailed Aug. 30, 2022.
Non-Final Office Action for U.S. Appl. No. 18/037,329 mailed Jul. 15, 2025.

* cited by examiner

FIG. 12

<I22 RELATIONSHIP INFORMATION>

| NUMBER OF BATTERIES IN SIMULTANEOUS OPERATION STATE | SIMULTANEOUS OPERATION TIME | STATISTICAL VALUE OF TEMPERATURE OF DETACHABLE BATTERY | TEMPERATURE INSIDE OF BATTERY REPLACEMENT DEVICE |
|---|---|---|---|
| 1 | ... | ... | ... |
|  | ... | ... | ... |
|  | ... | ... | ... |
|  | ... | ... | ... |
| 2 | ... | ... | ... |
|  | ... | ... | ... |
|  | ... | ... | ... |
|  | ... | ... | ... |
| 3 | ... | ... | ... |
|  | ... | ... | ... |
|  | ... | ... | ... |

| NUMBER OF BATTERIES OF SIMULTANEOUS CHARGING | MAXIMUM VALUE [°C] OF COMPONENT TEMPERATURE AT NORMAL TIMES | | | THRESHOLD VALUE [°C] FOR DETERIORATION DETERMINATION (DIFFERENCE BETWEEN MAXIMUM VALUES OF COMPONENT TEMPERATURES AT NORMAL TIMES) |
|---|---|---|---|---|
| | WHEN AIR TEMPERATURE IS Ta1 | WHEN AIR TEMPERATURE IS Ta2 | WHEN AIR TEMPERATURE IS Ta3 | |
| 1 | $Tc11_{max}$ | $Tc12_{max}$ | $Tc13_{max}$ | Tth1 |
| 2 | $Tc21_{max}$ | $Tc22_{max}$ | $Tc23_{max}$ | Tth2 |
| 3 | $Tc31_{max}$ | $Tc32_{max}$ | . . . | Tth3 |
| 4 | $Tc41_{max}$ | . . . | . . . | . . . |
| 5 | . . . | . . . | . . . | . . . |
| 6 | . . . | . . . | . . . | . . . |
| 7 | . . . | . . . | . . . | . . . |
| 8 | $Tc81_{max}$ | $Tc82_{max}$ | $Tc83_{max}$ | Tth8 |

| NUMBER OF BATTERIES OF SIMULTANEOUS CHARGING | THRESHOLD VALUE [°C] FOR DETERIORATION DETERMINATION | | |
|---|---|---|---|
| | WHEN AIR TEMPERATURE IS Ta1 | WHEN AIR TEMPERATURE IS Ta2 | WHEN AIR TEMPERATURE IS Ta3 |
| 1 | Tth11 | Tth12 | Tth13 |
| 2 | Tth21 | Tth22 | ・・・ |
| 3 | Tth31 | ・・・ | ・・・ |
| 4 | ・・・ | ・・・ | ・・・ |
| 5 | ・・・ | ・・・ | ・・・ |
| 6 | ・・・ | ・・・ | ・・・ |
| 7 | ・・・ | ・・・ | ・・・ |
| 8 | Tth81 | Tth82 | Tth83 |

| DIFFERENCE BETWEEN MAXIMUM VALUES OF COMPONENT TEMPERATURES (TEMPERATURE DIFFERENCE $\Delta T$) | DETERIORATION DEGREE |
|---|---|
| $\Delta T1$ | 2 |
| $\Delta T2$ | 4 |
| $\Delta T3$ | 6 |
| $\Delta T4$ | 8 |
| $\Delta T5$ | 10 |

| NUMBER OF BATTERIES OF SIMULTANEOUS CHARGING | MAXIMUM VALUE [°C] OF COMPONENT TEMPERATURE | THRESHOLD VALUE [°C] FOR DETERIORATION DETERMINATION (DIFFERENCE BETWEEN MAXIMUM VALUES OF COMPONENT TEMPERATURES) |
|---|---|---|
| 1 | $Tc1_{max}$ | $Tth1'$ |
| 2 | $Tc2_{max}$ | $Tth2'$ |
| 3 | $Tc3_{max}$ | $Tth3'$ |
| 4 | ... | ... |
| 5 | ... | ... |
| 6 | ... | ... |
| 7 | ... | ... |
| 8 | $Tc8_{max}$ | $Tth8'$ |

TEMPERATURE ESTIMATION DEVICE, TEMPERATURE ESTIMATION METHOD, PROGRAM, AND STORAGE MEDIUM

TECHNICAL FIELD

The present invention relates to a temperature estimation device, a temperature estimation method, a program, and a storage medium.

Priority is claimed on Japanese Patent Application No. 2020-192781, filed Nov. 19, 2020, Japanese Patent Application No. 2021-135665, filed Aug. 23, 2021, and Japanese Patent Application No. 2021-142576, filed Sep. 1, 2021, the content of which is incorporated herein by reference.

BACKGROUND ART

In recent years, the development of electrically powered vehicles such as electric vehicles (EVs) and hybrid electric vehicles (HEVs) that are driven by an electric motor for running with electric power supplied from a battery (a power storage device) has progressed. Furthermore, a battery rental device for renting a battery for an electric vehicle like those described above has been proposed (for example, Patent Document 1).

CITATION LIST

Patent Document

[Patent Document 1]
Japanese Unexamined Patent Application, First Publication No. H11-98613

SUMMARY OF INVENTION

Technical Problem

Meanwhile, in the above-described battery rental device, it is necessary to manage a temperature because a plurality of batteries are stored internally. In such a device for storing a battery, technology for appropriately managing a temperature of the device is required.

An objective of an aspect of the present invention is to provide a temperature estimation device, a temperature estimation method, a program, and a storage medium capable of appropriately managing a temperature in a device storing a battery.

Solution to Problem

A temperature estimation device, a temperature estimation method, a program, and a storage medium according to the present invention adopt the following configurations.

(1): According to an aspect of the present invention, there is provided a temperature estimation device including: an estimator configured to estimate a temperature of a power device to which a power storage device is attached on the basis of a power storage device temperature that is a temperature detected by a temperature detector provided in the power storage device detachably held in the power device.

(2): In the above-described aspect (1), the power device includes a housing having an accommodation unit configured to accommodate at least a part of the power storage device, and the estimator estimates an internal temperature inside of the housing on the basis of the power storage device temperature detected by the temperature detector.

(3): In the above-described aspect (2), the housing includes a plurality of accommodation units configured to respectively accommodate power storage devices, and the estimator estimates the internal temperature on the basis of the temperature detected by the temperature detector provided in the power storage device that is electrically operating among the power storage devices accommodated in the plurality of accommodation units.

(4): In the above-described aspect (3), when a plurality of power storage devices that are electrically operating are present, the estimator estimates the internal temperature on the basis of a plurality of power storage device temperatures detected by temperature detectors provided in the plurality of power storage devices.

(5): In the above-described aspect (4), the estimator estimates the internal temperature on the basis of an average value of the plurality of power storage device temperatures.

(6): In the above-described aspect (4), the estimator estimates the internal temperature on the basis of a highest power storage device temperature among the plurality of power storage device temperatures.

(7): In any one of the above-described aspects (2) to (6), the power device further includes an operation unit electrically connected to the power storage device, and the estimator estimates the internal temperature on the basis of the power storage device temperature detected by the temperature detector when the power storage device is in a charging/discharging state in which the power storage device is discharged with respect to the operation unit or charged by the operation unit.

(8): In any one of the above-described aspects (2) to (7), the estimator estimates a temperature of air inside of the housing within the internal temperature inside of the housing.

(9): In any one of the above-described aspects (1) to (7), the power device includes a housing having an accommodation unit configured to accommodate at least a part of the power storage device, and the estimator estimates an external temperature outside of the housing on the basis of the power storage device temperature detected by the temperature detector.

(10): In the above-described aspect (9), the housing includes a plurality of accommodation units configured to respectively accommodate power storage devices, and the estimator estimates the external temperature on the basis of the power storage device temperature detected by the temperature detector provided in the power storage device that is not electrically operating among the power storage devices accommodated in the plurality of accommodation units.

(11): In the above-described aspect (10), the estimator estimates the external temperature on the basis of the power storage device temperature detected by the temperature detector provided in the power storage device in which a prescribed period of time has elapsed from a previous operation end time point among power storage devices that are not electrically operating.

(12): In the above-described aspect (10) or (11), when there is no power storage device that is not electrically operating the estimator estimates the external temperature on the basis of the power storage device temperature detected by the temperature detector provided in the power storage device having a smallest total operation amount within a prescribed period in a past among the power storage devices that are electrically operating.

(13): In the above-described aspect (2), the estimator further estimates an external temperature outside of the housing of the power device on the basis of the power storage device temperature detected by the temperature detector, and the power device further includes a countermeasure unit configured to determine an abnormal change in the power device or cope with an abnormal change in the power device on the basis of the internal temperature and the external temperature estimated by the estimator.

(14): In any one of the above-described aspects (2) to (13), the temperature detector is disposed inside of the power storage device so that the temperature detector is located further inward than an outer edge of the housing in a state in which the power storage device is accommodated in the accommodation unit.

(15): In the above-described aspect (2), the housing includes a connected path configured to connect an inside and an outside of the housing, and the estimator determines that an abnormal change has occurred in the connected path, provides a notification indicating that the abnormal change has occurred in the connected path, or suppresses an operating state of the power device when the internal temperature is greater than or equal to a prescribed temperature or when a difference between the internal temperature and a reference temperature is greater than or equal to a prescribed value.

(16): In the above-described aspect (15), the connected path includes a purification device inside of the housing, and the estimator determines that an abnormal change has occurred in the purification device, provides a notification indicating that the abnormal change has occurred in the purification device, or suppresses an operating state of the power device when the internal temperature is greater than or equal to the prescribed temperature or when the difference between the internal temperature and the reference temperature is greater than or equal to the prescribed value.

(17): In the above-described aspect (15) or (16), the estimator estimates the internal temperature on the basis of a temperature detected by the temperature detector provided in the power storage device that is electrically operating.

(18): According to another aspect of the present invention, there is provided a temperature estimation method including steps of: acquiring a power storage device temperature that is a temperature detected by a temperature detector provided in a power storage device detachably held in a power device; and estimating a temperature of the power device to which the power storage device is attached on the basis of the power storage device temperature.

(19): According to yet another aspect of the present invention, there is provided a program for causing a computer to execute the temperature estimation method according to the above-described aspect (18).

(20): According to yet another aspect of the present invention, there is provided a storage medium storing the program according to the above-described aspect (19).

Advantageous Effects of Invention

According to the aspects (1) to (20), it is possible to appropriately manage a temperature in a device storing a battery.

BRIEF DESCRIPTION OF DRAWINGS

FIG. 12 is a diagram showing an example of relationship information of the present embodiment.

5

6

Figure 25:
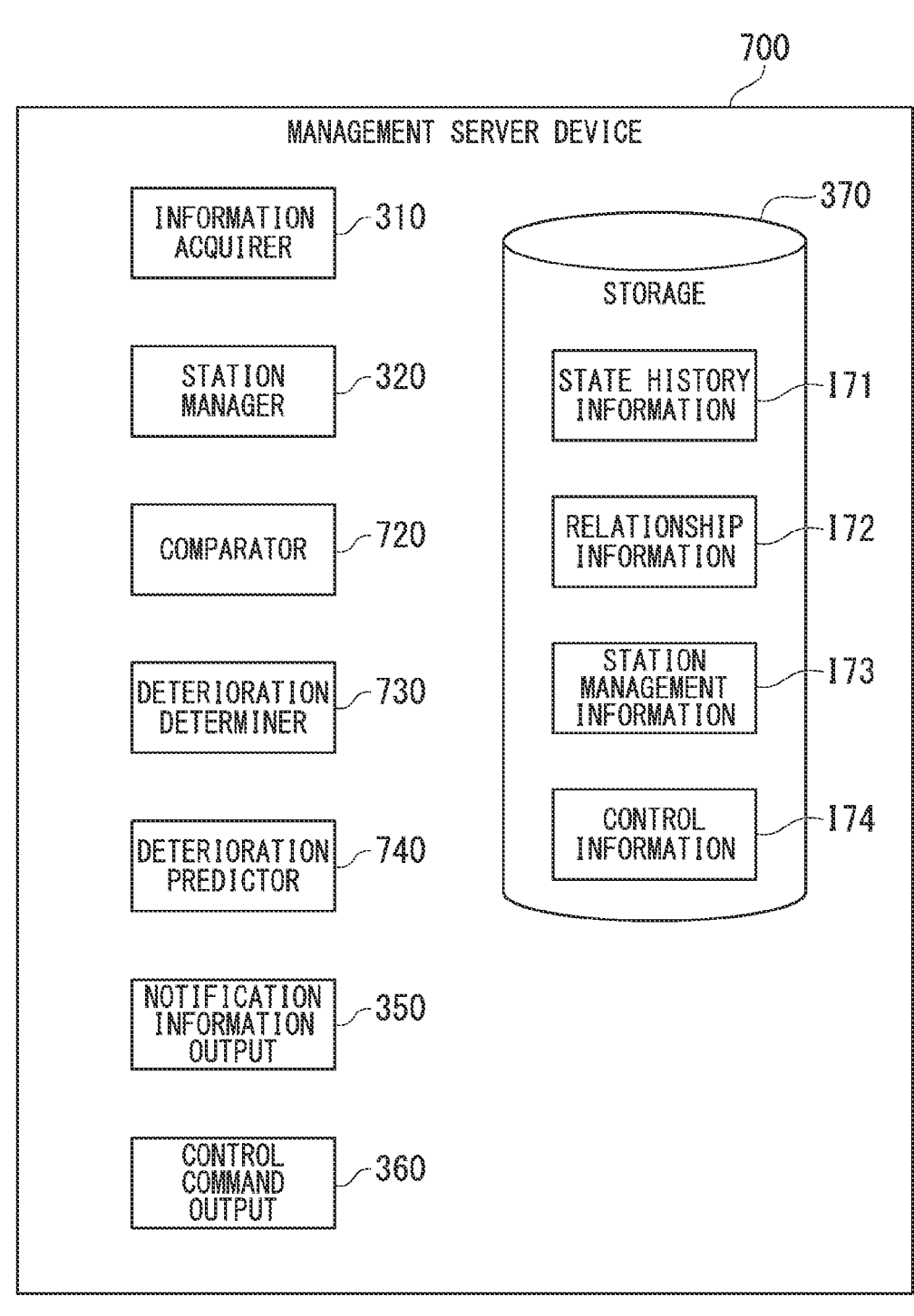

FIG. 25 is a block diagram showing an example of a system configuration of a management server device 300 of the fourth embodiment.

Figure 26:
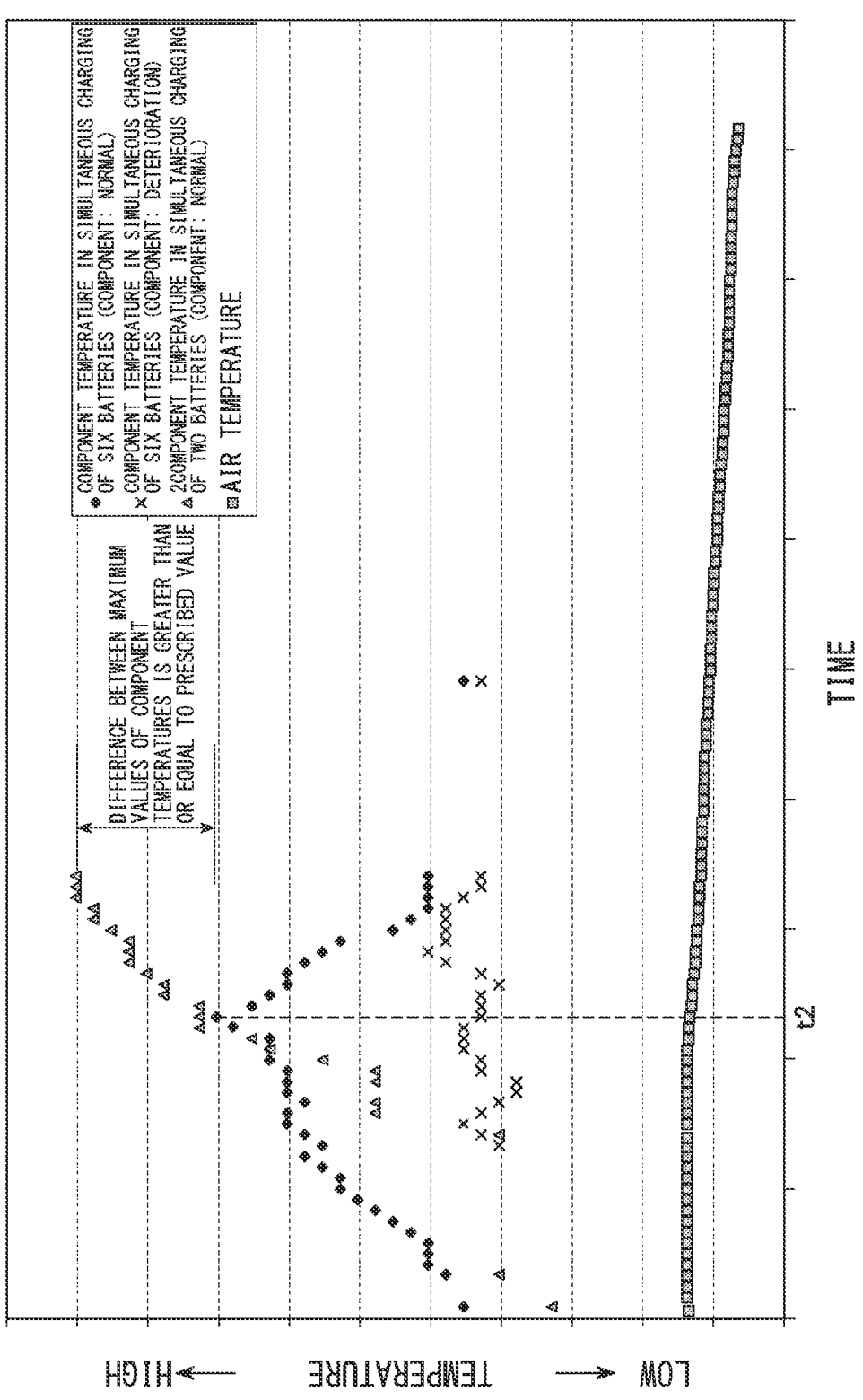

FIG. 26 is a diagram for describing a determination process of a deterioration determiner 730 of the fourth embodiment.

FIG. 27 is a diagram showing an example of relationship information I72.

FIG. 28 is a diagram showing an example of relationship information I72A.

Figure 29:
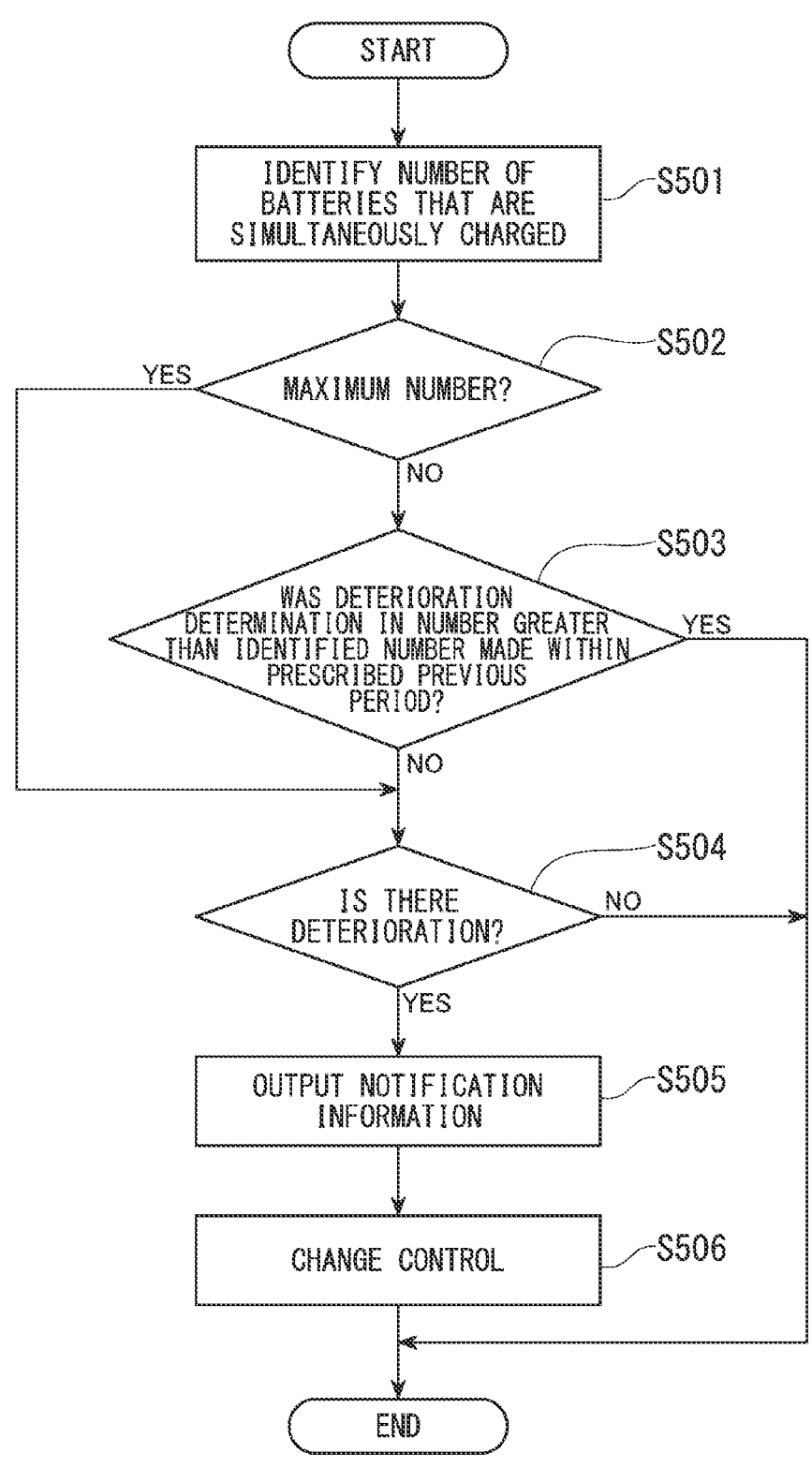

FIG. 29 is a flowchart showing an example of a processing flow related to deterioration determination of the fourth embodiment.

Figure 30:
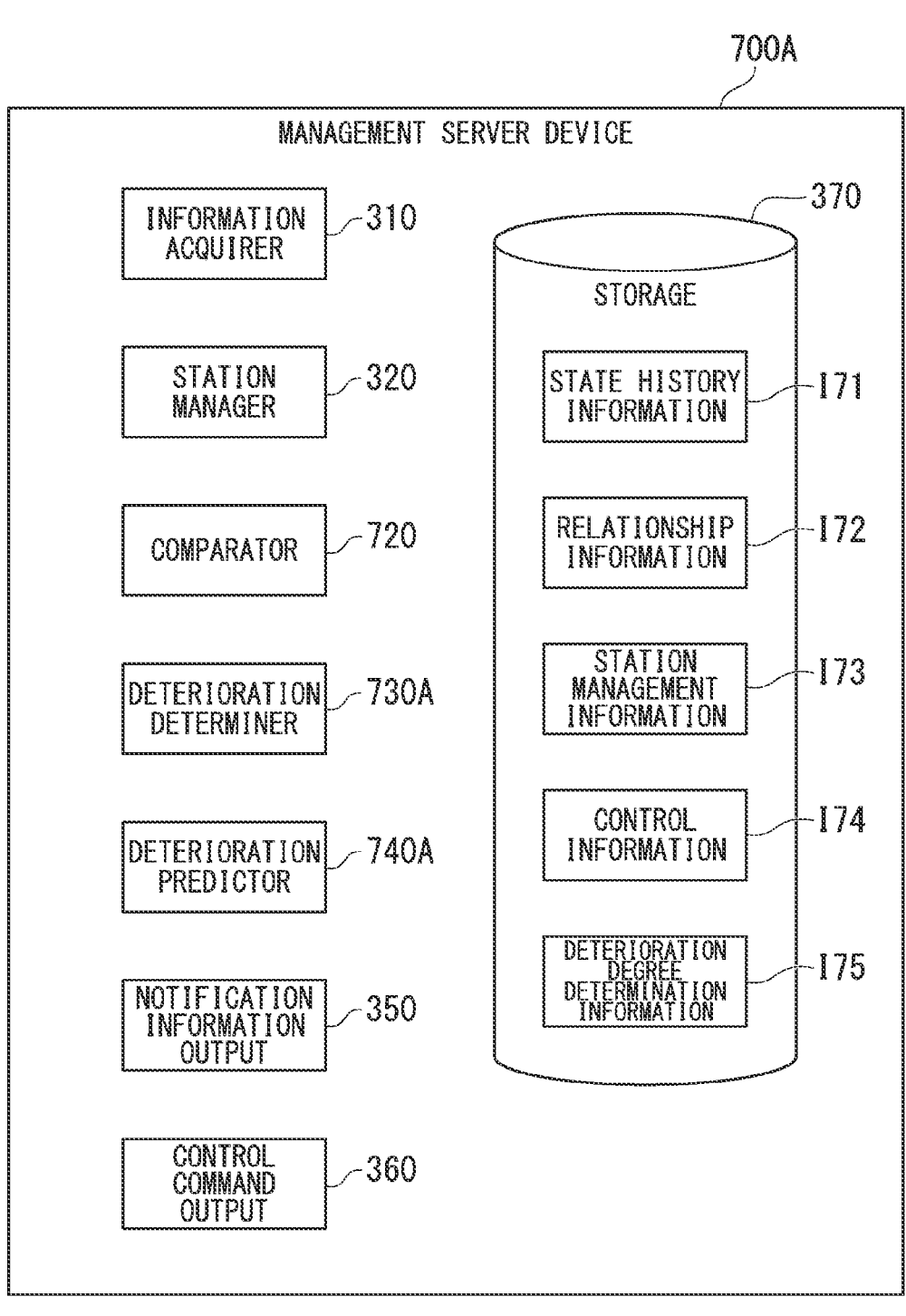

FIG. 30 is a block diagram showing an example of a system configuration of a management server device 700A of a fifth embodiment.

FIG. 31 is a diagram showing an example of deterioration degree determination information I75.

Figure 32:
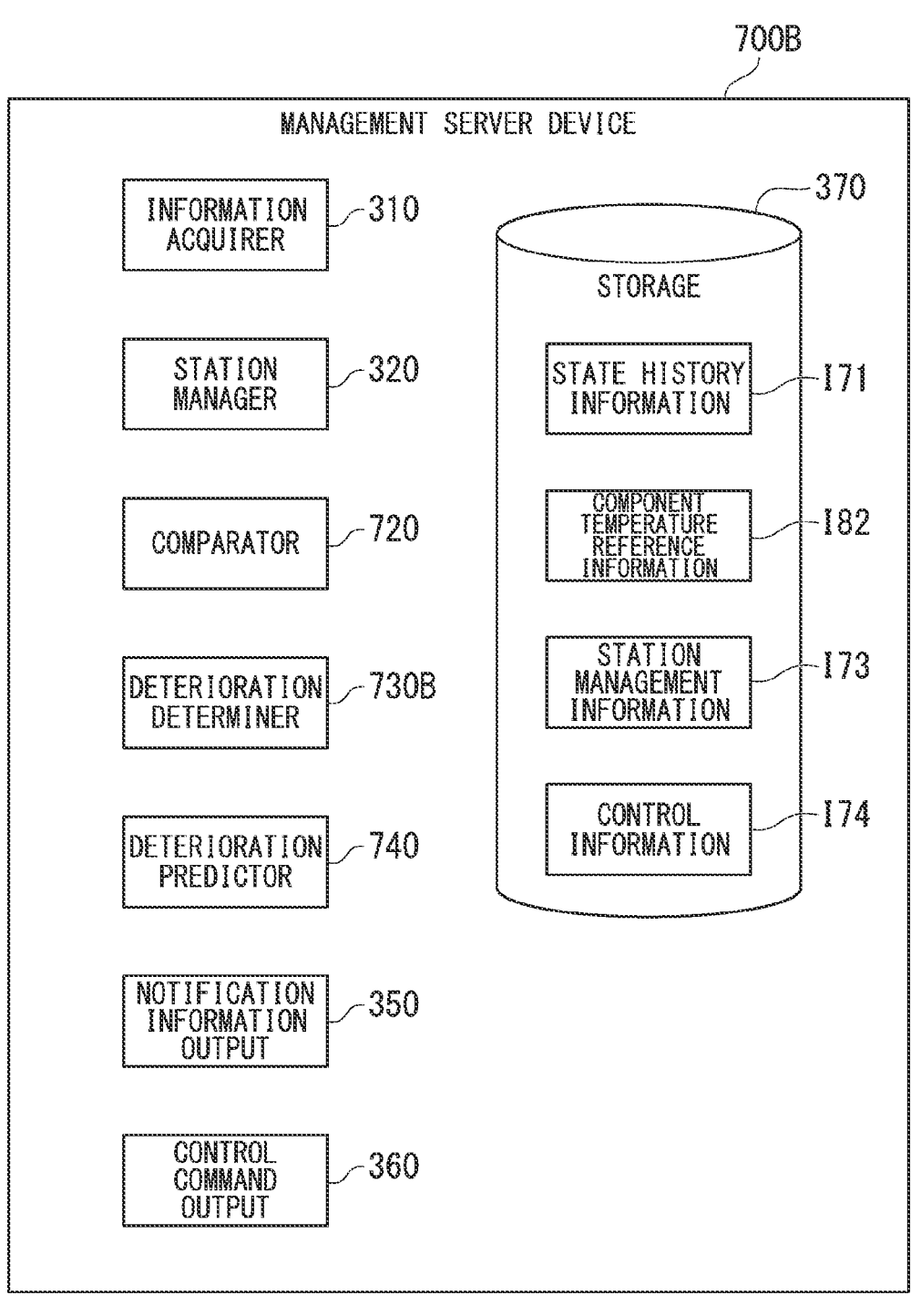

FIG. 32 is a block diagram showing an example of a system configuration of a management server device 700B of a sixth embodiment.

FIG. 33 is a diagram showing an example of component temperature reference information I82.

Figure 34:
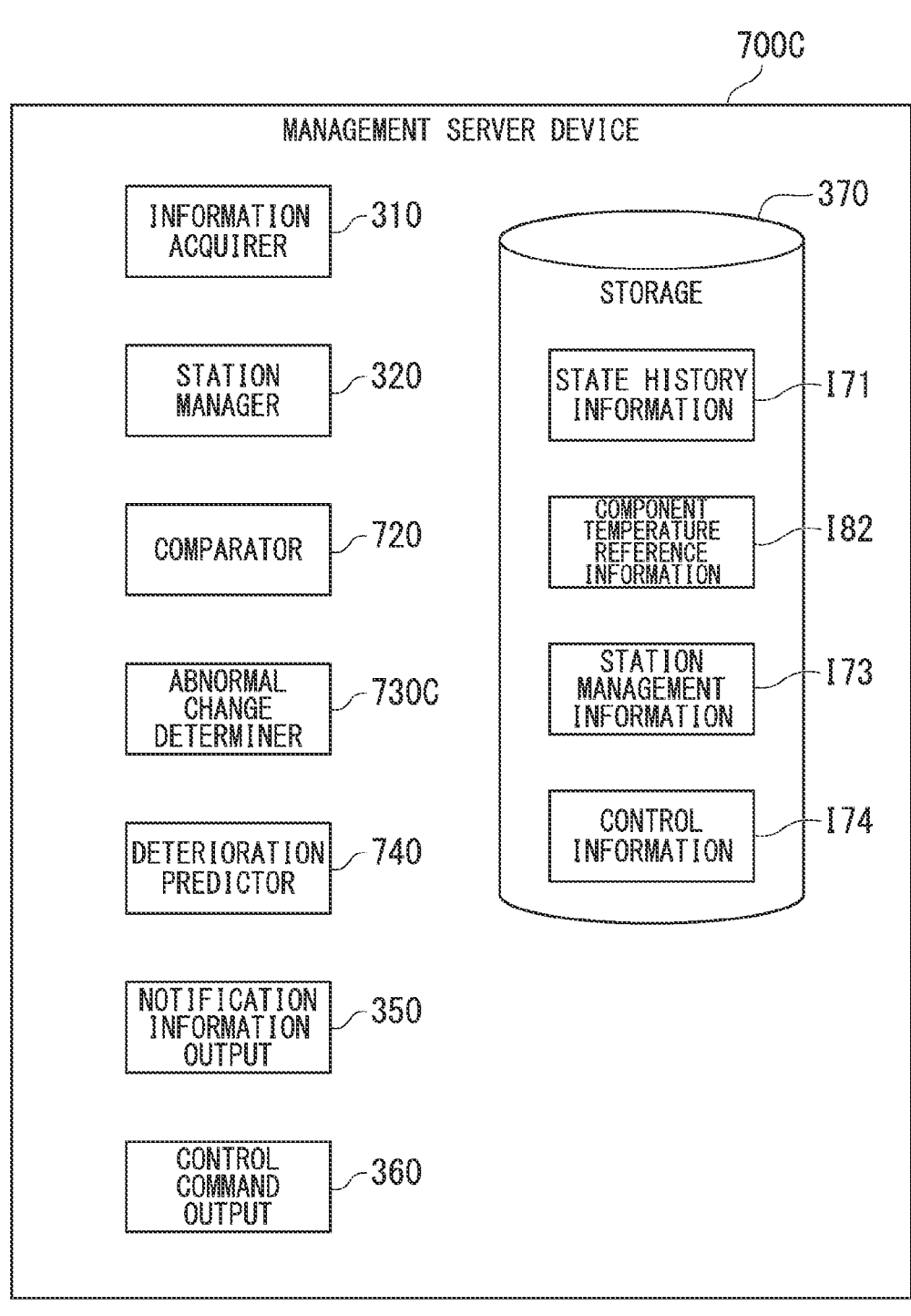

FIG. 34 is a block diagram showing a system configuration of a management server device 700C of a seventh embodiment.

Figure 35:
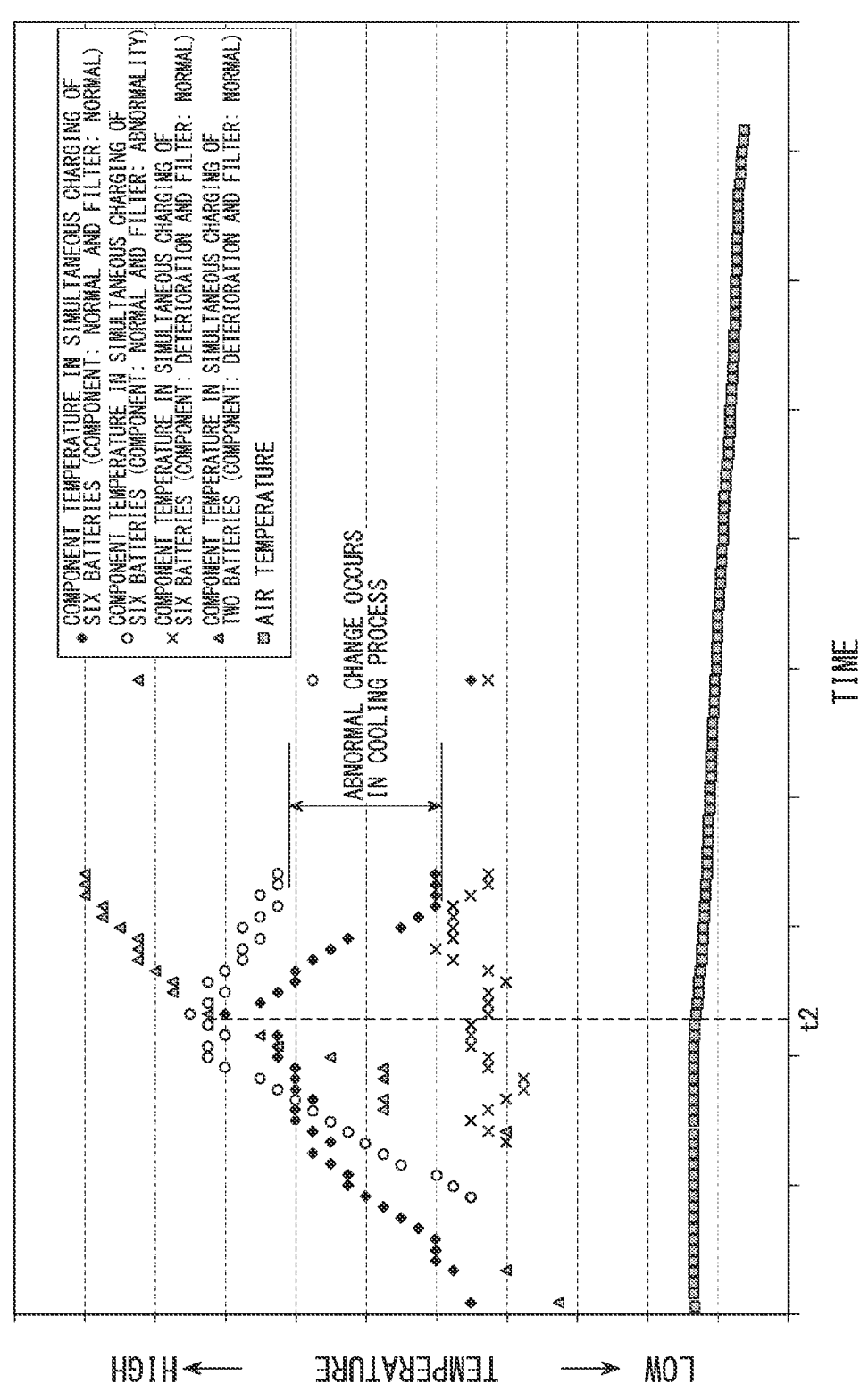

FIG. 35 is a diagram for describing a determination process of an abnormal change determiner 730C of the seventh embodiment.

DESCRIPTION OF EMBODIMENTS

Hereinafter, embodiments of a temperature estimation device, a temperature estimation method, an information processing device, an information processing method, a program, and a storage medium of the present invention will be described with reference to the drawings. In the following description, components having the same or similar functions are denoted by the same reference signs and redundant description of these components may be omitted.

In the following description, a case where the information processing device of the embodiment is applied to a system of a battery sharing service (a battery sharing service system) in which a battery (hereinafter referred to as a detachable battery) that is a power storage device detachably mounted in (or detachably attached to) the electric vehicle is shared will be described. Furthermore, the information processing device of the embodiment is an example applied to a management server device that manages a battery replacement station that receives a detachable battery and provides an alternative detachable battery in the battery sharing service system. However, a part or all of the information processing device of the embodiment may be provided as a part of the battery replacement station instead of the management server device.

In the following description, electric vehicles can include various vehicles that travel using electric power of a detachable battery such as a saddle-riding type electric vehicle (hereinafter referred to as a "two-wheeled electric vehicle") and a four-wheeled electric vehicle (hereinafter referred to as an "electric vehicle"). For example, electric vehicles include three-wheeled vehicles (including vehicles with two front wheels and one rear wheel in addition to vehicles with one front wheel and two rear wheels) as well as two-wheeled vehicles and four-wheeled vehicles and general vehicle-type moving objects that travel using an electric motor driven by electric power supplied from a detachable battery such as an assisted bicycle. However, instead of these vehicle-type moving objects, moving robots, autonomous traveling devices, autonomous traveling vehicles, other electric vehicles, drone flying objects, or other electric moving devices (electric mobilities) may be moving objects to which the information processing device of the embodiment can be applied.

First Embodiment

[1. Overall Configuration]

Figure 1:
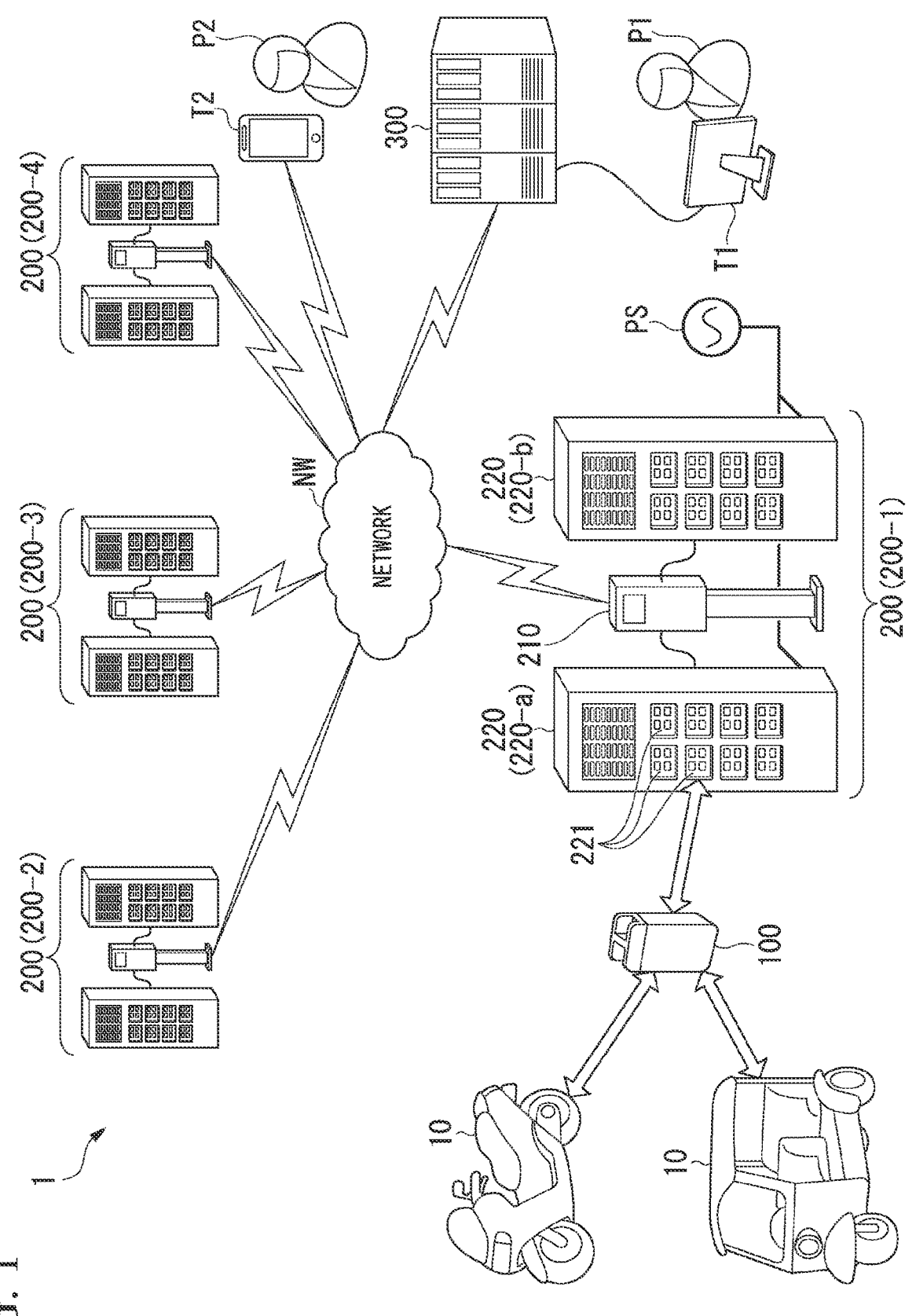
FIG. 1 is a diagram showing an example of a battery sharing service system of the present embodiment.

FIG. 1 is a diagram showing an example of a battery sharing service system 1 of the first embodiment. The battery sharing service system 1 includes one or more (e.g., a plurality of) battery replacement stations 200 (four battery replacement stations 200-1 to 200-4 are illustrated in FIG. 1) and a management server device 300. The battery sharing service system 1 is an example of an "information processing system" or a "power storage device management system."

The battery replacement station 200 includes, for example, a station control device 210 and one or more battery replacement devices 220 (two battery replacement devices 220-*a* and 220-*b* are illustrated in FIG. 1). The station control device 210 and the battery replacement device 220 can perform wired or wireless communication. The station control device 210 and the battery replacement device 220 may be integrally configured as a single device instead of separate devices. The battery replacement device 220 is an example of a "power device" and an example of a "charging device."

The station control device 210 manages the charging and discharging of the detachable battery 100 in the battery replacement device 220 and the reception and provision of the detachable battery 100 (hereinafter referred to as "replacement of the detachable battery 100"). The station control device 210 provides information for replacing the detachable battery 100 to the user when the user of the electric vehicle 10 uses the battery replacement station 200. For example, the station control device 210 provides the user with information indicating a battery slot 221 that receives a detachable battery 100 having a low battery level used in the electric vehicle 10, information indicating a battery slot 221 where another detachable battery 100 provided instead of the received detachable battery 100 is accommodated, and the like. In the battery slot 221, at least a part of the detachable battery 100 is accommodated. The battery slot 221 is an example of an "accommodation unit."

The battery replacement device 220 stores the detachable battery 100 by accommodating the detachable battery 100 in the battery slot 221. The detachable battery 100 is an example of a storage target. The storage target may be something other than the detachable battery 100 in accordance with the type of power device.

The battery replacement device 220 is a device for charging, discharging, and replacing the detachable battery 100. The battery replacement device 220 has one or more (e.g., a plurality of) battery slots 221. The battery slot 221 is an accommodation unit in which the detachable battery 100 can be accommodated, charged, and discharged. The battery slot 221 detachably holds a power storage 120 of the detachable battery 100. The battery slot 221 is an example of a "holding unit." In the example shown in FIG. 1, one battery replacement device 220 has eight battery slots 221 and can simultaneously accommodate eight detachable batteries 100.

The battery replacement device 220 can simultaneously charge a plurality of detachable batteries 100 (up to eight detachable batteries 100 in the example shown in FIG. 1) accommodated in a plurality of battery slots 221. In the present specification, "simultaneously charging" or "simultaneous charging" is not limited to the case where charging of a plurality of detachable batteries 100 is started simultaneously and includes a case where a part of a period of charging time of one detachable battery 100 and a part of a period of charging time of another detachable battery 100 are simultaneous and the like.

Electric power is supplied from an external power supply PS to the battery replacement device 220. The external power supply PS is, for example, a commercial power supply of AC 100 V. The battery replacement device 220 charges the detachable battery 100 received from the user of the electric vehicle 10 in accordance with a control process of the station control device 210. When the battery replacement device 220 has completed charging the detachable battery 100, the battery replacement device 220 transmits a notification indicating that the charging has been completed to the station control device 210. Thereby, the station control device 210 recognizes a detachable battery 100 capable of being provided to the user of the electric vehicle 10. The battery replacement device 220 may discharge the detachable battery 100 with the remaining electric power. Details of the battery replacement station 200 will be described below.

The management server device 300 is connected to a network NW. The network NW includes, for example, one or more of the Internet, a cellular network, a Wi-Fi network, a wide area network (WAN), a local area network (LAN), and the like. In the first embodiment, the management server device 300 communicates with the plurality of battery replacement stations 200 via the network NW and manages the plurality of battery replacement stations 200. For example, the management server device 300 receives information indicating the state of the battery replacement station 200 (hereinafter referred to as "state information") from each battery replacement station 200 and determines the state of each battery replacement station 200 on the basis of the state information. The management server device 300 is an example of an "information processing device."

The management server device 300 communicates with a terminal device T1 used by an administrator P1 that manages the battery sharing service system 1, either directly or via the network NW, and outputs a prescribed notification related to the state of the battery replacement station 200 to the terminal device T1. The terminal device T1 is an installed or notebook-type personal computer or the like.

The management server device 300 communicates with a terminal device T2 used by a security guard P2 in charge of maintenance of the battery replacement station via the network NW and outputs a prescribed notification related to the state of the battery replacement station 200 to the terminal device T2. The terminal device T2 is, for example, a portable terminal device, a smartphone, or a tablet terminal. Details of the management server device 300 will be described below.

[2. Configuration of Electric Vehicle]

Figure 2:
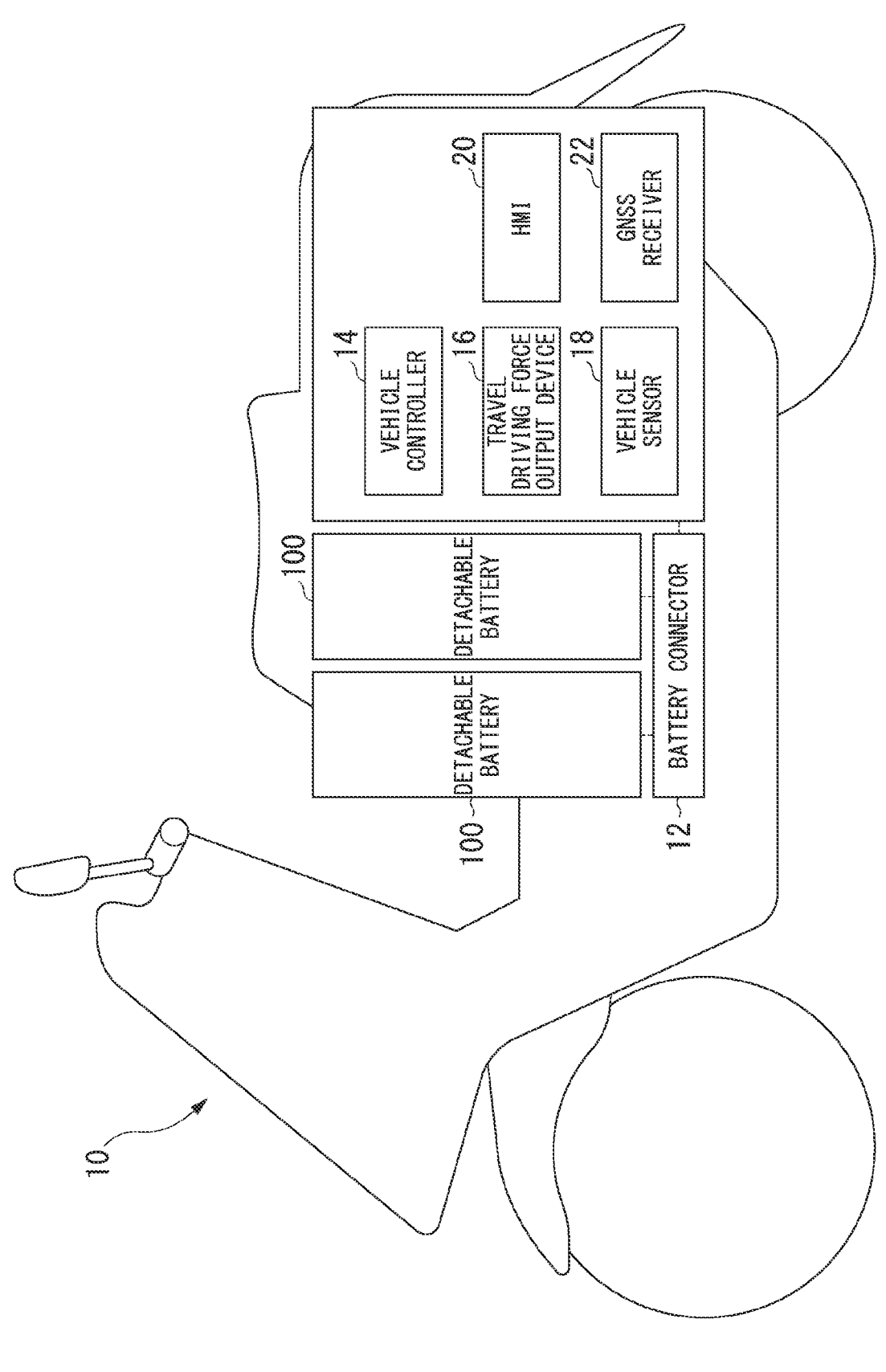
FIG. 2 is a diagram showing an example of a configuration of an electric vehicle of the present embodiment.

FIG. 2 is a diagram showing an example of a configuration of the electric vehicle 10 of the first embodiment. The electric vehicle 10 travels with the driving force of an electric motor driven by electric power supplied from the detachable battery 100. However, the electric vehicle 10 may be a hybrid electric vehicle that travels with a driving force based on a combination of the detachable battery 100 and an internal combustion engine such as a diesel engine or a gasoline engine. The electric vehicle 10 includes, for example, a battery connector 12, a vehicle controller 14, a travel driving force output device 16, a vehicle sensor 18, a human machine interface (HMI) 20, and a global navigation satellite system (GNSS) receiver 22.

The battery connector 12 is electrically connected to the detachable battery 100 when the detachable battery 100 is attached to the electric vehicle 10. The battery connector 12 includes a connection terminal for a power line that receives power supplied from the detachable battery 100, a connection terminal for a communication line that performs data communication between the detachable battery 100 and the vehicle controller 14, and the like.

The vehicle controller 14 acquires a measurement result from the vehicle sensor 18, acquires a value (state of charge: SOC) representing a state of charge of the power storage 120 from a battery manager (BMU) 110 provided in the detachable battery 100, and acquires a position of the electric vehicle 10 from the GNSS receiver 22. The vehicle controller 14 controls the travel driving force output device 16 on the basis of acquired data. The vehicle controller 14 may transmit position information of the electric vehicle 10 acquired from the GNSS receiver 22 to the detachable battery 100 via the battery connector 12.

The travel driving force output device 16 includes, for example, an electric motor, an inverter, and an electronic control unit (ECU) that controls the inverter. The ECU controls electric power supplied from the detachable battery 100 to the electric motor, for example, by controlling the inverter. The vehicle sensor 18 includes a speed sensor, an acceleration sensor, a rotational speed sensor, an odometer, and various types of other sensors mounted in the electric vehicle 10. The vehicle sensor 18 outputs measurement results to the vehicle controller 14.

The HMI 20 outputs various types of information to the user of the electric vehicle 10 and receives input operations performed by the user. The HMI 20 includes, for example, various types of display devices (which may be touch panels) such as a head up display (HUD) and a meter display, a speaker, and the like. The GNSS receiver 22 measures the position of the electric vehicle 10 on the basis of radio waves coming from GNSS satellites such as, for example, GPS satellites.

[3. Detachable Battery]

Figure 3:
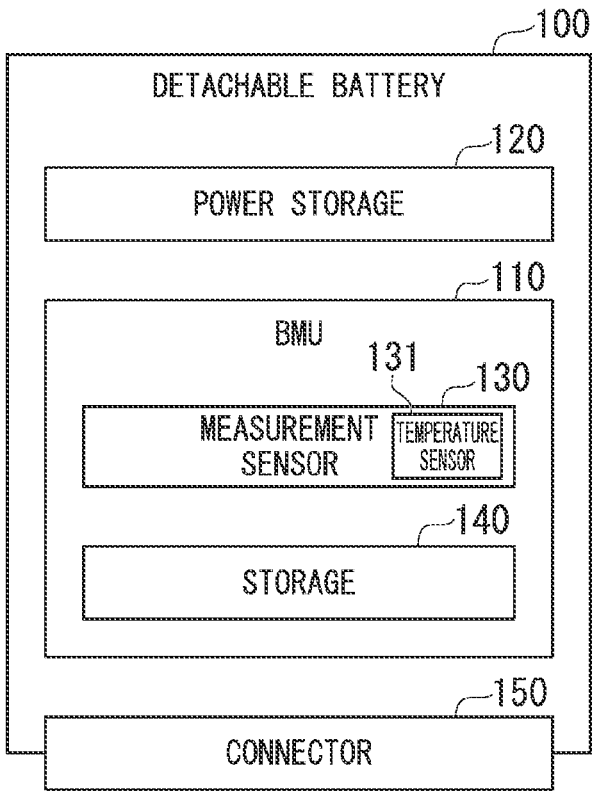
FIG. 3 is a diagram showing an example of a configuration of a detachable battery of the present embodiment.

FIG. 3 is a diagram showing an example of a configuration of the detachable battery 100 of the first embodiment. The detachable battery 100 includes, for example, the power storage 120, the BMU 110, and a connector 150. The BMU 110 includes, for example, a measurement sensor 130 and a storage 140.

The power storage 120 is, for example, an assembled battery in which a plurality of single cells are connected in series. The power storage 120 stores electric power. The single cell constituting the power storage 120 is, for example, a secondary battery capable of repeating charging and discharging such as a lithium-ion battery (LIB), a nickel-metal hydride battery, or an all-solid-state battery. An example in which the secondary battery constituting the power storage 120 is a capacitor such as an electric double layer capacitor, a composite battery in which a secondary battery and a capacitor are combined, or the like in addition to a lead storage battery, a sodium ion battery, or the like is conceivable. The configuration of the secondary battery constituting the power storage 120 is not particularly limited.

The BMU 110 controls the charging and discharging of the power storage 120, performs cell balancing, detects abnormalities in the power storage 120, derives a cell temperature of the power storage 120, derives a charging/discharging current of the power storage 120, estimates the SOC of the power storage 120, and the like. The BMU 110 causes the storage 140 to store abnormalities and failures of the power storage 120 and the like ascertained on the basis of measurement results of the measurement sensor 130 as battery state information. The measurement sensor 130 is a voltage sensor, a current sensor, a temperature sensor, or the like for measuring the state of charge of the power storage 120. The measurement sensor 130 outputs measurement results such as a voltage, a current, and a temperature that have been measured to the BMU 110. More specifically, the measurement sensor 130 includes at least a temperature sensor 131. The temperature sensor 131 measures the temperature of the electrically operating detachable battery 100 and outputs a temperature value to the BMU 110. The temperature sensor 131 is an example of a "temperature detector." Also, the detachable battery 100 that is not electrically operating may be defined as a detachable battery 100 whose operation has ended. A detachable battery 100 other than the detachable battery 100 defined as described above may be defined as an electrically operating detachable battery 100. As an example, an electrically operated state may be defined as either a state in which the detachable battery 100 is charged or a state in which the detachable battery 100 is discharged.

The storage 140 includes a non-volatile storage device such as, for example, a flash memory. The storage 140 stores the battery state information described above. The storage 140 may store identification information (a battery ID) assigned to the detachable battery 100. The connector 150 is electrically connected to the battery connector 12 of the electric vehicle 10 when the detachable battery 100 is attached to the electric vehicle 10. In this state, the detachable battery 100 supplies the electric power stored in the power storage 120 to the electric motor provided in the electric vehicle 10.

[4. Battery Replacement Station]

[4.1 Physical Configuration of Battery Replacement Device]

Next, the battery replacement station 200 will be described in detail. First, a physical configuration of the battery replacement device 220 will be described.

Figure 4:
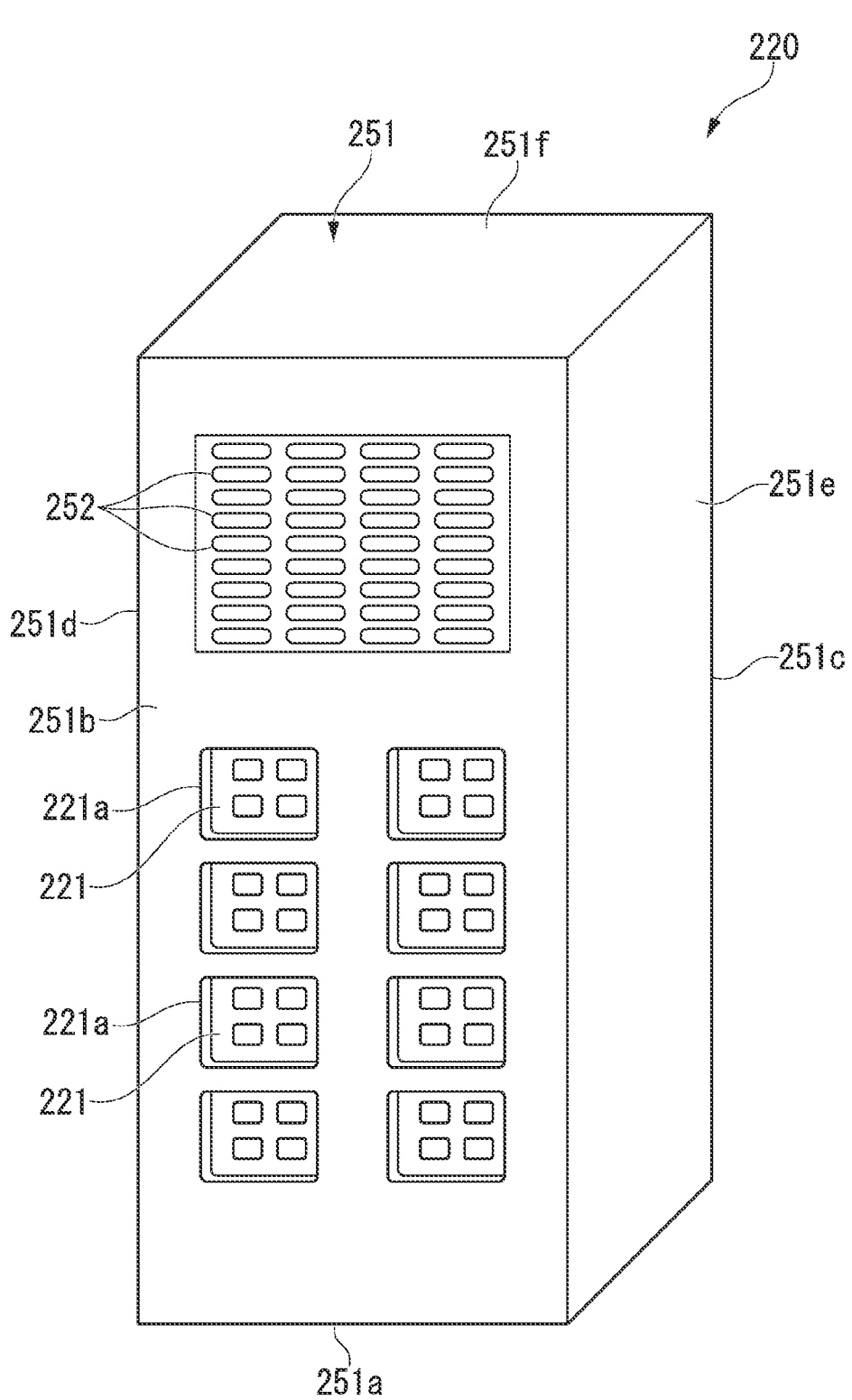
FIG. 4 is a perspective view showing an example of a battery replacement device of the present embodiment.

FIG. 4 is a perspective view showing an example of the battery replacement device 220 of the first embodiment. The battery replacement device 220 has a housing 251. The housing 251 is formed, for example, in a vertical rectangular parallelepiped. More specifically, the housing 251 includes a lower wall 251a, a front wall (front panel) 251b, a rear wall 251c, a left wall 251d, a right wall 251e, and an upper wall 251f. The lower wall 251a is installed on a floor surface. The front wall 251b, the rear wall 251c, the left wall 251d, and the right wall 251e rise from the front, rear, left, and right ends of the lower wall 251a, respectively, and extend in a vertical direction. The upper wall 251f connects the upper ends of the front wall 251b, the rear wall 251c, the left wall 251d, and the right wall 251e.

The front wall 251b includes an opening (battery replacement port) 221a that exposes the battery slot 221 provided inside of the housing 251 to the outside of the housing 251. In the first embodiment, the eight battery slots 221 are arranged in a matrix of two columns in a horizontal direction and four rows in a vertical direction. The detachable battery 100 is inserted into the battery slot 221 through the opening 221a and disposed inside of the housing 251. The detachable battery 100 inserted into the battery slot 221 generates heat when charged by the battery replacement device 220. At least a part of the heat generated by the detachable battery 100 is transmitted to the air inside of the housing 251.

In the first embodiment, a plurality of intake ports 252 are open in the front wall 251b. The intake port 252 is provided above the battery slot 221. The intake port 252 connects the inside and outside of the housing 251. On the other hand, a plurality of exhaust ports 253 are open in the rear wall 251c (see FIG. 8). The exhaust port 253 is disposed at the rear wall 251c at a position corresponding to the intake port 252 (for example, at the same height position as the intake port 252). The exhaust port 253 connects the inside and outside of the housing 251. Inside of the housing 251, a fan 254 (see FIG. 8) is disposed near the exhaust port 253. When the fan 254 is driven, the air inside of the housing 251 is exhausted to the outside of the housing 251 through the exhaust port 253 and new air outside of the housing 251 enters the housing 251 through the intake port 252.

Figure 5:
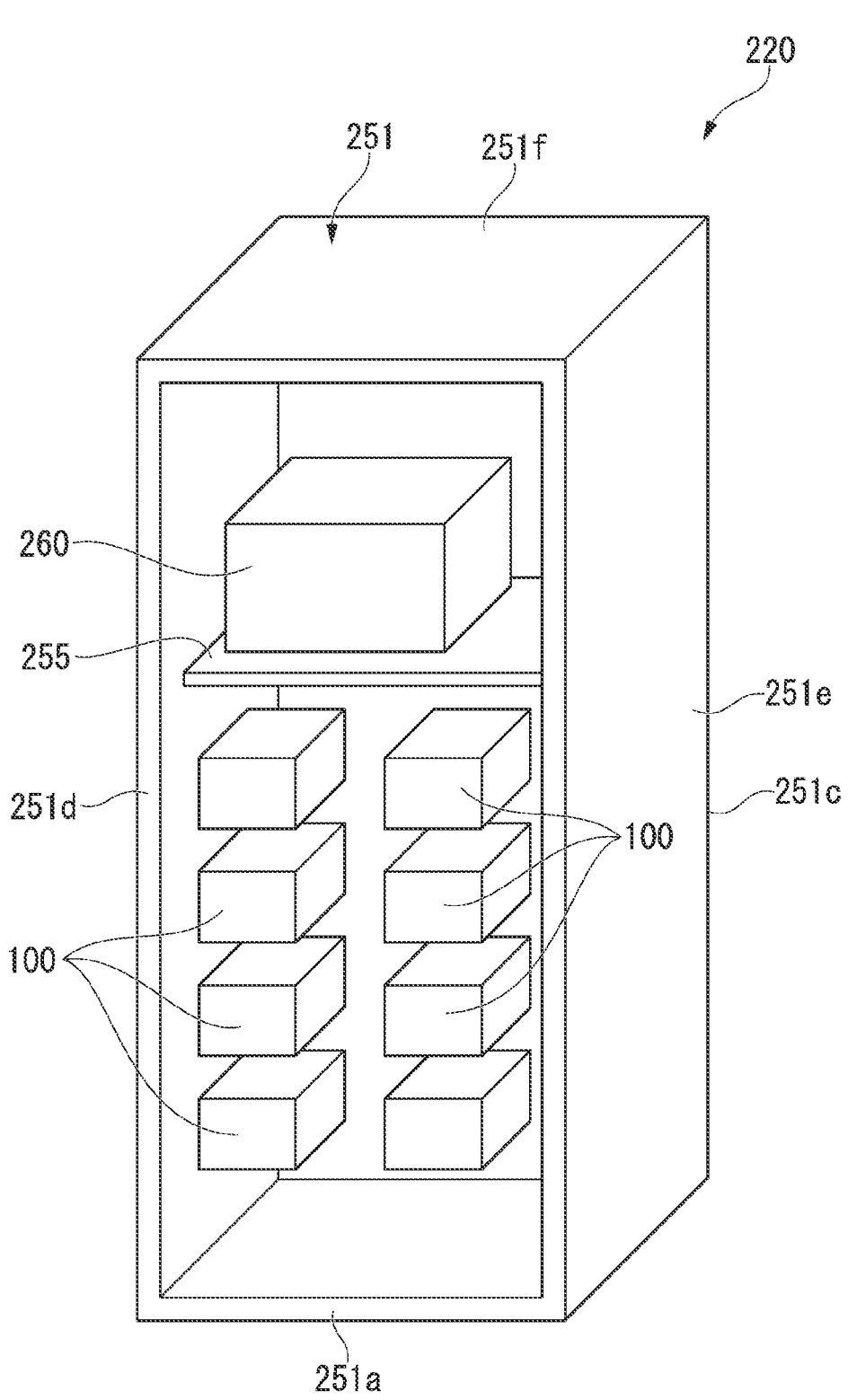
FIG. 5 is a perspective view showing an example of an interior of the battery replacement device of the present embodiment.

FIG. 5 is a perspective view showing the inside of the battery replacement device 220 of the first embodiment. In FIG. 5, a detachable battery 100 accommodated in the battery slot 221 is extracted and shown for convenience of description. The battery replacement device 220 has an AC/DC converter 260. The AC/DC converter 260 is a power converter that converts AC power supplied from the external power supply PS into DC power. The AC/DC converter 260 is electrically connected to the power storage 120 of the detachable battery 100. The AC/DC converter 260 is an example of a "power converter," an example of an "electric component," and an example of an "electric operation unit." The electric operation unit includes power components in addition to power conversion of the AC/DC converter 260 or the like. Details of the AC/DC converter 260 will be described below.

In the first embodiment, a shelf 255 is provided inside of the housing 251. The shelf 255 is arranged above the plurality of battery slots 221 (the plurality of detachable batteries 100). The AC/DC converter 260 is placed on the shelf 255 and is disposed above the plurality of battery slots 221 (the plurality of detachable batteries 100). In other words, the AC/DC converter 260 is disposed closer to the intake port 252 and the exhaust port 253 than the plurality of battery slots 221 (the plurality of detachable batteries 100). In the first embodiment, at least a part of the AC/DC converter 260 is arranged horizontally at a height alongside the intake port 252 and the exhaust port 253.

Figure 6:
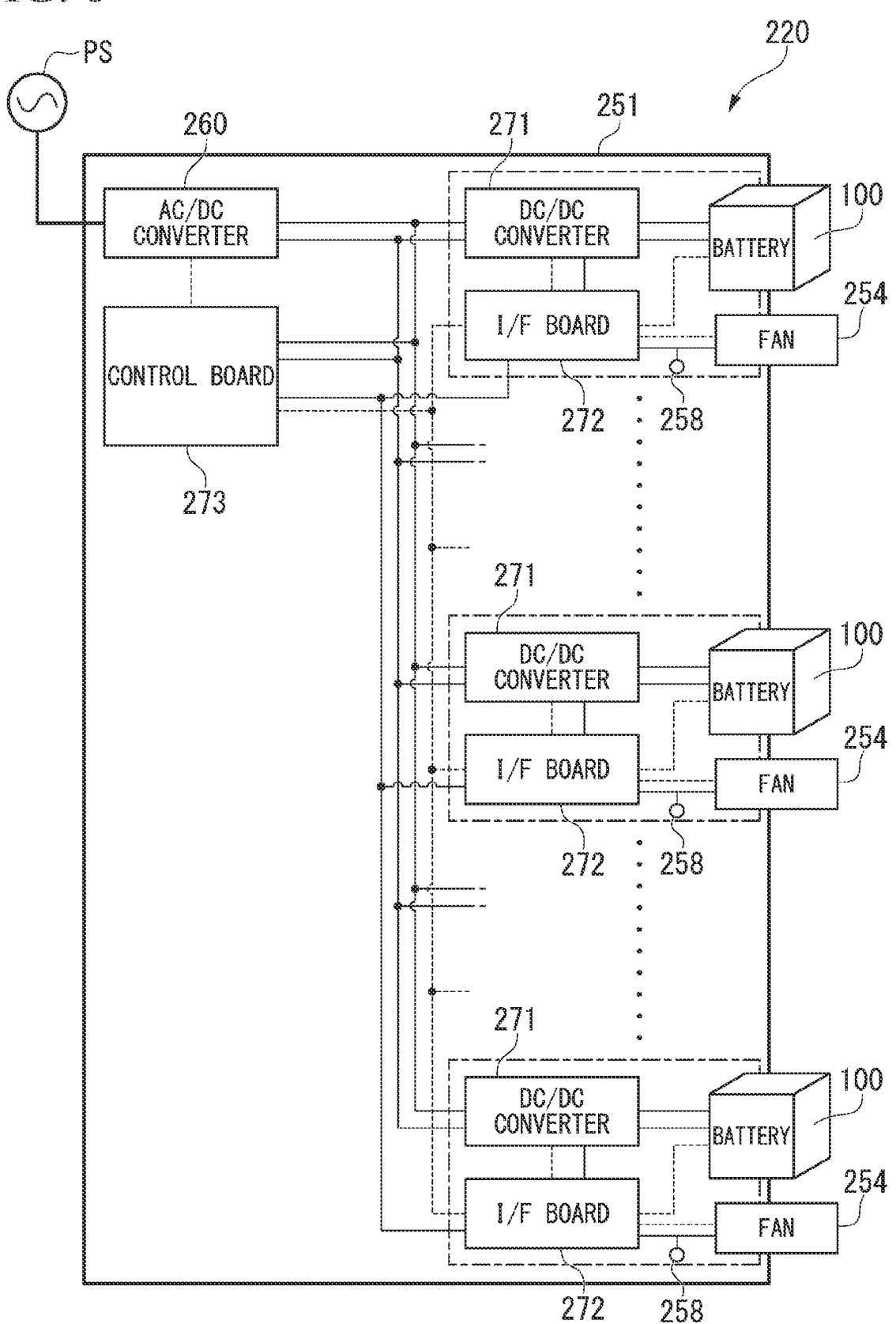
FIG. 6 is a diagram showing an example of an electrical configuration of the battery replacement device of the present embodiment.

FIG. 6 is a diagram showing an internal electrical configuration of the battery replacement device 220 of the first embodiment. In FIG. 6, a solid line indicates a power line (a power cable or the like). In FIG. 6, a dashed line indicates a signal line (a communication cable or the like). In addition to the AC/DC converter 260, the battery replacement device 220 includes a plurality of DC/DC converters 271, a plurality of interface boards (I/F boards) 272, and a control board 273.

The AC/DC converter 260 is supplied with AC power from the external power supply PS. The AC/DC converter 260 converts the AC power supplied from the external power supply PS into DC power and supplies the DC power after the conversion to the plurality of DC/DC converters 271. One AC/DC converter 260 is provided for a plurality of battery slots 221 (a plurality of detachable batteries 100). The AC/DC converter 260 is arranged so that charging power can be simultaneously supplied to a plurality of detachable batteries 100 accommodated in a plurality of battery slots 221. That is, a plurality of battery slots 221 are connected to one AC/DC converter 260. When the AC/DC converter 260 simultaneously charges the plurality of detachable batteries 100, a current obtained by summing charging currents flowing through the plurality of detachable batteries 100 flows and generates heat. The heat generation amount of the AC/DC converter 260 increases as the number of detachable batteries 100, which are simultaneously charged, increases.

The plurality of DC/DC converters 271 are provided in a one-to-one relationship with respect to the plurality of battery slots 221. The plurality of DC/DC converters 271 are electrically connected in parallel to the AC/DC converter 260. The detachable battery 100 electrically connected to the DC/DC converter 271 is discharged to the DC/DC converter 271 or charged by the DC/DC converter 271. The DC/DC converter 271 is an example of an "operation unit." The DC/DC converter 271 is connected to a detachable battery 100 accommodated in the battery slot 221 via the connector 221b of the battery slot 221 (see FIG. 8). The DC/DC converter 271 converts the DC power supplied from the AC/DC converter 260 into DC power having a voltage suitable for charging the detachable battery 100 and supplies the DC power after the conversion to the detachable battery 100. The DC/DC converter 271 converts the DC power supplied from the AC/DC converter 260 into DC power having a voltage suitable for charging the fan 254 and supplies the DC power after conversion to the fan 254 via the I/F board 272. A power detector 258 is connected to the wiring between the I/F board 272 and the fan 254.

The plurality of I/F boards 272 are provided in a one-to-one relationship with the plurality of battery slots 221. The I/F board 272 is connected to a detachable battery 100 accommodated in the battery slot 221 via the connector 221b of the battery slot 221 (see FIG. 8). The I/F board 272 communicates with the detachable battery 100 and acquires information (for example, battery state information and a battery ID) stored in the storage 140 of the detachable battery 100 from the detachable battery 100. The I/F board 272 outputs information acquired from the detachable battery 100 to the control board 273.

The control board (controller) 273 controls the AC/DC converter 260, the plurality of DC/DC converters 271, and the plurality of I/F boards 272. For example, the control board 273 controls a magnitude of electric power converted by the AC/DC converter 260 by controlling the field effect transistor 261 (field effect transistor: FET, see FIG. 8) included in the AC/DC converter 260 in accordance with the number of detachable batteries 100, which are simultaneously charged.

Figure 7:
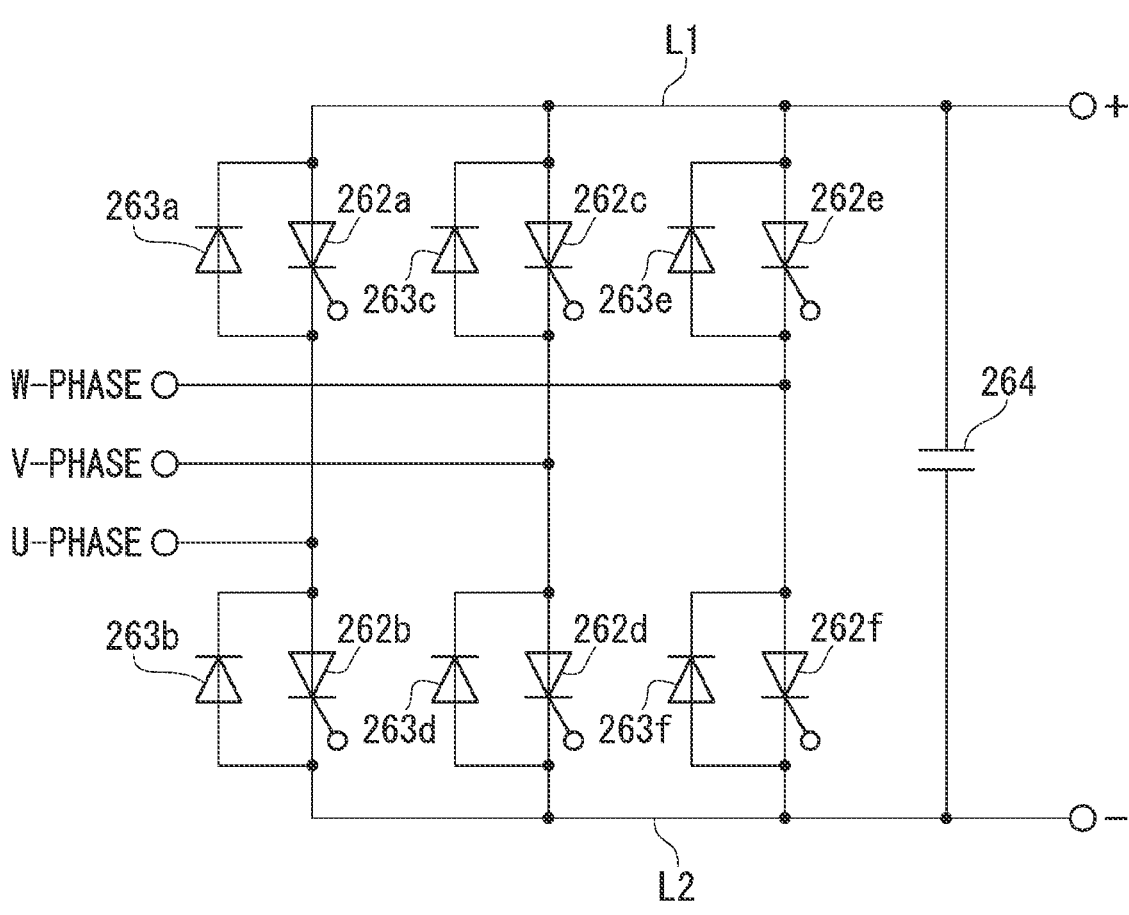
FIG. 7 is an electrical circuit diagram showing a part of a configuration of an alternating current (AC)/direct current (DC) converter of the present embodiment.

FIG. 7 is an electrical circuit diagram showing a part of the configuration of the AC/DC converter 260. The AC/DC converter 260 has a plurality of thyristors 262a, 262b, 262c, 262d, 262e, and 262f, a plurality of feedback diodes 263a, 263b, 263c, 263d, 263e, and 263f, and one or more capacitors (smoothing capacitors) 264. Hereinafter, when the plurality of thyristors 262a to 262f are not distinguished from each other, they are referred to as a thyristor 262. When the feedback diodes 263a to 263f are not distinguished from each other, they are referred to as a feedback diode 263.

The two thyristors 262a and 262b are connected in series between the positive electrode line L1 and the negative electrode line L2. The intermediate node between the two thyristors 262a and 262b is connected to a U-phase line where AC power is input. Likewise, the two thyristors 262c and 262d are connected in series between the positive electrode line L1 and the negative electrode line L2. The intermediate node between the two thyristors 262c and 262d is connected to a V-phase line where AC power is input. The two thyristors 262e and 262f are connected in series between the positive electrode line L1 and the negative electrode line L2. The intermediate node between the two thyristors 262e and 262f is connected to a W-phase line where AC power is input.

The plurality of feedback diodes 263a to 263f are connected in antiparallel to the plurality of thyristors 262a to 262f. The capacitor 264 is connected between the positive electrode line L1 and the negative electrode line L2. The capacitor 264 is, for example, an electrolytic capacitor. In the first embodiment, the capacitor 264 is a component having a lower heat resistance temperature than the FET 261, the thyristor 262, and the feedback diode 263 described above. On the other hand, the FET 261, the thyristor 262, and the feedback diode 263 are components having a higher temperature than the capacitor 264 when the AC/DC converter 260 is operated. Each of the FET 261, the thyristor 262, and the feedback diode 263 is an example of a "first component." The capacitor 264 is an example of a "second component."

The AC/DC converter 260 has a substrate 265 (see FIG. 8) in addition to the configuration described above. The FET 261, the thyristor 262, the feedback diode 263, and the capacitor 264 are mounted on the substrate 265. The "substrate" used herein is a base on which the components are mounted and may be a metallic plate or the like as well as a printed wiring board.

Figure 8:
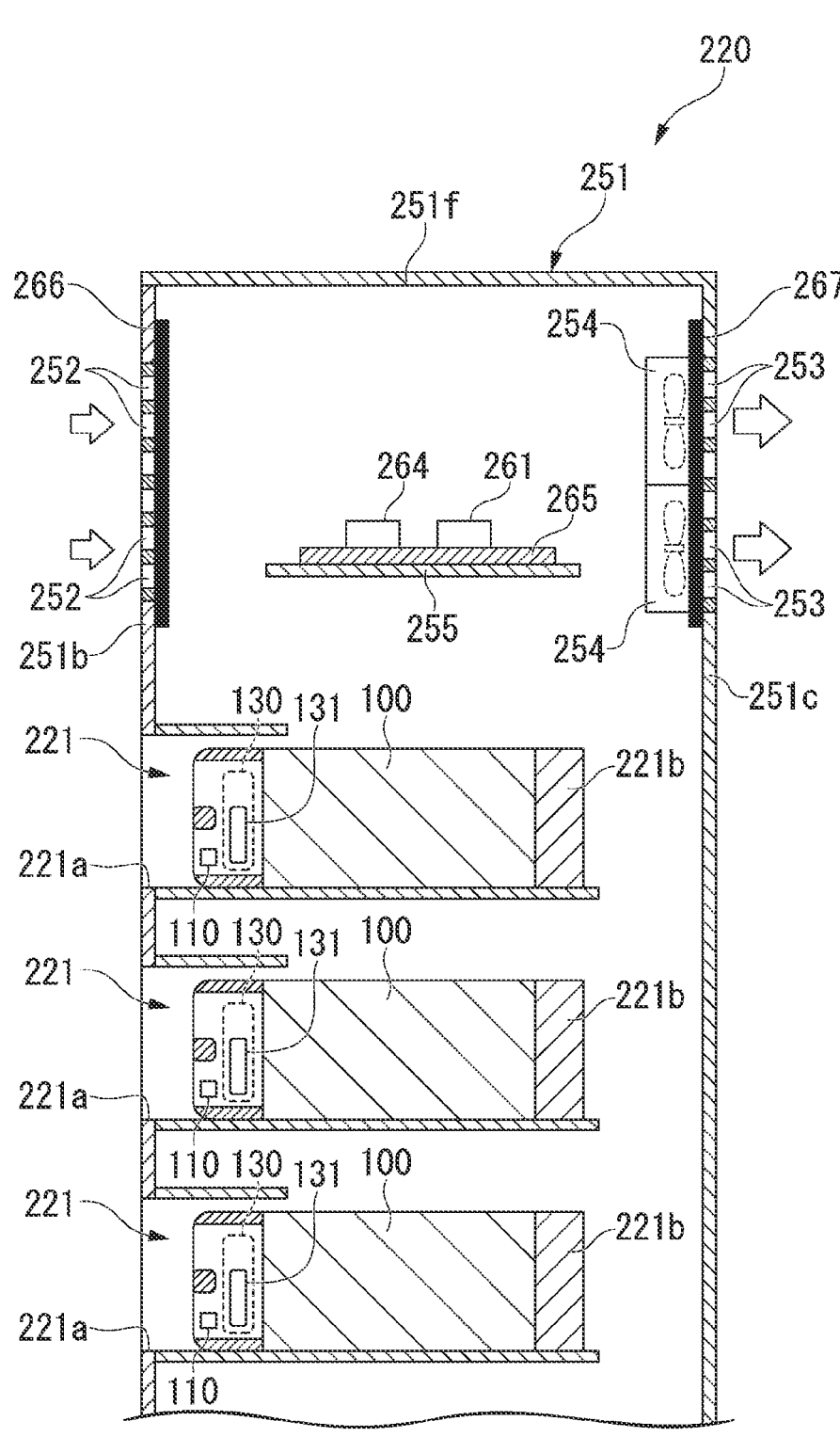
FIG. 8 is a cross-sectional view showing an example of the battery replacement device of the present embodiment.

FIG. 8 is a cross-sectional view showing a part of the battery replacement device 220.

As shown in FIG. 8, the battery replacement device 220 can store a plurality of detachable batteries 100. The detachable battery 100 is disposed inside of the housing 251 by being inserted into the battery slot 221 from the opening 221a. The detachable battery 100 includes a temperature sensor 131 in advance. The temperature sensor 131 is disposed inside of the battery slot 221, for example, so that the temperature sensor 131 is located inside of an outer edge of the housing 251 with the detachable battery 100 accommodated in the battery slot 221. The temperature sensor 131 measures a value of a surface temperature of the detachable battery 100 as an example. Alternatively, the temperature sensor 131 may measure a value of a temperature inside of the detachable battery 100 (hereinafter also referred to as an "internal temperature"). The plurality of detachable batteries 100 disposed in the battery replacement device 220 are divided into a detachable battery 100 that is electrically operating and a detachable battery 100 that is not electrically operating. The temperature sensor 131 detects the temperature values of the detachable battery 100 that is not electrically operating and the detachable battery 100 that is electrically operating on the basis of control of the BMU 110 and the like.

A filter 266 is provided at an opening position of the intake port 252 of the battery replacement device 220 according to the first embodiment. The filter 266 is a mode of a purification device. The filter 266 suctions a foreign substance such as dust contained in the gas when air outside of the housing 251 flows into the inside from the intake port 252. When clogging occurs due to an increase in an amount of foreign substance suctioned by the filter 266, sufficient external air is not supplied to the inside of the housing 251, the cooling effect diminishes, and the temperature inside of the battery replacement device 220 may increase. In this case, the administrator can replace the filter 266. In the first embodiment, the management server device 300 estimates an abnormality due to an increase in the temperature inside of the battery replacement device 220 due to an influence of clogging of the filter 266 or the like according to a measurement result of the temperature sensor 131 provided inside of the detachable battery 100. The management server device 300 determines an abnormality in the filter 266 on the basis of the increase in the temperature inside of the battery replacement device 220. The determination that an abnormality has occurred in the filter 266 is a mode that an abnormality has occurred in a connected path. The abnormality of the filter 266 is a mode of the abnormal change occurred in the filter 266. The abnormal change occurred in the filter 266 refers to a state different from the normal or usual times such as modulation in addition to an abnormality occurred in the filter 266, and, for example, includes clogging occurred in the filter 266. The abnormal change occurred in the filter 266 includes, for example, clogging occurred in the filter 266 having a prescribed level or higher, damage such as tearing or detaching of the filter 266, and repairs. The clogging occurred in the filter 266 is often eliminated by, for example, removing the clogged dust.

Also, in addition to the abnormal change in the filter 266, the temperature inside of the battery replacement device 220 also increases due to abnormal stopping of the fan 254 or a decrease in a rotational speed thereof. Even if there is no abnormality in the filter 266, the administrator may determine an abnormality in the movement of the fan 254 and replace the fan 254 if it is abnormal. Because the fan 254 also has a function of circulating air inside of the housing to maintain the purification of the internal air, a position mode for the purification device may be used.

Alternatively, in the first embodiment, a filter 267 may be provided at the exhaust port 253. The filter 267 suctions a foreign substance such as dust contained in the gas when the air inside of the housing 251 is exhausted from the exhaust port 253. In the first embodiment, the management server device 300 may estimate an abnormality due to an increase in the temperature inside of the battery replacement device 220 due to the influence of clogging of the filter 267 or the like according to the measurement result of the temperature sensor 131 provided inside of the detachable battery 100. The management server device 300 determines the abnormality of the filter 267 on the basis of the increase in the temperature inside the battery replacement device 220. The determination that an abnormality has occurred in the filter 267 is a mode that an abnormality has occurred in the connected path.

Although a mode in which the filter 266 is provided on the inner side of the housing 251 at the opening position of the intake port 252 and the filter 267 is provided on the inner side of the housing 251 at the opening position of the exhaust port 253 is shown in FIG. 8, they may be provided on the outer side of the housing 251 at each opening position. Also, at least one of the filters 266 and 267 may be provided.

[4.2 System Configuration of Battery Replacement Station]

Next, a system configuration of the battery replacement station 200 will be described.

Figure 9:
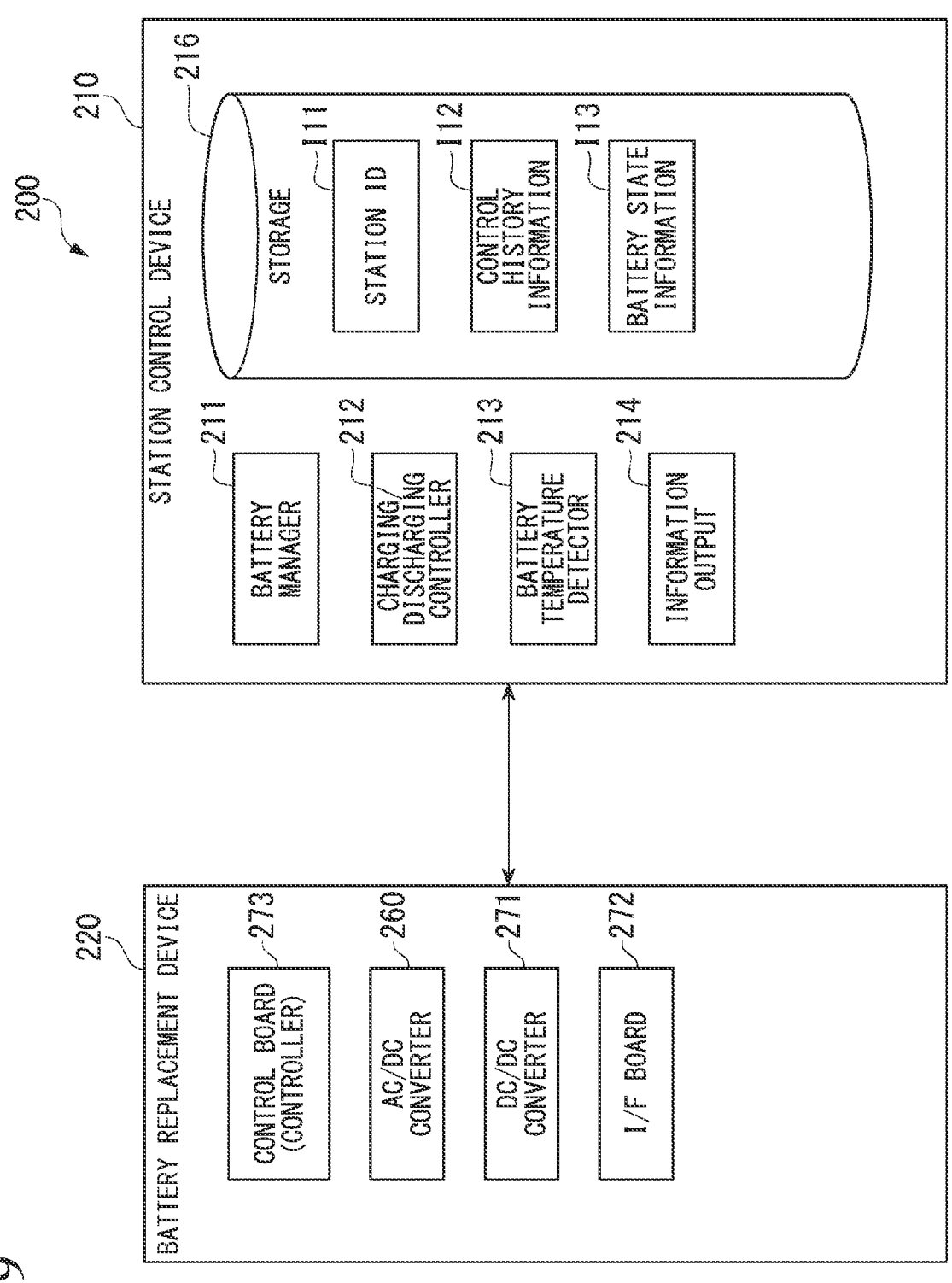
FIG. 9 is a block diagram showing an example of a system configuration of a battery replacement station of the present embodiment.

FIG. 9 is a block diagram showing a system configuration of the battery replacement station 200. In the first embodiment, the station control device 210 includes, for example, a battery manager 211, a charging/discharging controller 212, a battery temperature detector 213, an information output 214, and a storage 216.

Each of the battery manager 211, the charging/discharging controller 212, the battery temperature detector 213, and the information output 214 is implemented, for example, by a hardware processor such as a central processing unit (CPU)

executing a program (software). Some or all of these components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. Some or all of functions of these components may be implemented by a dedicated LSI circuit. The program may be pre-stored in a storage device (a storage device including a non-transitory storage medium) such as a hard disk drive (HDD) or a flash memory provided in the station control device 210 or may be stored in a removable storage medium (the non-transitory storage medium) such as a DVD or a CD-ROM and installed in the HDD or the flash memory provided in the station control device 210 when the storage medium is mounted in a drive device provided in the station control device 210. The storage 216 is implemented by one of storage devices such as an HDD, a flash memory, and a random access memory (RAM) or a combination thereof.

The battery manager 211 manages a plurality of detachable batteries 100 accommodated in a plurality of battery slots 221. For example, the battery manager 211 receives the detachable battery 100 from the user of the electric vehicle 10, determines whether or not the detachable battery 100 needs to be charged/discharged, and manages the provision of the fully charged detachable battery 100 to the user of the electric vehicle 10.

The charging/discharging controller 212 controls the charging/discharging of the detachable battery 100 determined to be necessary for charging by the battery manager 211. For example, the charging/discharging controller 212 charges and discharges the detachable battery 100 by controlling the AC/DC converter 260, the DC/DC converter 271, and the like included in the battery replacement device 220. The charging/discharging controller 212 causes the storage 216 to store a control history related to the charging/discharging of the detachable battery 100 as control history information I12. The control history related to the charging/discharging of the detachable battery 100 is an example of information of the operating state of the detachable battery 100. The control history information I12 includes, for example, information in which the charging start time and the charging end time of each detachable battery 100 and the number of detachable batteries 100 during simultaneous charging are associated with date and time information. The control history information I12 may include a discharging start time and a discharging end time of the detachable battery 100.

The battery temperature detector 213 detects a temperature of each detachable battery 100 on the basis of a measurement result of the temperature sensor 131. The battery temperature detector 213 detects temperatures of the detachable battery 100, which is electrically operating (or which is operating), and the detachable battery 100, which is not electrically operating (or which is not operating). For example, the surface temperature of the battery or the temperature inside of the battery may be estimated on the basis of the measurement result of the temperature sensor 131 and a relational expression or a calculation table obtained in advance. The battery temperature detector 213 associates the detected battery temperature with the date and time information and causes the storage 216 to store an association result as battery state information I13. The temperature detected by the battery temperature detector 213 is an example of a "power storage device temperature."

The information output 214 transmits the state information of the battery replacement station 200 including the control history information I12 and the battery state information I13 stored in the storage 216 to the management server device 300 at prescribed intervals. The prescribed interval is, for example, 10 minutes, but is not limited to the above example. The state information is associated with the station ID I11 stored in the storage 216 and transmitted to the management server device 300. The station ID I11 is identification information for identifying the battery replacement station 200.

[5. Management Server Device]

Next, the management server device 300 will be described in detail.

Figure 10:
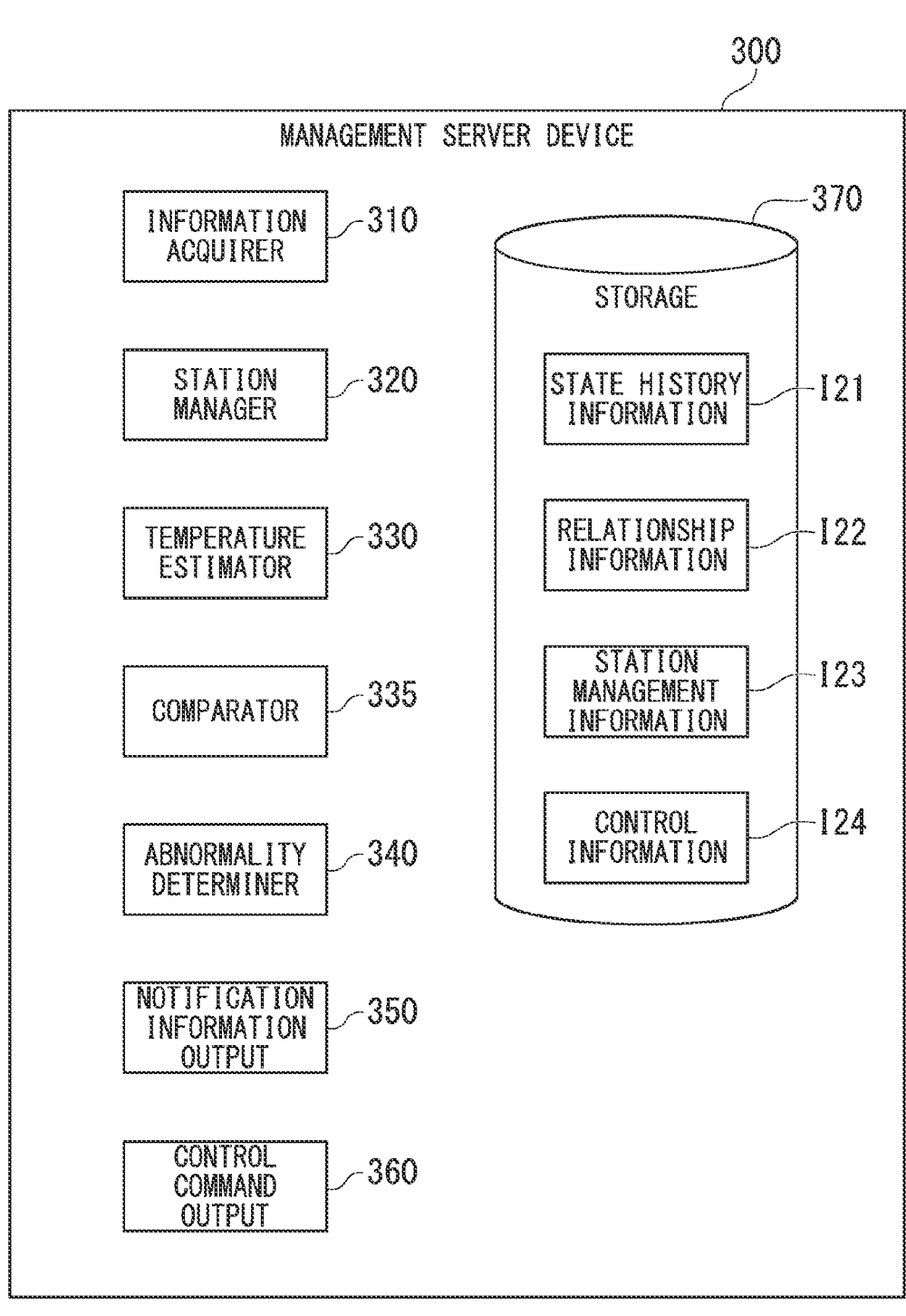
FIG. 10 is a block diagram showing an example of a system configuration of a management server device of the present embodiment.

FIG. 10 is a block diagram showing a system configuration of the management server device 300. The management server device 300 includes, for example, an information acquirer 310, a station manager 320, a temperature estimator 330, a comparator 335, an abnormality determiner 340, a notification information output 350, a control command output 360, and a storage 370.

Each of the information acquirer 310, the station manager 320, the temperature estimator 330, the abnormality determiner 340, the notification information output 350, and the control command output 360 is implemented, for example, by a hardware processor such as a CPU executing a program (software). Some or all of these components may be implemented by hardware (including a circuit; circuitry) such as an LSI circuit, an ASIC, an FPGA, or a GPU or may be implemented by software and hardware in cooperation. Some or all of functions of these components may be implemented by a dedicated LSI circuit. The program may be pre-stored in a storage device (a storage device including a non-transitory storage medium) such as an HDD or a flash memory provided in the management server device 300 or may be stored in a removable storage medium (the non-transitory storage medium) such as a DVD or a CD-ROM and installed in the HDD or the flash memory provided in the management server device 300 when the storage medium is mounted in a drive device provided in the management server device 300. The storage 370 is implemented by one of storage devices such as an HDD, a flash memory, and a RAM or a combination thereof.

The information acquirer 310 acquires state information transmitted from each battery replacement station 200. For example, the information acquirer 310 acquires control history information I12 and battery state information I13 transmitted from each battery replacement station 200. In the present specification, "acquisition" includes a case where information is internally generated (for example, a case where information is generated by performing prescribed calculation on externally received information) and the like in addition to a case where information is externally received and acquired. The information acquirer 310 stores the state information acquired from each battery replacement station 200 as state history information I21 in the storage 370. The information acquirer 310 is an example of an "acquirer."

The station manager 320 manages each battery replacement station 200 on the basis of state information acquired from each battery replacement station 200. For example, the station manager 320 manages the operating state of each battery replacement station 200, the number of detachable batteries 100 received by each battery replacement station 200, the number of detachable batteries 100 provided from each battery replacement station 200, and the like.

The temperature estimator 330 estimates a temperature of the battery replacement device 220 in which the detachable battery 100 is installed on the basis of the state information acquired from each battery replacement station 200. The temperature is a temperature inside of the battery replacement device 220. The internal temperature is the temperature of the air inside of the housing 251 of the battery replacement device 220. Hereinafter, this content will be described in detail. The temperature estimator 330 is an example of an "estimator."

Figure 11:
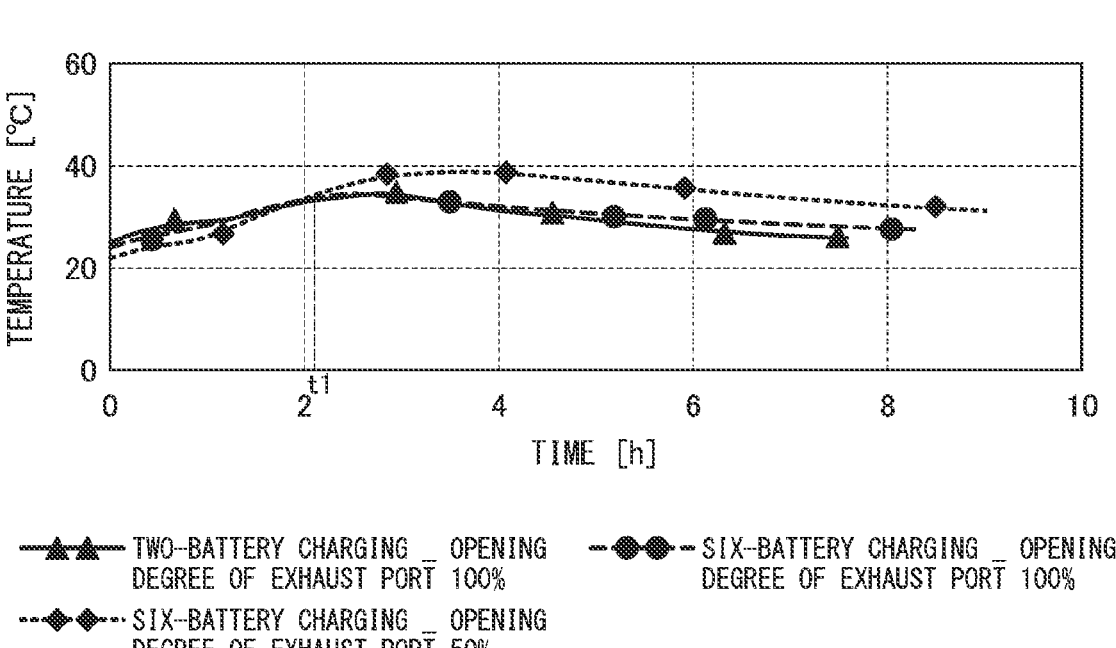
FIG. 11 is a diagram showing an example of a temperature change in a detachable battery of the present embodiment.

FIG. 11 is a diagram showing an example of a temperature change in the detachable battery 100.

In FIG. 11, a graph in which marks "♦" are linked indicates a change in a temperature of the detachable battery 100 measured by the temperature sensor 131 in a case where six detachable batteries 100 are attached to the battery replacement device 220 and a closing degree of the exhaust port 253 is 50%. Also, in FIG. 11, a graph in which marks "●" are linked indicates a change in the temperature of the detachable battery 100 measured by the temperature sensor 131 when six detachable batteries 100 are attached to the battery replacement device 220 and an opening degree of the exhaust port 253 is 100%. Also, in FIG. 11, a graph in which marks "▲" are linked indicates a change in the temperature of the detachable battery 100 measured by the temperature sensor 131 when two detachable batteries 100 are attached to the battery replacement device 220 and the opening degree of the exhaust port 253 is 100%.

According to these three graphs, for example, in a case where charging is terminated and the like, when the opening degree of the exhaust port 253 is 100%, the temperature of the detachable battery 100 gradually decreases after time t1. On the other hand, when the opening degree of the exhaust port 253 is 50%, the temperature of the detachable battery 100 increases after time t1. Furthermore, the temperature indicated by the graph in which marks "♦" are linked and the temperature indicated by the graph in which other marks are linked diverge over time and the temperature indicated by the graph in which marks "♦" are linked increases. That is, this indicates that the temperature of the detachable battery 100 measured by the temperature sensor 131 increases when the exhaust state at the exhaust port 253 deteriorates. The temperature estimator 330 according to the first embodiment estimates the temperature inside of the battery replacement device 220 on the basis of the temperature of the detachable battery 100 measured by the temperature sensor 131 so that it is determined whether the state of the exhaust port 253 has deteriorated. One of the causes of the deterioration of the state of the exhaust port 253 is the clogging of the filter provided in the exhaust port 253. Also, the temperature of a battery such as the detachable battery 100 changes with an influence of a charging current, an internal electrical resistance, and an ambient temperature.

The temperature estimator 330 estimates the temperature inside of the battery replacement device 220 on the basis of the state history information I21 stored in advance in the storage 370 and the relationship information I22 stored in advance in the storage 370. For example, when there are a plurality of electrically operating detachable batteries 100, the temperature estimator 330 estimates the temperature inside of the battery replacement device 220 on the basis of a highest temperature among a plurality of temperatures detected by the temperature sensors 131 provided in the detachable batteries 100. Alternatively, the temperature estimator 330 estimates, for example, the temperature inside of the battery replacement device 220 on the basis of a plurality of temperatures detected by the temperature sensors 131 provided in a plurality of electrically operating detachable batteries 100 when the detachable batteries 100 are located.

FIG. 12 is a diagram showing an example of the relationship information I22. The relationship information I22 indicates a corresponding relationship between the number of batteries (detachable batteries 100), which are simultaneously operating, a simultaneous operation time, a statistical value of the temperature of the detachable battery 100, and a temperature inside of the battery replacement device 220. A corresponding relationship indicated in the relationship information I22 may be a value obtained by performing measurement in advance by an experiment or the like as an example. For example, the administrator of the battery sharing service system 1 calculates a statistical value of the temperature of the detachable battery 100 according to a period of time of the simultaneous operating state (a simultaneous operation time) when the number of detachable batteries 100, which are simultaneously operating, is two on the basis of a value obtained from the temperature sensor 131 provided in each detachable battery 100. The statistical value of the temperature of the detachable battery 100 may be an average value of the temperature of each detachable battery 100 in the corresponding simultaneous operation time. In this case, the temperature estimator 330 estimates the temperature inside of the battery replacement device 220 on the basis of an average value of the plurality of temperatures detected by the battery temperature detector 213. Also, when the number of detachable batteries 100, which are simultaneously operating, is two, the administrator measures a measured value or statistical value of a temperature inside of the battery replacement device 220 according to the period of time of the simultaneous operating state (the simultaneous operation time). When the number of detachable batteries 100, which are simultaneously operating, is different from two, the administrator calculates or measures a statistical value of the temperature of the detachable battery 100 and a measured value or a statistical value of the temperature inside of the battery replacement device 220 according to a period of time of the simultaneous operating state (a simultaneous operation time). The administrator creates the relationship information I22 in which the statistical value of the temperature of the detachable battery 100 and the measured value or the statistical value of the temperature inside of the battery replacement device 220 according to the period of time of the simultaneous operating state (the simultaneous operation time) when the number of detachable batteries 100, which are simultaneously operating, is n (n≥1) are associated and records the relationship information I22 in the storage 370 of the management server device 300.

The temperature estimator 330 estimates the temperature inside of the battery replacement device 220 as described below using the relationship information I22 shown in FIG. 12. Specifically, the temperature estimator 330 identifies the current number of detachable batteries 100, which are simultaneously operating, identifiers of the detachable batteries 100, which are simultaneously operating, and a simultaneous operation time of the detachable batteries 100 of the identifiers from the control history information I12. The temperature estimator 330 calculates a statistical value of a temperature of each detachable battery 100 of the identified identifier. The temperature estimator 330 estimates a current temperature inside of the battery replacement device 220 according to interpolation calculation on the basis of a relationship between a combination of the current number of detachable batteries 100 attached to the battery replacement device 220, a simultaneous operation time thereof, and a statistical value of a temperature and a combination of a simultaneous operation time, a statistical value of a temperature of the detachable battery 100, and a temperature inside of the battery replacement device 220 recorded in the relationship information I22 in association with the same number of detachable batteries 100.

The detachable battery 100 may be charged with respect to the DC/DC converter 271 or the detachable battery 100 may be charged by the DC/DC converter 271 (hereinafter referred to as a "charged/discharged state"). The temperature estimator 330 estimates the temperature of the battery replacement device 220 on the basis of the temperature detected by the temperature sensor 131, for example, when the detachable battery 100 is in the charged/discharged state.

Although the example in which the temperature estimator 330 estimates the temperature inside of the battery replacement device 220 on the basis of table information such as the relationship information I22 has been described above, the present invention is not limited to the above example. For example, the temperature estimator 330 may estimate a temperature inside of the battery replacement device 220 using a calculation formula obtained in regression analysis or estimate the temperature using a trained model (for example, a neural network) obtained in machine learning.

The comparator 335 compares the temperature inside of the battery replacement device 220 estimated by the temperature estimator 330 with the prescribed temperature or the reference temperature stored in the storage 370 so that the abnormality of the battery replacement device 220 is determined.

As the determination of the abnormality of the battery replacement device 220, the abnormality determiner 340 determines that an abnormality has occurred in the exhaust port 253 when the temperature inside of the battery replacement device 220 is higher than or equal to a prescribed temperature or when a difference between the internal temperature and the reference temperature is higher than or equal to a prescribed value. The abnormality determiner 340 is an example of a "determiner" and an example of a "countermeasure unit." The temperature inside of the battery replacement device 220 at this time is an example of an "observed amount," and a prescribed temperature and a reference temperature stored in the storage 370 are examples of a "reference amount." The prescribed temperature stored in the storage 370 is, for example, a prescribed temperature in the past, and the reference temperature is, for example, a previously obtained observed amount during the use of the battery replacement device 220. The exhaust port 253 is an example of a connected path along which the inside and outside of the housing 251 of the battery replacement device 220 are connected.

The notification information output 350 generates prescribed monitoring information on the basis of the state information acquired by the information acquirer 310 and the station management information I23 stored in the storage 370 and transmits the generated monitoring information to the terminal device T1 used by the administrator P1 of the battery sharing service system 1. The monitoring information is information used for monitoring each battery replacement station 200, for example, information including a station ID and a location (installation location) of each battery replacement station 200, a change in the temperature of the detachable battery 100 measured at each battery replacement station 200, and the like. Thereby, the administrator P1 can remotely monitor a change in the temperature of the detachable battery 100 measured by each battery replacement station 200.

Furthermore, the notification information output 350 generates notification information including the temperature inside of each battery replacement device 220 estimated by the temperature estimator 330. The notification information output 350 copes with an abnormality of the battery replacement station 200 by transmitting the generated notification information to the terminal device T1 and the terminal device T2 used by a security guard P2 in charge of each battery replacement station 200.

Furthermore, the notification information output 350 may generate notification information including the presence or absence of an abnormality in the exhaust port 253 determined by the abnormality determiner 340. The notification information output 350 transmits the generated notification information to the terminal device T1 and the terminal device T2 used by the security guard P2 in charge of each battery replacement station 200. Thereby, the terminal devices T1 and T2 provide notification information in a screen output process or an audio output process. The notification information output 350 is another example of a "countermeasure unit" and an example of an "output."

The notification information is information provided for maintenance or servicing of the battery replacement station 200 and may include, for example, information such as the station ID and the location (installation location) of the battery replacement station 200, the time when the security guard P2 or maintenance personnel should visit the battery replacement station 200, the number of maintenance personnel necessary to repair or replace the battery replacement station 200, and the types and number of electric components to be carried.

When the abnormality determiner 340 determines that there is an abnormality in the exhaust port 253, the control command output 360 notifies that an abnormality has occurred in the exhaust port 253, or suppresses the operating state of the battery replacement device. The control command output 360 is another example of a "countermeasure unit" and an example of an "output."

The storage 370 stores state history information I21, relationship information I22, station management information I23, and control information I24. The control information I24 may be information for controlling the management server device 300, the station control device 210, and the battery replacement device 220.

[6. Processing Flow]

Next, a processing flow related to temperature estimation will be described.

Figure 13:
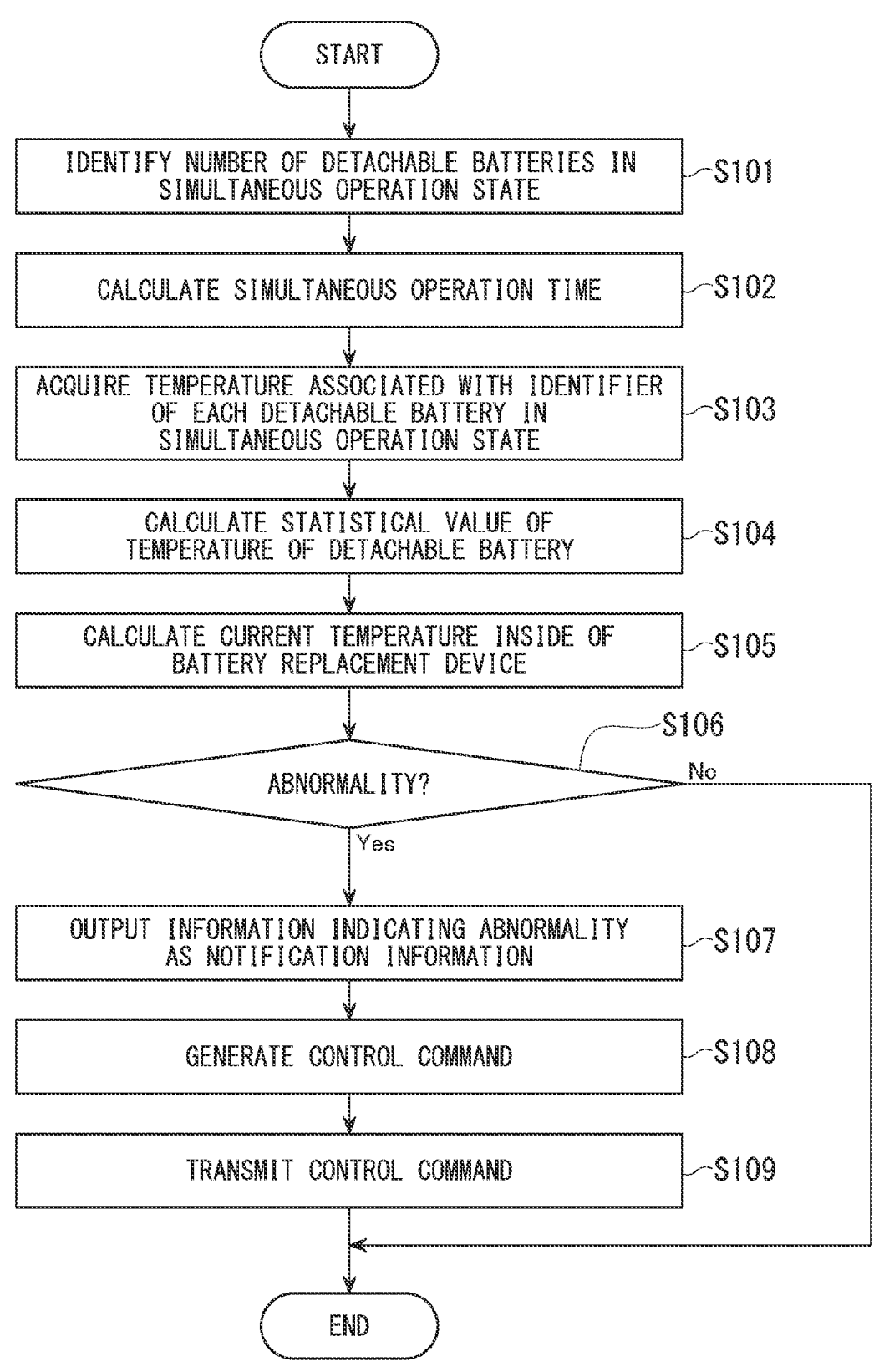
FIG. 13 is a first flowchart showing an example of a processing flow of a station control device.

FIG. 13 is a flowchart showing an example of the processing flow of the station control device 210.

When a state in which the detachable battery 100 is attached to the battery replacement device 220 is detected from the state history information I21, the temperature estimator 330 starts the following processing flow.

First, the temperature estimator 330 identifies the number of detachable batteries 100, which are simultaneously operating, on the basis of the control history information I12 acquired from the battery replacement station 200 (S101). For example, information of the charging start time or the discharging start time is associated and recorded in the control history information I12 and the temperature estimator 330 reads the identifier of the detachable battery 100 with which the charging end time and the discharging end time are not associated and recorded and the operating start times of these detachable batteries 100 (the charging start time or the discharging start time) from the control history information I12. The identifier of the detachable battery 100 indicates the detachable battery 100 in an operating state.

The temperature estimator 330 identifies the number of identifiers of the detachable battery 100 read as the number of detachable batteries 100, which are simultaneously operating.

The temperature estimator 330 calculates the simultaneous operation time on the basis of the operation start time of each of the detachable batteries 100, which are simultaneously operating (S102). For example, if there are two detachable batteries 100, which are simultaneously operating, a difference between a first operation time of the first detachable battery 100 from the operation start time to the current time and a second operation time of the second detachable battery 100 from the operation start time to the current time can be calculated as the simultaneous operation time.

The temperature estimator 330 acquires the temperature associated with the identifier of each detachable battery 100, which is currently simultaneously operating, on the basis of the battery state information I13 acquired from the battery replacement station 200 (S103). The temperature estimator 330 calculates an average value of temperatures associated with the identifiers of the detachable batteries 100, which are currently simultaneously operating, as a statistical value of the temperature of the detachable battery 100 (S104). For example, the temperature estimator 330 may be configured to calculate statistical values of temperatures associated with identifiers of detachable batteries 100, which are currently simultaneously operating, on the basis of temperatures associated with identifiers of detachable batteries 100 in the simultaneous operating state at a plurality of times in the past based on the current time.

The temperature estimator 330 identifies the first combination including the number of detachable batteries 100, which are currently simultaneously operating, the simultaneous operation time, and the statistical value of the current temperature of the detachable battery 100 calculated in the above-described process. Also, the temperature estimator 330 identifies a second combination including the simultaneous operation time, the statistical value of the temperature of the detachable battery 100, and the temperature inside of the battery replacement device 220 recorded in association with the number of detachable batteries 100, which are simultaneously operating, identical to the number indicated in the first combination in the relationship information I22. Also, the temperature estimator 330 calculates the current temperature inside of the battery replacement device 220 according to interpolation calculation on the basis of relationships between the simultaneous operation time period and the current statistical value of the temperature of the detachable battery 100 included in the first combination and the simultaneous operation time period, the statistical value of the temperature of the detachable battery 100, and the temperature inside of the battery replacement device 220 included in the second combination (S105).

The temperature estimator 330 may generate a prediction model for predicting an estimated value of the temperature inside of the battery replacement device 220 by performing a machine learning process for a relationship between an input and an output when a simultaneous operation time corresponding to any number of detachable batteries 100 and the statistical value of the temperature of the detachable battery 100 are input and the temperature inside of the battery replacement device 220 at the time of the input value is output. The temperature estimator 330 may be configured to calculate the temperature inside of the battery replacement device 20 as a result of inputting the simultaneous operation time and the statistical value of the temperature of the detachable battery 100 to the prediction model according to the number of detachable batteries 100, which are simultaneously operating. The notification information output 350 may output the calculated temperature inside of the battery replacement device 20 as notification information to a prescribed output destination. The output destination may be the terminal devices T1 and T2.

The abnormality determiner 340 determines whether an abnormality has occurred in the filter 266 or the fan 254 on the basis of a calculation result of the temperature estimator 330 (S106). Specifically, the abnormality determiner 340 compares the temperature inside of the battery replacement device 220 with the threshold value and determines that an abnormality has occurred in the filter 266 or the fan 254 when the internal temperature is greater than or equal to the threshold value. Alternatively, the abnormality determiner 340 calculates a difference between the temperature inside of the battery replacement device 220 and the reference temperature and determines that an abnormality has occurred in the filter 266 or the fan 254 when the difference is greater than or equal to a prescribed value. The determination that these abnormalities have occurred is a mode of a process of determining that abnormalities have occurred in the connected path.

Also, the abnormality determiner 340 of the management server device 300 may obtain a reference temperature on the basis of the temperature outside of the housing 251 of the battery replacement device 220 (hereinafter also referred to as an "external temperature"). In this case, the information acquirer 310 of the management server device 300 receives a measured temperature value of the temperature sensor provided outside of the housing 251 of the battery replacement device 220 from the battery replacement device 220 via the station control device 210. The temperature estimator 330 estimates the temperature outside of the housing 251 on the basis of the temperature acquired by the information acquirer 310. The abnormality determiner 30 may calculate a reference temperature using a value of the temperature outside of the housing 251 estimated by the temperature estimator 330. The reference temperature may be a temperature value itself measured by the temperature sensor provided outside of the housing 251 of the battery replacement device 220, may be calculated by multiplying the temperature value by any coefficient, or may be calculated by performing an input to a prescribed reference temperature calculation formula.

Also, the temperature outside of the battery replacement device 220 used to obtain the reference temperature may be a temperature detected by the temperature sensor 131 provided inside of the detachable battery 100 when a prescribed period of time has elapsed from a previous operation end time point among detachable batteries 100 that are not electrically operated. Also, in this case, the information acquirer 310 of the management server device 300 may receive the measured temperature value of the temperature sensor 131 provided inside of the detachable battery 100 when a prescribed period of time has elapsed from the previous operation end time point among detachable batteries 100 that are not electrically operating from the battery replacement device 220 via the station control device 210 and calculate the reference temperature using the temperature value. The reference temperature may be a temperature value itself measured by the temperature sensor 131 provided inside of the detachable battery 100 that is not electrically operating, may be calculated by multiplying the temperature value by any coefficient, or may be calculated by performing an input to a prescribed reference temperature calculation formula. In this case, the temperature estimator 330 may estimate a temperature outside of the housing 251 on the basis of, for example, a temperature detected by the temperature sensor 131 provided in the detachable battery 100 that is not electrically operating among the detachable batteries 100 accommodated in a plurality of battery slots 221.

In a reference temperature calculation process, if there is no detachable battery 100 that is not electrically operating, the reference temperature may be obtained on the basis of a temperature detected by the temperature sensor 131 provided inside of the battery replacement device 220 having a shortest total operation time within a prescribed period in the past. In this case, the abnormality determiner 340 of the management server device 300 acquires an operation start time and an operation end time of each battery replacement device 220 included in the control history information I12 and calculates a total operation time within the prescribed period in the past of each battery replacement device 220. The abnormality determiner 340 identifies the battery replacement device 220 having the shortest total operation time and uses a measured temperature value of the temperature sensor 131 provided inside of the battery replacement device 220 to obtain the reference temperature as described above.

In this case, the temperature estimator 330 may estimate a temperature outside of the housing 251 on the basis of the temperature detected by the temperature sensor 131 provided in the detachable battery 100 when a prescribed period of time has elapsed from the previous operation end time point among the detachable batteries 100 that are not electrically operating. Alternatively, when there is no detachable battery 100 that is not electrically operated, the temperature estimator 330 may estimate the temperature outside of the housing 251 on the basis of the temperature detected by the temperature sensor 131 provided in the detachable battery 100 having a smallest total operation amount within a prescribed period in the past among the detachable batteries 100 that are electrically operating. The total operation amount is an example of a total operation time. The total operation amount may be, for example, an amount of generated input/output power other than the total operation time.

When it is determined that an abnormality has occurred in the filter 266 or the fan 254, the abnormality determiner 340 issues an instruction for processing at the time of an abnormality to the notification information output 350 and the control command output 360.

When the instruction for processing at the time of the abnormality is acquired from the abnormality determiner 340, the notification information output 350 outputs information indicating the abnormality as notification information to a prescribed output destination (S107). The output destination may be the terminal devices T1 and T2. The information indicating the abnormality may include information such as an estimated temperature inside of the battery replacement device 220, a difference between the temperature and the threshold value, a difference between the estimated temperature inside of the battery replacement device 220 and the reference temperature, an identifier of the battery replacement device 220, an identifier of the station control device 210 connected to the battery replacement device 220, and a date and time when it is determined that there is an abnormality. The information such as the identifier of the battery replacement device 220, the identifier of the station control device 210 connected to the battery replacement device 220, and the date and time when it is determined that there is an abnormality included in the notification information is an example of information provided for maintenance or servicing of the battery replacement device 220 (power device). That is, the notification information output 350 is a mode of the output that outputs information provided for maintenance or servicing of the battery replacement device 220 (power device) when the temperature inside of the battery replacement device 220 is greater than or equal to a prescribed temperature or when a difference between the temperature inside of the battery replacement device 220 and the reference temperature is greater than or equal to a prescribed value.

When the instruction for processing at the time of the abnormality is acquired from the abnormality determiner 340, the control command output 360 generates a prescribed control command (S108). The control command output 360 may generate information for suppressing the operating state of the battery replacement device 220 as a control command. As an example, the information for suppressing the operating state of the battery replacement device 220 may be information for issuing an instruction to stop charging or discharging the detachable battery 100. Alternatively, the information for suppressing the operating state of the battery replacement device 220 may be information indicating that a charging amount per unit time of the detachable battery 100 or a discharging amount per unit time is decreased as an example. The control command output 360 transmits the generated control command to the station control device 210 connected to the battery replacement device 220 determined to be abnormal (S109).

The station control device 210 receives control commands. The charging/discharging controller 212 of the station control device 210 performs control to suppress the operating state of the battery replacement device 220 determined to be abnormal on the basis of the control command. Specifically, the charging/discharging controller 212 instructs to stop charging or discharging the detachable battery 100 attached to the battery replacement device 220 determined to be abnormal. Alternatively, the charging/discharging controller 212 decreases the charging amount per unit time or the discharging amount per unit time of the detachable battery 100 attached to the battery replacement device 220 determined to be abnormal. Thereby, a series of processing steps ends.

[7. Advantages]

In the first embodiment, the management server device 300 (temperature estimation device) estimates a temperature inside of the housing 251 of the battery replacement device 220 (power device) to which the detachable battery 100 (power storage device) is attached on the basis of a temperature detected by the temperature sensor 131 (temperature detector) provided inside of the detachable battery 100 (power storage device) detachably held in the battery replacement device 220 (power device). According to such a configuration, it is possible to estimate a temperature inside of the housing 251 of the battery replacement device 220 (power device) using the temperature sensor 131 (temperature detector) provided inside of the detachable battery 100 (power storage device) without providing a temperature sensor (temperature detector) inside of the battery replacement device 220 (power device). Accordingly, it is possible to reduce a configuration (the number of components) of the battery replacement device 220 (power device) because it is unnecessary to provide a temperature sensor (temperature detector) inside of the battery replacement device 220 (power device) so that the temperature inside of the housing 251 of the battery replacement device 220 (power device) is estimated. The temperature inside of the housing 251 of the battery replacement device 220 (power device) can be estimated without incurring costs for the battery replacement device 220 by reducing the configuration (the number of components) of the battery replacement device 220 (power device).

Also, in the first embodiment, when the temperature inside of the detachable battery 100 (power storage device) is greater than or equal to a prescribed temperature or when a difference between the internal temperature and the reference temperature is greater than or equal to a prescribed value, the management server device 300 (temperature estimation device) determines that an abnormality has occurred in the filter 266 or the fan 254 (connected path) and provides a notification indicating that an abnormality has occurred in the filter 266 or the fan 254 or suppresses the operating state of the battery replacement device 220 (power device). According to such a configuration, it is possible to determine an abnormality related to the connected path such as the filter 266 or the fan 254 and an abnormality related to the purification device using the temperature sensor 131 (temperature detector) provided inside of the detachable battery 100 (power storage device) even if a sensor is not provided in the inner space of the housing 251 of the battery replacement device 220 (power device). It is possible to reduce a configuration (the number of components) of the battery replacement device 220 (power device) because it is unnecessary to provide a temperature sensor (temperature detector) inside of the battery replacement device 220 (power device) so that an abnormality related to the connected path such as the filter 266 or the fan 254 and an abnormality related to the purification device are determined. Abnormalities related to the connected path such as the filter 266 or the fan 254 and abnormalities related to the purification device can be determined without incurring costs for the battery replacement device 220 by reducing the configuration (number of components) of the battery replacement device 220 (power device). Also, according to such a configuration, when there is an abnormality related to the connected path such as the filter 266 or the fan 254 or an abnormality related to the purification device, the administrator can be notified of the abnormality or the operating state of the battery replacement device 220 (power device) is suppressed, such that it is possible to suppress the occurrence of failures in the detachable battery 100 attached inside of the battery replacement device 220 (power device).

Also, in the first embodiment, the administrator can reduce excess inventory of components such as filters required for maintenance because it is possible to assume when the maintenance of the connected path such as replacement of the filter 266 is necessary by continuously monitoring the temperature inside of the battery replacement device 220 included in the notification information received by the terminal devices T1 and T2. Also, because the administrator can perform maintenance systematically, there is no sudden work, and it becomes easier to make a work plan for workers.

In the present embodiment described above, the battery replacement device 220 (power device) storing the detachable battery 100 can appropriately manage the temperature inside of the housing 251 of the battery replacement device 220. Also, in the present embodiment, the temperature inside of the housing 251 can be appropriately managed without providing a temperature sensor inside of the housing 251 of the battery replacement device 220 that stores the detachable battery 100.

Next, some modified examples will be described.

First Modified Example

All or some of the functional portions of the temperature estimator 330, the abnormality determiner 340, the notification information output 350, the control command output 360, and the storage 370 may be provided inside of the battery replacement station 200 instead of the management server device 300. Even in such a configuration, as in the first embodiment described above, the battery replacement station 200 can appropriately manage a temperature inside of the housing 251 even if a temperature sensor inside of the housing 251 of the battery replacement device (power device) storing the detachable battery 100 is not provided.

Second Modified Example

All or some of the functional portions of the temperature estimator 330, the abnormality determiner 340, the notification information output 350, the control command output 360, and the storage 370 may be provided inside of the battery replacement device 220 instead of the management server device 300. Even in such a configuration, as in the first embodiment described above, the battery replacement device 220 can appropriately manage the temperature inside of the housing 251 even if a temperature sensor inside of the housing 251 of the battery replacement device (power device) storing the detachable battery 100 is not provided.

Any one of the management server device 300, the battery replacement station 200, and the battery replacement device 220 described above may be defined as a temperature estimation device having the configuration described above. The temperature control device includes an estimator. The estimator estimates the temperature of the battery replacement device 220 to which the detachable battery 100 is attached on the basis of the temperature detected by the temperature sensor 131 provided inside of the detachable battery 100 detachably held in the battery replacement device 220. When the temperature inside of the housing 251 of the battery replacement device 220 is greater than or equal to a prescribed temperature or when the difference between the temperature inside of the housing 251 and the reference temperature is greater than or equal to a prescribed value, the temperature control device determines that an abnormality has occurred in the connected path, and a notification indicating that an abnormality has occurred in the connected path is provided, or the operating state of the battery replacement device 220 is suppressed.

Any one of the management server device 300, the battery replacement station 200, and the battery replacement device 220 may be defined as an abnormality countermeasure device having the configuration described above. The abnormality countermeasure device includes an estimator. The estimator estimates the temperature of the battery replacement device 220 to which the detachable battery 100 is attached on the basis of the temperature detected by the temperature sensor 131 provided inside of the detachable battery 100 detachably held in the battery replacement device 220. Also, the abnormality countermeasure device performs at least one corresponding control process among a process of determining that an abnormality has occurred in the battery replacement device 220, a process of providing a notification indicating that an abnormality has occurred in the battery replacement device 220, and a process of suppressing an operating state of the battery replacement device 220 on the basis of a temperature detected by the temperature sensor 131 stored and provided in the battery replacement device 220 that is electrically operating among a plurality of battery replacement devices 220. The abnormality countermeasure device performs a corresponding control process on the basis of the temperature detected by the temperature sensor 131 and other temperatures detected by the temperature sensor 131 provided in the detachable battery 100 that is not electrically operating among the plurality of detachable batteries 100.

OTHER EMBODIMENTS

In the first embodiment described above, the management server device 300 estimates a temperature inside of the battery replacement device 220 (power device) on the basis of the temperature detected by the temperature sensor 131 (temperature detector) provided inside of the detachable battery 100 (power storage device). In the first embodiment described above, the management server device 300 performs a process of determining that an abnormality has occurred in the connected path such as the exhaust port 253, a process of providing a notification indicating that an abnormality has occurred in the connected path, or a process of suppressing an operating state of the battery replacement device 220 (power device) when the temperature inside of the battery replacement device 220 (power device) is greater than or equal to a prescribed temperature or when a difference between the internal temperature and the reference temperature is greater than or equal to a prescribed value. However, the management server device 300 may be configured to perform a process of determining that an abnormality has occurred in the connected path such as the exhaust port 253, a process of providing a notification indicating that an abnormality has occurred in the connected path, or a process of suppressing an operating state of the battery replacement device 220 (power device) on the basis of a difference between a temperature detected by the temperature sensor 131 (temperature detector) provided inside of the detachable battery 100 (power storage device) that is operating and a temperature detected by the temperature sensor 131 (temperature detector) provided inside of the detachable battery 100 (power storage device) that is not operating. An example in this case will be described below.
[Processing Flow]

Next, a processing flow related to temperature estimation in another embodiment will be described.

Figure 14:
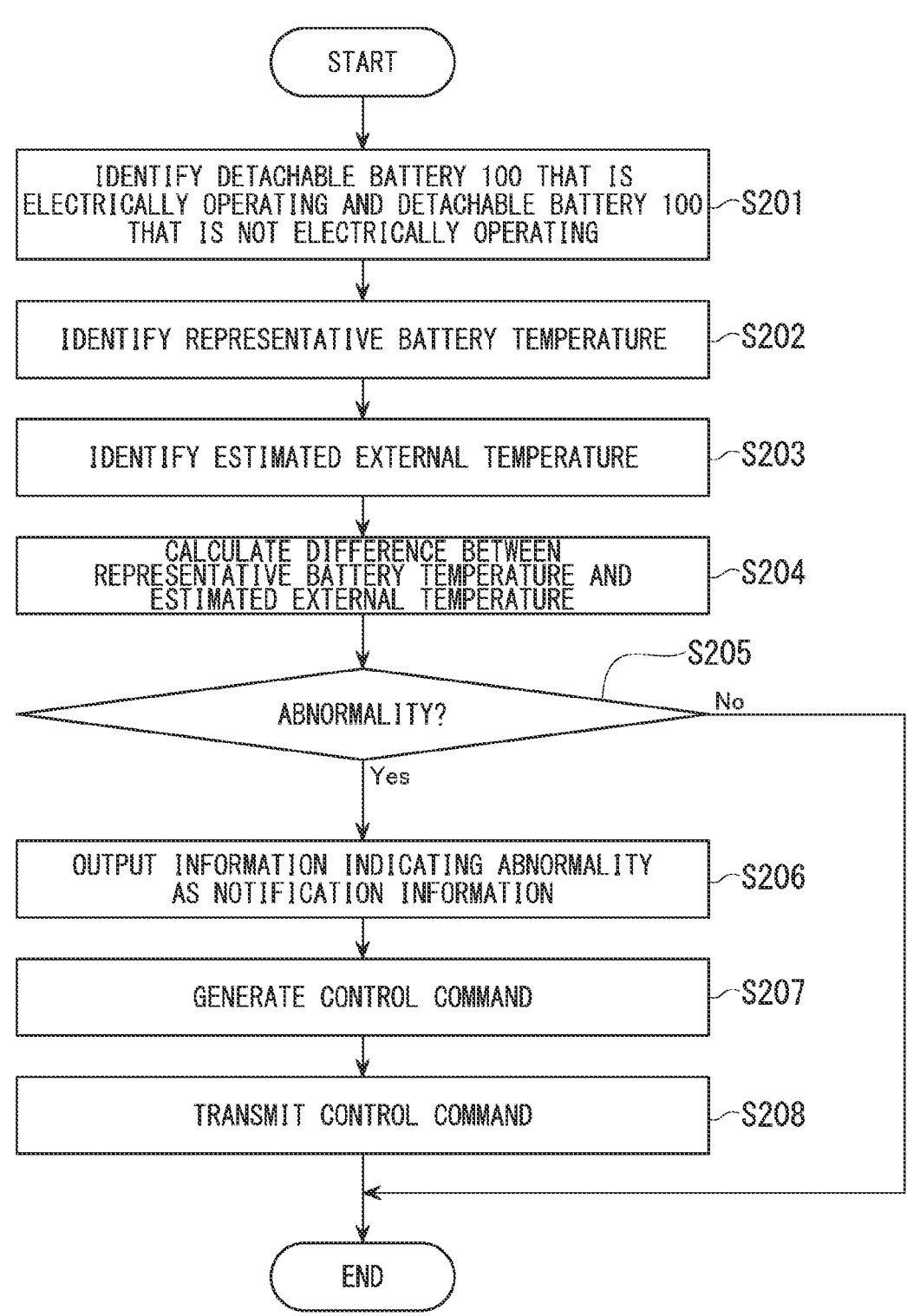
FIG. 14 is a second flowchart showing an example of a processing flow of the station control device.

FIG. 14 is a second flowchart showing an example of a processing flow of the station control device 210.

When a state in which the detachable battery 100 is attached to the battery replacement device 220 is detected from the state history information I21, the temperature estimator 330 starts the following processing flow.

The temperature estimator 330 identifies a detachable battery 100 that is electrically operating and a detachable battery 100 that is not electrically operating on the basis of the control history information I12 acquired from the battery replacement station 200 (S201). For example, the temperature estimator 330 identifies the identifier of the detachable battery 100 in which the charging start time or the discharging start time information is not recorded in association with the charging end time or the discharging end time in a state in which information of the charging end time or the discharging end time is associated and recorded in the control history information I12 and identifies the detachable battery 100, which is electrically operating, among these detachable batteries 100. The temperature estimator 330 identifies a detachable battery 100, which is not identified as the detachable battery 100, as a detachable battery 100, which is not electrically operating. The temperature estimator 330 may identify identifiers of the detachable batteries 100 recorded in association with the charging end time and the discharging end time recorded in the control history information I12 and identify the detachable batteries 100 as a detachable battery 100, which is not electrically operating.

The temperature estimator 330 detects a temperature of each detachable battery 100 that is electrically operating on the basis of the battery state information I13 acquired from the station control device 210. When there are a plurality of detachable batteries 100 that are electrically operating, the temperature estimator 330 identifies a highest temperature among these temperatures as a representative battery temperature (S202). When there are a plurality of detachable batteries 100 that are electrically operating, the temperature estimator 330 may calculate an average of their temperatures and identify the calculated average as the representative battery temperature. When there is one detachable battery 100 that is electrically operating, the temperature estimator 330 may identify the temperature as the representative battery temperature.

The temperature estimator 330 detects the temperature of each detachable battery 100 that is not electrically operating on the basis of the battery state information I13 acquired from the station control device 210. When there are a plurality of detachable batteries 100 that are not electrically operating, the temperature estimator 330 identifies a lowest temperature among these temperatures as an estimated external temperature (S203). The estimated external temperature may be a temperature outside of the housing 251 of the battery replacement device 220. When there are a plurality of detachable batteries 100 that are not electrically operating, the temperature estimator 330 may calculate an average of their temperatures and identify the calculated average as the estimated external temperature. When there is one detachable battery 100 that is electrically operating, the temperature estimator 330 may identify its temperature as the estimated external temperature. The notification information output 350 may output at least one of the calculated representative battery temperature and the estimated external temperature as notification information to a prescribed output destination. The output destination may be the terminal devices T1 and T2.

The abnormality determiner 340 determines whether or not an abnormality has occurred in the filter 266 or the fan 254 on the basis of results of calculating the representative battery temperature and the estimated external temperature in the temperature estimator 330. Specifically, the abnormality determiner 340 calculates a difference between the representative battery temperature and the estimated external temperature (S204). Also, because the representative battery temperature is the temperature of the detachable battery 100 that is electrically operating, the representative battery temperature is greater than the estimated external temperature. The abnormality determiner 340 determines whether or not a difference between the representative battery temperature and the estimated external temperature is greater than or equal to a prescribed threshold value (S205). The abnormality determiner 340 determines that an abnormality has occurred in the filter 266 or the fan 254 when the difference between the representative battery temperature and the estimated external temperature is greater than or equal to the prescribed threshold value. Also, the abnormality determiner 340 may determine that an abnormality has occurred in the filter 266 or the fan 254 when the representative battery temperature is greater than or equal to a prescribed value. The determination that these abnormalities have occurred is a mode of the process of determining that abnormalities have occurred in the connected path.

Also, the abnormality determiner 340 of the management server device 300 may be configured to obtain an estimated external temperature on the basis of the temperature outside of the housing 251 of the battery replacement device 220. In this case, the information acquirer 310 of the management server device 300 may receive the measured temperature value of the temperature sensor provided outside of the housing 251 of the battery replacement device 220 from the battery replacement device 220 via the station control device 210 and calculate the estimated external temperature using the temperature value. The estimated external temperature may be a temperature value itself measured by the temperature sensor provided outside of the housing 251 of the battery replacement device 220, may be calculated by multiplying the temperature value by any coefficient, or may be calculated by performing an input to a prescribed estimated external temperature calculation formula.

In calculating the estimated external temperature, if there is no battery replacement device 220, which is not electrically operating, the estimated external temperature may be obtained on the basis of the temperature detected by the temperature sensor 131 provided inside of the battery replacement device 220 having a shortest total operation time within a prescribed period in the past. In this case, the abnormality determiner 340 of the management server device 300 acquires the operation start time and the operation end time of each battery replacement device 220 included in the control history information I12 and calculates the total operation time within the prescribed period in the past of each battery replacement device 220. The abnormality determiner 340 identifies the battery replacement device 220 having the shortest total operation time and obtains the estimated external temperature as described above using the measured temperature value of the temperature sensor 131 provided inside of the battery replacement device 220.

When it is determined that an abnormality has occurred in the filter 266 or the fan 254, the abnormality determiner 340 issues an instruction for processing at the time of an abnormality to the notification information output 350 and the control command output 360.

When the instruction for processing at the time of the abnormality is acquired from the abnormality determiner 340, the notification information output 350 outputs information indicating the abnormality as notification information to a prescribed output destination (S206). The output destination may be the terminal devices T1 and T2. The information indicating the abnormality may include information such as the representative battery temperature, the estimated external temperature, the difference between the representative battery temperature and the estimated external temperature, the identifier of the battery replacement device 220 storing the detachable battery 100 for which the temperatures are estimated, the identifier of the station control device 210 connected to the battery replacement device 220, and the date and time when it is determined that there is an abnormality. This information such as the identifier of the battery replacement device 220, the identifier of the station control device 210 connected to the battery replacement device 220, and the date and time when it is determined that there is an abnormality included in the notification information is an example of information provided for maintenance or servicing of the battery replacement device 220 (power device). That is, the notification information output 350 is a mode of an output that outputs information provided for maintenance or servicing of the battery replacement device 220 (power device) when the difference between the temperature of the detachable battery 100, which is electrically operating, and the temperature of the detachable battery 100, which is not electrically operating, is greater than or equal to a prescribed value.

When an instruction for processing at the time of the abnormality is acquired from the abnormality determiner 340, the control command output 360 generates a prescribed control command (S207). The control command output 360 may generate information for suppressing the operating state of the battery replacement device 220 as a control command. As an example, the information for suppressing the operating state of the battery replacement device 220 may be information for instructing to stop charging or discharging the detachable battery 100. Alternatively, the information for suppressing the operating state of the battery replacement device 220 may be information indicating that a charging amount per unit time or a discharging amount per unit time of the detachable battery 100 is decreased as an example. The control command output 360 transmits the generated control command to the station control device 210 connected to the battery replacement device 220 determined to be abnormal (S208).

The station control device 210 receives control commands. The charging/discharging controller 212 of the station control device 210 performs a control process of suppressing the operating state of the battery replacement device 220 determined to be abnormal on the basis of the control command. Specifically, the charging/discharging controller 212 instructs to stop charging or discharging the detachable battery 100 attached to the battery replacement device 220 determined to be abnormal. Alternatively, the charging/discharging controller 212 decreases the charging amount per unit time or the discharging amount per unit time of the detachable battery 100 attached to the battery replacement device 220 determined to be abnormal. Thereby, a series of processing steps ends.

[Advantages]

In the present embodiment, the management server device 300 (temperature estimation device) estimates (determines) the temperature of the detachable battery 100 (power storage device) on the basis of a temperature detected by the temperature sensor 131 (temperature detector) provided inside of the detachable battery 100 (power storage device) detachably held in the battery replacement device 220 (power device). According to such a configuration, the temperature of the detachable battery 100 (power storage device) can be estimated (identified) without including a temperature sensor (temperature detector) inside of the battery replacement device 220 (power device). Accordingly, because there is no need to provide a temperature sensor (temperature detector) inside of the battery replacement device 220 (power device) to estimate the temperature of the detachable battery 100 (power storage device), it is possible to reduce the configuration (the number of components) of the battery replacement device 220 (power device). Also, the temperature of the detachable battery 100 (power storage device) can be estimated without incurring a cost for the battery replacement device 220 by reducing the configuration (the number of components) of the battery replacement device 220 (power device).

Also, in the present embodiment, the management server device 300 (temperature estimation device) determines that an abnormality has occurred in the filter 266 or the fan 254 (connected path) when a difference between the representative temperature of the detachable battery 100 (power storage device) and the estimated external temperature greater than or equal to a prescribed value or when a value of the representative temperature of the detachable battery 100 (power storage device) is greater than or equal to a prescribed threshold value and provides a notification indicating that there is an abnormality in the filter 266 or the fan 254, or suppresses the operating state of the battery replacement device 220 (power device). According to this configuration, abnormalities in the connected path such as the filter 266 or the fan 254 and abnormalities in the purification device can be determined using the temperature sensor 131 (temperature detector) provided inside of the detachable battery 100 (power storage device), without requiring a sensor to be provided in the internal space of the housing 251 of the battery replacement device 220 (power device). Because it is not necessary to provide a temperature sensor (temperature detector) inside the battery replacement device 220 (power device) to determine an abnormality in the connected path such as the filter 266 or the fan 254, and an abnormality in the cleaning device, the configuration (the number of components) of the battery replacement device 220 (power device) can be reduced. By reducing the configuration (the number of components) of the battery replacement device 220 (power device), an abnormality in the connected path such as the filter 266 or the fan 254 and an abnormality in the purification device can be determined without incurring additional costs for the battery replacement device 220. Also, according to this configuration, if there is an abnormality in the connected path such as the filter 266 or the fan 254 or an abnormality in the purification device, the administrator can be notified of the abnormality, or the occurrence of malfunctions in the detachable battery 100 installed inside of the battery replacement device 220 (power device) can be suppressed by suppressing the operation state of the battery replacement device 220 (power device).

Also, in the present embodiment, the administrator can reduce the surplus inventory of components necessary for maintenance, such as filters, because it is possible to assume when maintenance work of a connected path such as replacing the filter 266 will be required by continuously monitoring the representative battery temperature contained in the notification information received by the terminal devices T1 and T2 or the difference between the representative battery temperature and the estimated external temperature. Also, because the administrator can schedule planned maintenance work, it is possible to eliminate the need for emergency work and easily create work schedules for the worker.

Second Embodiment

Next, a second embodiment will be described. As compared with the first embodiment, in a battery sharing service system of the second embodiment, configurations of the battery replacement device 230 (FIG. 15) and the management server device 400 (FIG. 16) are mainly different. Hereinafter, the battery sharing service of the second embodiment will be described focusing on the differences from the first embodiment. In the following description, the description of members and functions identical to those of the first embodiment may be omitted by assigning the same reference signs thereto.

Figure 15:
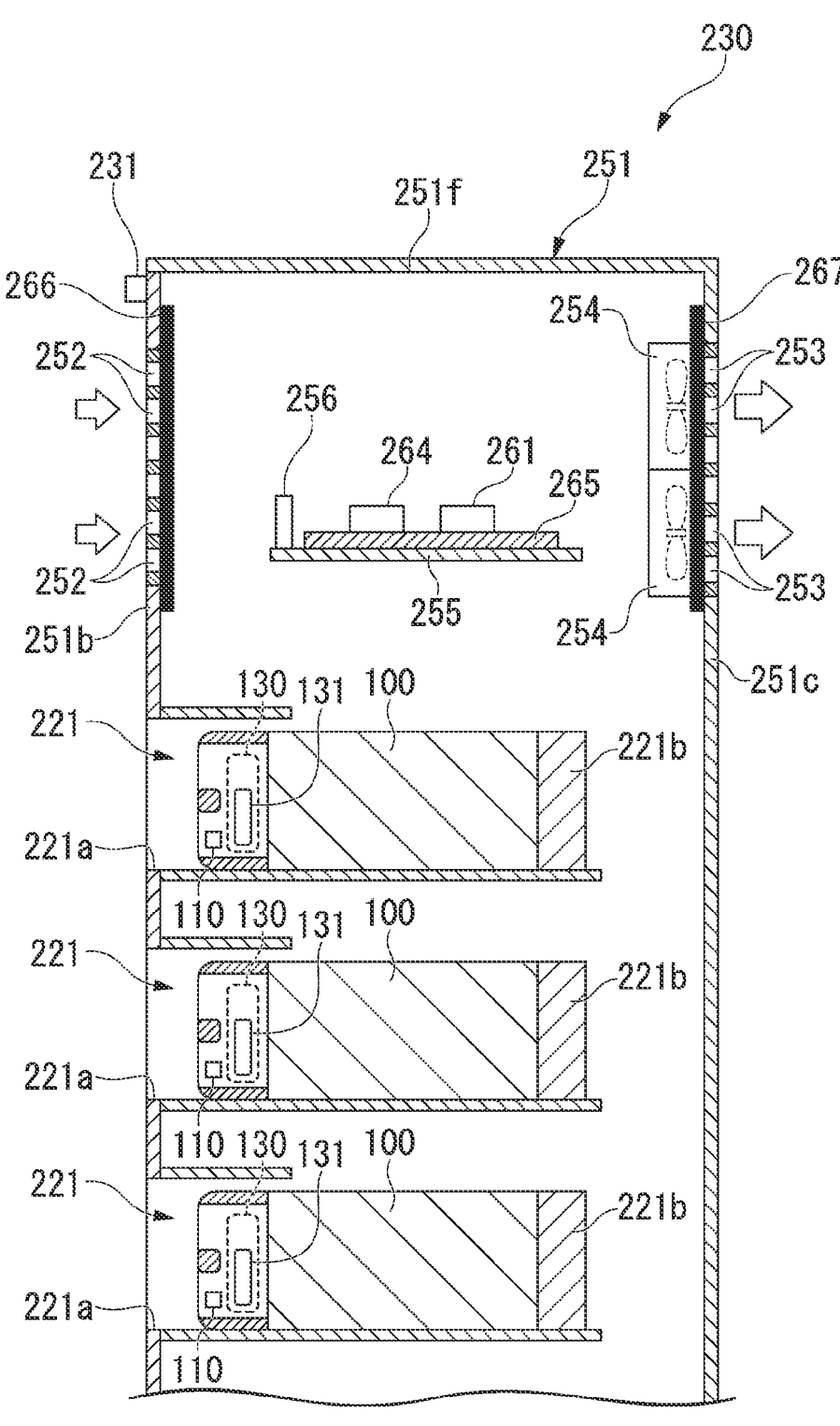
FIG. 15 is a cross-sectional view showing an example of a battery replacement device 230 of a second embodiment.

The battery replacement device 230 of the second embodiment will be described. FIG. 15 is a cross-sectional view showing an example of the battery replacement device 230 of the second embodiment. The battery replacement device 230 of the second embodiment is mainly different in that an external temperature sensor 231 and a fan control board 256 are provided as compared with the battery replacement device 220 of the first embodiment.

The external temperature sensor 231 is provided, for example, above a filter 266 at an upper part of a front wall 251b outside of a housing 251. The external temperature sensor 231 detects an air temperature outside of the housing 251 (hereinafter referred to as an external temperature). The external temperature sensor 231 is arranged at a position closer to an intake port 252 than an exhaust port 253. The external temperature sensor 231 is an example of an "air temperature detector" and an "external temperature detector."

On the intake side of the housing 251, because there is no relatively high heat air exhausted from the housing 251, the temperature of the external air can be accurately detected. The external temperature sensor 231 is provided outside of the housing 251, but may be provided at other positions. The external temperature sensor 231 may be provided inside of the housing 251. The external temperature sensor 231 may be provided below the filter 266 or on the rear wall 251c.

The external temperature sensor 231 outputs the detected external temperature information to the station control device 210. The station control device 210 transmits the external temperature information output by the external temperature sensor 231 to the management server device 400 by the information output 214. The battery replacement device 230 is an example of a "power device." The information output 214 is an example of a "transmission unit."

The battery replacement device 230 includes a detachable battery 100 attached to the battery replacement device 230, as in the first embodiment. The detachable battery 100 includes a power storage 120. The battery replacement device 230 includes a battery slot 221 that detachably accommodates the detachable battery 100. The detachable battery 100 is an example of a "power storage device." The detachable battery 100 of the second embodiment is detachable with respect to the battery replacement device 230, but may be attached to the battery replacement device 230 non-detachable. When the battery slot 221 accommodates the detachable battery, the housing 251 accommodates the power storage 120.

The battery replacement device 230 includes the fan control board 256 that controls the fan 254 in addition to the fan 254 as in the first embodiment. The fan 254 supports the flow of air inside and outside of the housing 251. The fan 254 includes a motor and blades. The fan 254 is driven according to the control of the fan control board 256. The fan 254 is an example of a "wind generation unit" and a "cooling fan."

The fan control board 256 rotates the blades to operate the fan 254 by driving the motor of the fan 254 while the battery replacement device 230 is in use. The fan control board 256 drives and controls the fan 254 on the basis of, for example, the external temperature detected by the external temperature sensor 231 and the temperature inside of the battery replacement device 230 (hereinafter referred to as an internal temperature) estimated by the temperature estimator 330 of the management server device 400. The fan control board 256 is provided independently of the control board 273, but may be provided as part of the control board 273.

The internal temperature may be a temperature other than the temperature estimated by the temperature estimator 330, for example, a temperature detected by an internal temperature sensor that detects the temperature inside of the battery replacement device 230. The internal temperature sensor may detect the air temperature inside of the battery replacement device 230, may detect the temperature of a component provided inside of the battery replacement device 230, or may be a temperature calculated on the basis of these temperatures.

The fan control board 256 sets the operation time of the fan 254 per unit time on the basis of, for example, the external temperature detected by the external temperature sensor 231. The fan control board 256 adjusts an operation time of the fan 254 (hereinafter referred to as a fan operation time) on the basis of the internal temperature estimated by the temperature estimator 330 while the fan 254 is operated. For example, by rotating the fan 254, the internal temperature decreases and approaches the external temperature. As the internal temperature decreases, the fan control board 256 gradually reduces the operation time of the fan 254. When a degree of decrease in the internal temperature is low, the amount of decrease of the operation time in the fan 254 is reduced.

The fan control board 256 operates the fan 254 intermittently. The fan operation time here is the operation time of the fan 254 per unit time. Therefore, for example, when the fan 254 is operated with constant motive power, the cooling capacity of the battery replacement device 230 due to the operation of the fan 254 increases as the fan operation time increases.

The fan control board 256 terminates the control to rotate the fan 254 when the internal temperature drops to a prescribed cooling completion temperature. The cooling completion temperature may be a constant temperature or a temperature adjusted in accordance with an external temperature or the like. The fan control board 256 measures and detects the time that the fan 254 is operating. The information output 214 transmits information of the fan operation time detected by the fan control board 256 to the management server device 300.

The fan control board 256 transmits information during an operation indicating that the fan 254 is operating to the management server device 300 as information about the operation, and the fan operation time may be measured in accordance with a period of time in which the management server device 300 is receiving the information during the operation. The fan operation time is an example of an "operation amount." The fan control board 256 is an example of an operation amount detector.

As in the first embodiment, an intake port 252 that takes in air into the housing 251 is open on the front wall 251b of the housing 251 in the battery replacement device 230 and an exhaust port 253 that exhausts the air inside of the housing 251 is open on the rear wall 251c. A space between the intake port 252 and the exhaust port 253 in the housing 251 is a flow path along which air flows. A filter 266 is provided in the intake port 252 of the housing 251. The filter 266 purifies the air flowing into the housing 251. The filter 266 is an example of a "purification device."

In the second embodiment, the fan 254 is provided as a cooling device for cooling the battery replacement device 230, but a cooling device for cooling the battery replacement device 230 may be provided in place of or in addition to the fan 254. As the cooling device, for example, a heat exchanger such as another air-cooled device or a water-cooled radiator may be used. Alternatively, a heating device such as a heater that heats the battery replacement device 230 may be provided in the battery replacement device 230 in consideration of the case where the battery replacement device 230 is installed in a cold region and the like.

Figure 16:
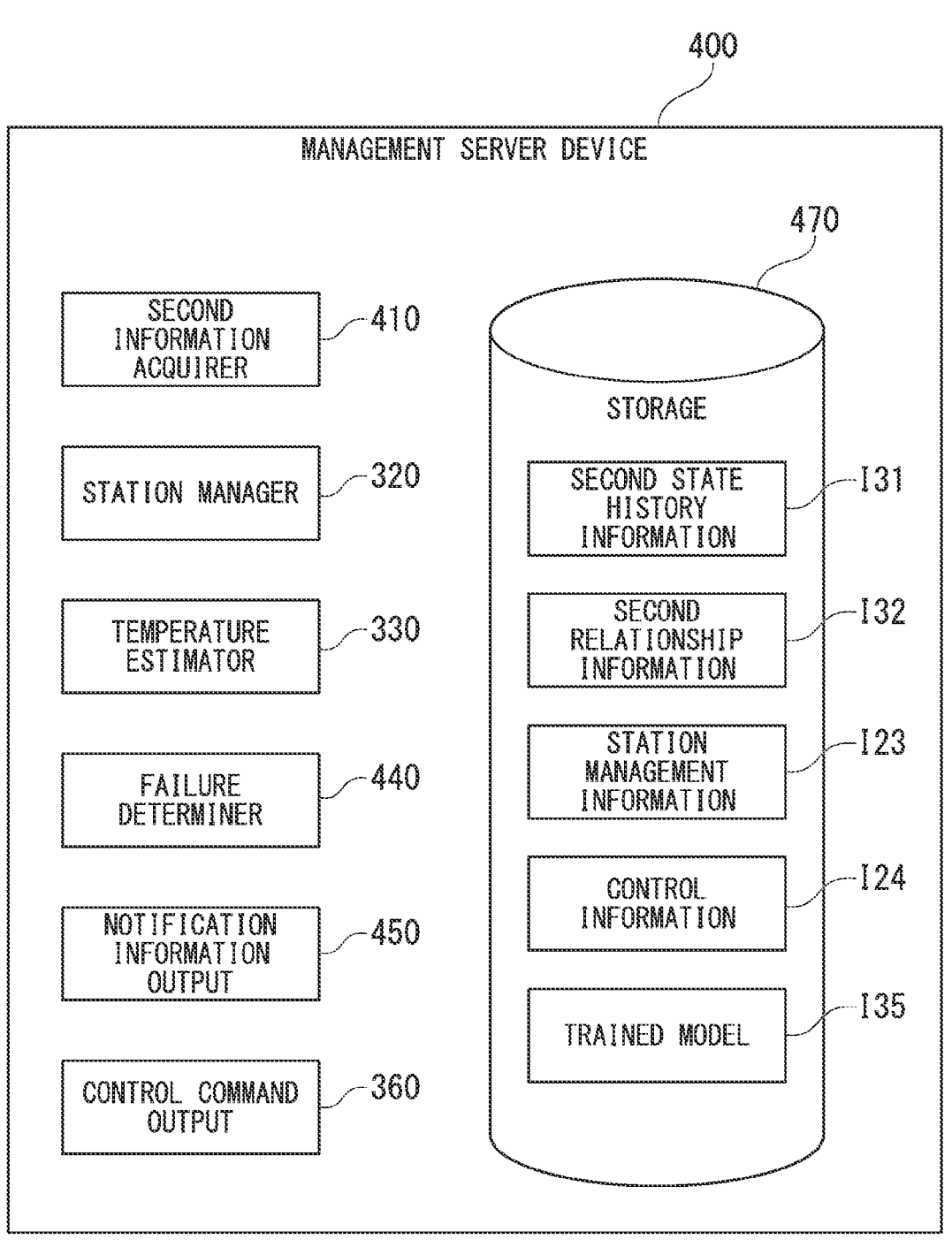
FIG. 16 is a block diagram showing an example of a system configuration of a management server device 400 of the second embodiment.

Next, the management server device 400 of the second embodiment will be described. FIG. 16 is a block diagram showing an example of a system configuration of the management server device 400 of the second embodiment. The management server device 400 of the second embodiment includes, for example, a second information acquirer 410, a station manager 320, a temperature estimator 330, a comparator 430, a failure determiner 440, a notification information output 450, a control command output 360, and a storage 470. The management server device 400 is an example of an "information processing device."

The storage 470 stores, for example, second state history information I31, second relationship information I32, station management information I23, control information I24, and a trained model 135. The second state history information I31 includes information of an external temperature and fan operation time (hereinafter referred to as determination target information). The second relationship information I32 includes a relationship between the external air temperature and the operation amount (hereinafter referred to as a second relationship) during the use of the battery replacement device 230.

The second relationship is, for example, a correlation obtained in a machine learning process for the relationship between the air temperature outside of the housing 251 and the operation amount of the fan 254 during the use of the battery replacement device 230. The second relationship is stored in the storage 470 as obtained in advance. The second relationship is an example of a "prescribed relationship." The storage 470 is an example of a "correlation storage." The storage 470 is an example of a "model storage." The station management information I23 and the control information I24 are similar to those of the first embodiment.

Machine learning is, for example, unsupervised learning in which a second relationship is input data. In unsupervised learning, a trained model modeled by learning patterns and features contained in a plurality of pieces of input data is generated. Machine-free learning includes, for example, methods such as clustering, association analysis, estimation of probability distribution, principal component analysis, correspondence analysis, canonical correlation analysis, and independent component analysis.

When the unsupervised learning is used for abnormality detection, for example, a method of linking the obtained results to the conclusion of whether or not there is an abnormality is required. Thus, for example, if the probability of occurrence of data is known, a simple determination criterion that "there is an abnormality if the probability is low" can be adopted, such that estimation of the probability distribution is preferably used for abnormality detection. Abnormality detection using probability distribution is executed in, for example, a procedure of estimating the probability distribution of input data, deriving the probability of occurrence of new input using the probability distribution, and regarding data as abnormal data that deviates greatly from typical behavior if the probability of occurrence is less than or equal to a certain probability.

In unsupervised learning, there is no need to provide data with examples of correct answers as in supervised learning. Thus, by using machine learning as unsupervised learning, the time and cost of creating correct answer examples can be omitted. Instead of unsupervised learning, machine learning may be supervised learning using, for example, the external temperature and fan operation time acquired by the second information acquirer 410 and stored in the storage 470 as training data.

The second information acquirer 410 acquires an external temperature and a fan operation time transmitted from each battery replacement station 200. The second information acquirer 410 includes the acquired information in the second state history information I31 as determination target information and stores the information in the storage 470. The second information acquirer 410 is an example of a "temperature acquirer" and an "operation amount acquirer." The second information acquirer 410 may notify the failure determiner 440 as it is without storing determination target information in the storage 470.

The comparator 430 calculates a relationship between the external temperature and the fan operation time in the determination target information included in the second state history information (hereinafter referred to as a determination target relationship). The comparator 430 stores the calculated determination target relationship in the storage 370. The comparator 430 compares the calculated determination target relationship with a plurality of determination target relationships calculated before the determination target relationship is calculated. The calculated determination target relationship is an example of an "observed amount." The plurality of determination target relationships calculated before the determination target relationship is calculated are examples of a "reference amount."

The failure determiner 440 executes the following deviation determination process of determining whether or not there is deviation in the determination target relationship on the basis of the comparison result of the comparator 430. The deviation of the determination target relationship includes, for example, the deviation of the determination target relationship from the second relationship included in the second relationship information I32 stored in the storage 470. The failure determiner 440 is an example of a "determiner."

The failure determiner 440 may determine the presence or absence of deviation in the determination target relationship by inputting external temperature information and state history information included in the second state history information I31 to the trained model 135 stored in the storage 470, in place of or in addition to a mode in which abnormalities are detected in the battery replacement device 230 on the basis of the second relationship included in the second relationship information.

When the trained model 135 is used, the failure determiner 440 determines whether or not there is deviation in the determination target relationship on the basis of the input result of inputting the determination target relationship included in the second state history information I31 to the trained model 135. The trained model 135 is, for example, a model in which the temperature outside of the housing 251 and the operation amount of the fan 254 are input data.

The failure determiner 440 determines the failure occurred in the fan 254 on the basis of a result of the deviation determination process. The failure occurred in the fan 254 is an example of an abnormal change occurred in the fan 254 (an abnormality in the fan 254). When the fan 254 has failed, the cooling capacity of the fan 254 decreases. The failure of the fan 254 is an example of an "abnormality that reduces the cooling capacity."

For example, as a result of the deviation determination process, the failure determiner 440 determines that a failure has occurred in the fan 254 when the determination target relationship deviates from the second relationship and the fan operation time for the external temperature in the determination target relationship is longer than that in the second relationship. Examples of the failure of the fan 254 include a failure in which the cooling capacity decreases due to a loss of blades or deterioration of the motor.

In addition to the processing described in the first embodiment, the notification information output 450 generates second notification information for notifying that the fan 254 has failed and requesting a countermeasure for the failure of the fan 254, as a processing result (a determination result) of the failure determiner 440, when it is determined that the fan 254 has failed. The second notification information is, for example, information for requesting maintenance and ordering of a component in accordance with the failure of the fan 254.

The notification information output 450 transmits the generated second notification information to the terminal device T1 used by the administrator P1 who manages the battery sharing service system 1 and the terminal device T2 used by the security guard P2 in charge of each battery replacement station. The notification information output 450 requests the terminal devices T1 and T2 to perform maintenance and ordering of a component by transmitting the second notification information. Upon receiving the request, the terminal devices T1 and T2 provide notifications of the second notification information in a screen output process or an audio output process. The notification information output 450 is an example of a "countermeasure executer." The station manager 320, the temperature estimator 330, and the control command output 360 are similar to those of the first embodiment.

Next, a processing flow of the management server device 400 in the second embodiment will be described.

Figure 17:
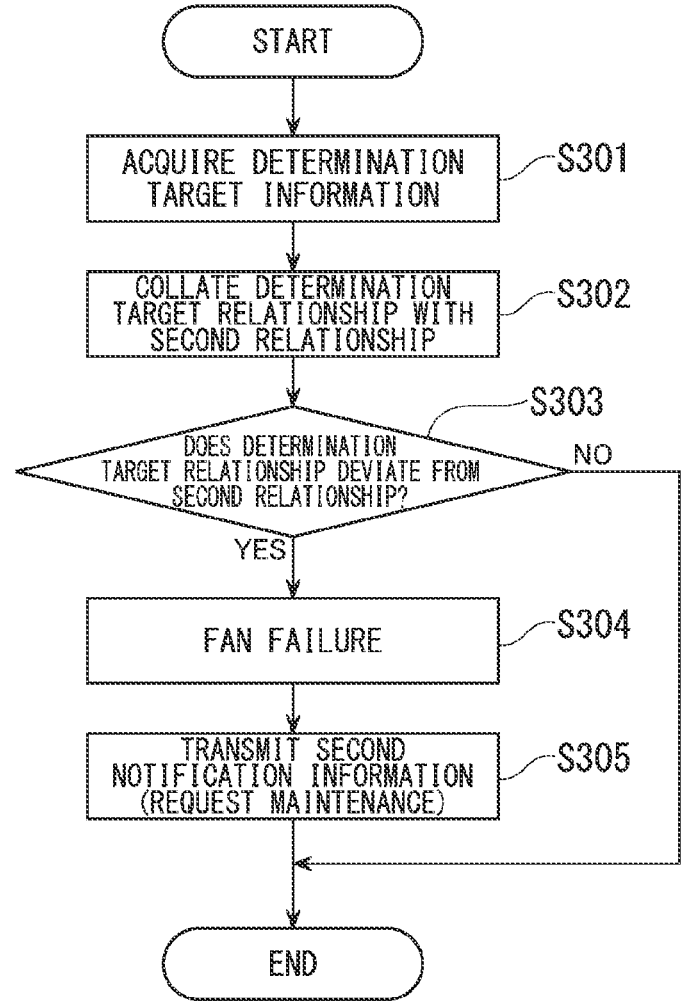
FIG. 17 is a flowchart showing an example of a processing flow of the management server device 400 of the second embodiment.

FIG. 17 is a flowchart showing an example of the processing flow of the management server device 400 of the second embodiment.

When the management server device 400 receives the determination target information transmitted by the station control device 210 of the battery replacement station 200, the flow starts as follows.

The second information acquirer 410 acquires the determination target information by receiving the determination target information transmitted by the station control device 210 (S301). The second information acquirer 410 stores the acquired determination target information as the second state history information I31 in the storage 470.

Figure 18:
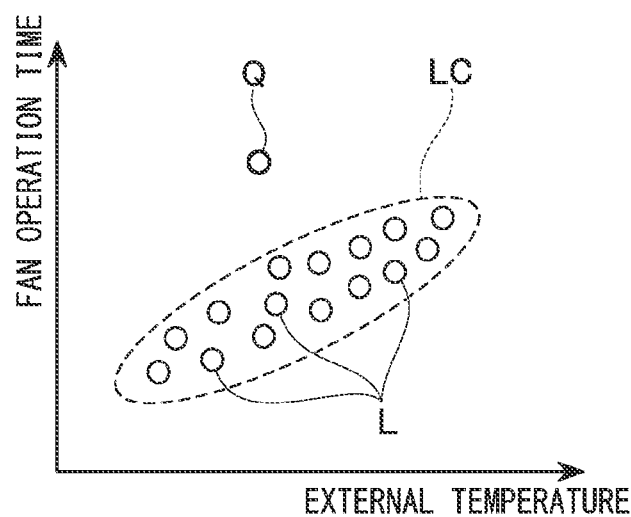
FIG. 18 is a diagram showing an example of a second relationship.

The failure determiner 440 collates the determination target relationship indicated in the determination target information included in the second state history information I31 stored in the storage 470 with the second relationship included in the second relationship information I32 stored in the storage 470 (S302). The failure determiner 440 determines whether or not the determination target relationship deviates from the second relationship (S303). Here, the second relationship included in the second relationship information I32 will be described. FIG. 18 is a diagram showing an example of the second relationship.

The second relationship included in the second relationship information I32 includes a learning value group LC including a large number of learning values L of a fan operation time for the external temperature when the battery replacement device 230 is in use. The failure determiner 440 compares the learning value group LC with the fan operation time Q of the determination target relationship indicated in the determination target information included in the second state history information I31. In the example of FIG. 18, the fan operation time Q for the external temperature indicated by the determination target relationship is longer than the fan operation time for the external temperature included in the learning value group LC and the fan operation time Q for the determination target relationship is outside of the learning value group LC. In this case, it is determined that the determination target relationship deviates from the second relationship.

In step S303, when it is determined that the determination target relationship deviates from the second relationship, the failure determiner 440 determines that a failure has occurred in the fan 254 (S304). When the cooling capacity of the fan 254 decreases, the operation time of the fan 254 becomes relatively long, such that the fan operation time for the external temperature in the determination target relationship becomes longer than that in the second relationship. Thus, the failure determiner 440 determines that an abnormality in which the cooling capacity of the fan 254 decreases has occurred when the fan operation time for the external temperature in the determination target relationship becomes longer than that in the second relationship.

The notification information output 450 generates second notification information for requesting maintenance of the failure of the fan 254 determined by the failure determiner 440 and transmits the second notification information to the terminal devices T1 and T2 (S305). When it is determined that the determination target relationship does not deviate from the second relationship, the failure determiner 440 determines that no failure has occurred in the fan 254 and the management server device 400 terminates the process shown in FIG. 17.

In the second embodiment, the management server device 400 (information processing device) determines whether or not there is deviation in the determination target relationship on the basis of the second relationship and the determination target relationship during the use of the battery replacement device 230 (power device) obtained in advance. According to such a configuration, it is possible to inspect various types of equipment and detect an abnormality in the power device in a simple configuration.

MODIFIED EXAMPLES

Although the relationship between the external temperature detected by the external temperature sensor 231 and the fan operation time is set as the determination target relationship in the second embodiment, the internal temperature may be used in place of or in addition to the external temperature. In this case, the internal temperature may be acquired by measuring the temperature inside of the housing 251 using an internal temperature sensor that detects the temperature inside of the housing 251 or may be acquired by performing an estimation process using a measurement result of the temperature sensor 131 for measuring the temperature of the detachable battery 100 in the temperature estimator 330 as described in the first embodiment. The temperature sensor 131 is an example of a "temperature detector."

Although the failure determiner 440 performs the deviation determination process for determining whether or not there is deviation in the determination target relationship and determines the failure of the fan 254 based on the deviation determination process in the second embodiment, the failure determiner 440 may determine an abnormal change (abnormal flow change) in the flow path of the housing 251 in place of or in addition to these processes. The failure determiner 440 may execute a process of determining the occurrence of another abnormal change in a flow path of the fan 254 or the housing 251.

The failure determiner 440 may determine the deterioration of, for example, an electric component accommodated in the housing 251 and arranged in the flow path, for example, an electric circuit or the DC/DC converter 271 as another abnormal change in the flow path of the fan 254 or the housing 251. For example, when a component such as the DC/DC converter 271 deteriorates, even if the air temperature within the housing 251 is the same, the temperature rise increases as compared with the electric component that has not deteriorated. Thus, an abnormality of an electric component is an abnormality according to heat generation.

When an abnormality occurs in these electric components, the fan operation time for the external temperature in the determination target relationship becomes longer than that in the second relationship. Thus, the failure determiner 440 determines, for example, that an abnormality in which the electric component deteriorates has occurred when the fan operation time for the external temperature in the determination target relationship becomes longer than that in the second relationship. The deterioration degree of the electric component may be determined in accordance with the length of the fan operation time for the external temperature in the determination target relationship.

The failure determiner 440 may determine prescribed deterioration or more (abnormal flow change) in the flow path of the fan 254 or the housing 251 as another abnormal change in the flow path of the fan 254 or the housing 251. The abnormal change occurred in the flow path of the fan 254 or the housing 251 may be, for example, an abnormal change in the deterioration of the flow path of the fan 254 or the housing 251 over time or the clogging of the filter 266 provided in the intake port 252 of the flow path.

For example, if the filter 266 becomes clogged, an amount of external air flowing into the housing 251 decreases and a decrease in cooling efficiency for the operation time period of the fan 254 is caused, such that the fan operation time for the external temperature in the determination target relationship will be longer than that in the second relationship. Thus, the failure determiner 440 determines, for example, that the filter 266 is clogged when the fan operation time for the external temperature in the determination target relationship becomes longer than that in the second relationship. Clogging of the filter 266 is an example of "prescribed deterioration or more in the flow path." In accordance with the length of the fan operation time for the external temperature in the determination target relationship, the degree of clogging of the filter 266 may be determined.

The management server device 400 may include a necessity determiner that determines the necessity of suppressing the operation of the battery replacement device 230 in place of or in addition to the failure determiner 440 that determines an abnormality that has occurred in the flow path of the fan 254 or the housing 251. For example, the necessity determiner may determine whether or not the determination target relationship deviates from the second relationship and determine that the operation of the battery replacement device 230 is suppressed when the determination target relationship deviates from the second relationship. The suppression of the operation of the battery replacement device 230 may be, for example, blockage of the operation of the battery replacement device 230 or reduction of the operation amount of the battery replacement device 230.

The blockage of the operation of the battery replacement device 230 may be, for example, blockage of charging and discharging of the detachable battery 100 via the battery slot 221. The suppression of the operation of the battery replacement device 230 may be, for example, the reduction in the number of battery slots 221 where the detachable battery 100 can be charged and discharged and the reduction in an available charging/discharging time.

When the second notification information is transmitted, the notification information output 450 may transmit a station ID of the battery replacement station 200 including the battery replacement device 230 in which the fan 254 has failed, geographical location information, and information for performing maintenance work (maintenance information) together. For example, the notification information output 450 may generate an image representing information, particularly geographical location information, and transmit the image together with the second notification information.

The notification information output 450 may generate notification information for requesting a process of eliminating the clogging of the filter 266, for example, the cleaning or replacement of the clogged filter 266, when the failure determiner 440 determines that the filter 266 has been clogged, and transmit the notification information to the terminal devices T1 and T2. When the failure determiner 440 determines the deterioration of an electronic component, the notification information output 450 may generate notification information for requesting a process according to the deterioration of the electronic component, for example, maintenance of the electronic component or ordering of a new electronic component, and transmit the notification information to the terminal devices T1 and T2.

When the failure determiner 440 determines whether or not the suppression of the operation of the battery replacement device 230 is necessary, the notification information output 450 transmits a control command according to a determination result of the failure determiner 440 to the battery replacement device 230. The battery replacement device 230 to which the control command has been transmitted executes control according to the control command by the control board 273 and the fan control board 256.

In the above-described embodiment, some or all of the functions of the second information acquirer 410, the failure determiner 440, and the notification information output 450 in the management server device 400 may be provided in the station control device 210 or the battery replacement device 230 in the battery replacement station 200. These functions may be distributed and provided in some or all of, for example, the management server device 400, the station control device 210, and the battery replacement device 230.

The embodiment described above can be represented as follows.

An information processing device including:
a storage device storing a program; and
a hardware processor,
wherein the hardware processor executes the program stored in the storage device to:
acquire an air temperature of a power device including a power storage accommodated in a housing and a wind generation unit that supports a flow of air inside and outside of the housing;
acquire an operation amount of the wind generation unit; and
execute at least one determination process among an abnormal change determination process of determining an abnormal change occurred in a flow path along which air in the wind generation unit or the housing flows, a deviation determination process of determining the presence or absence of deviation in a relationship between the air temperature and the operation amount, and a suppression determination process of determining necessity of suppression of an operation of the power device on the basis of a previously obtained relationship between the air temperature and an operation amount when the power device is in use, an acquired air temperature, and an acquired operation amount.

Third Embodiment

Next, a third embodiment will be described. As compared with the first embodiment, in a battery sharing service system of the third embodiment, configurations of the battery replacement device 230 (FIG. 19) and the management server device 500 (FIG. 20) are mainly different. Hereinafter, a battery sharing service of the third embodiment will be described focusing on the differences from the first embodiment. In the following description, the description of members and functions identical to those of the first embodiment may be omitted by assigning the same reference signs thereto.

Figure 19:
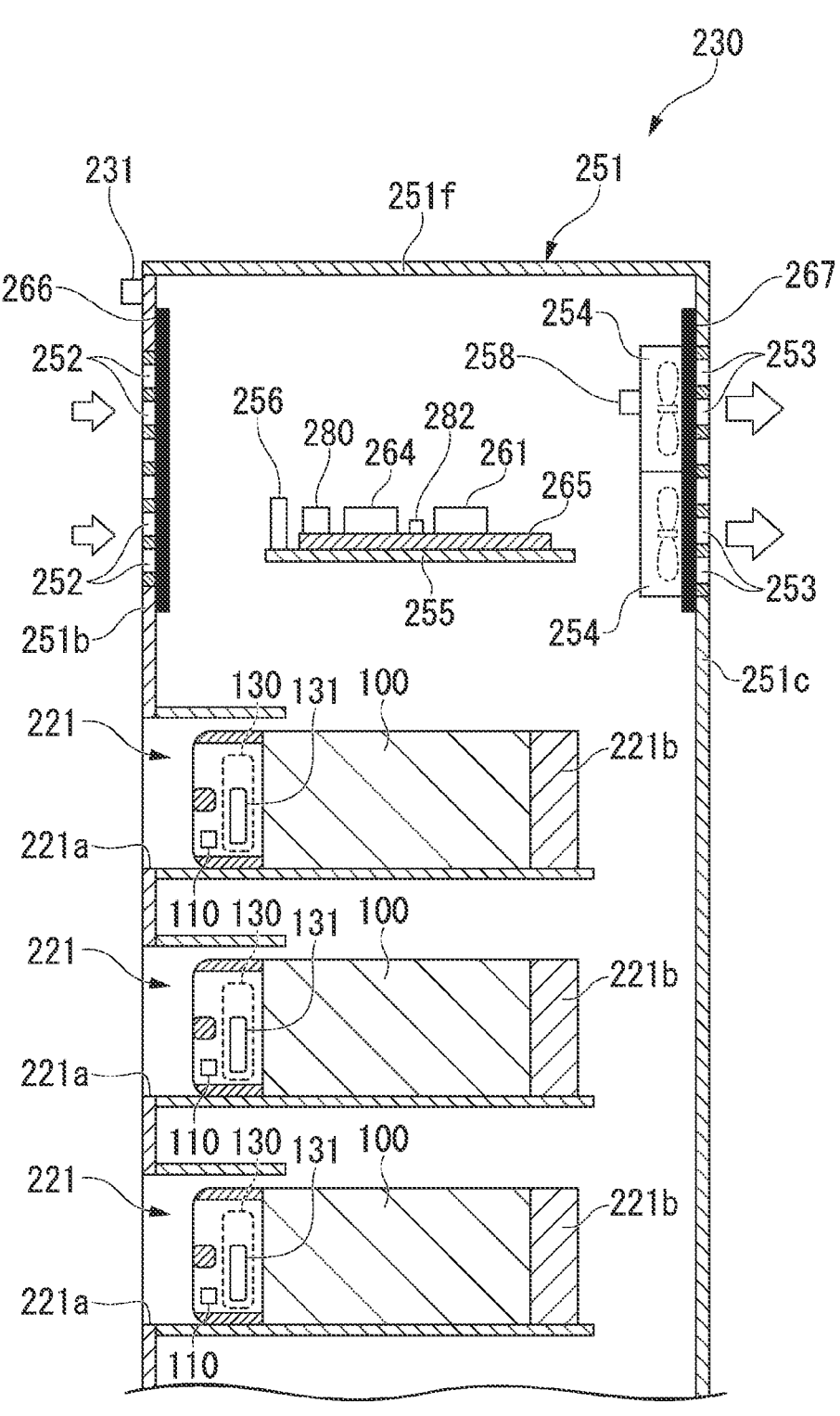
FIG. 19 is a cross-sectional view showing an example of a battery replacement device 230 of a third embodiment.

The battery replacement device 230 of the third embodiment will be described. FIG. 19 is a cross-sectional view showing an example of the battery replacement device 230 of the third embodiment. Unlike the battery replacement device 220 of the first embodiment, the battery replacement device 230 of the third embodiment includes an external temperature sensor 231, a fan control board 256, a power detector 258, a charging power detector 280, and a number-of-replacements counter 282.

The external temperature sensor 231 is, for example, provided above a filter 266 at an upper part of a front wall 251*b* outside of a housing 251. The external temperature sensor 231 detects an air temperature (hereinafter referred to as an external temperature) outside of the housing 251. The external temperature sensor 231 is arranged at a position closer to an intake port 252 than an exhaust port 253. The air temperature (external temperature) of the housing (power device) is an example of "a second correlation amount related to the operation amount of the power device."

On an intake side of the housing 251, because there is no relatively high heat air exhausted from the housing 251, the temperature of the external air can be accurately detected. The external temperature sensor 231 is provided outside of the housing 251, but may be provided at other positions. The external temperature sensor 231 may be provided inside of the housing 251. The external temperature sensor 231 may be provided below the filter 266 or on a rear wall 251*c*. The external temperature sensor 231 outputs the detected external temperature information to a station control device 210.

As in the first embodiment, the battery replacement device 230 includes a detachable battery 100 attached to the battery replacement device 230. The detachable battery 100 includes a power storage 120. The battery replacement device 230 includes a battery slot 221 that detachably accommodates the detachable battery 100. The detachable battery 100 is an example of a "power storage device." The detachable battery 100 of the third embodiment is detachable from the battery replacement device 230, but may be attached to the battery replacement device 230 in a non-detachable way. The battery slot 221 accommodates the detachable battery, such that the housing 251 accommodates the power storage 120.

The battery replacement device 230 includes a fan control board 256 that controls the fan 254 in addition to the fan 254 as in the first embodiment. The fan 254 supports the flow of air inside and outside of the housing 251. The fan 254 includes a motor and blades. The fan 254 is driven in accordance with the control of the fan control board 256. The fan 254 is an example of a "wind generation unit" and a "cooling fan."

The fan control board 256 rotates the blades to operate the fan 254 by driving the motor of the fan 254 while the battery replacement device 230 is in use. The fan control board 256 drives and controls the fan 254 on the basis of, for example, the external temperature detected by the external temperature sensor 231 and the temperature inside of the battery replacement device 230 (hereinafter referred to as an internal temperature) estimated by the temperature estimator 330 of the management server device 500. The fan control board 256 is provided independently of the control board 273, but may be provided as a part of the control board 273.

The internal temperature may be a temperature other than the temperature estimated by the temperature estimator 330, for example, a temperature detected by an internal temperature sensor that detects the temperature inside of the battery replacement device 230. The internal temperature sensor may detect the air temperature inside of the battery replacement device 230, may detect the temperature of a component provided inside of the battery replacement device 230, or may be a temperature calculated on the basis of these temperatures.

The power detector 258 is attached to the fan 254 (the wiring between the I/F board 272 (FIG. 6) and the fan 254). The power detector 258 includes, for example, a current sensor and a voltage sensor. The current sensor of the power detector 258 measures a current of the fan 254 and the voltage sensor detects a voltage of the fan 254. The power detector 258 detects the power consumption of the fan 254 on the basis of the measured current and voltage of the fan 254. The power consumption detected by the power detector 258 is power consumed by driving (operating) the fan 254 (hereinafter referred to as fan operating power). The power detector 258 outputs information of the detected power consumption of the fan 254 to the station control device 210. The power consumption of the fan 254 is an example of a "first correlation amount related to the operation amount of the wind generation unit." The fan 254 is an example of a "power device" and power consumption is an example of an "operation amount." The operation amount may be something other than power consumption according to the type of power device and the like. For example, the operation amount may be a charging/discharging amount (a charging/discharging time or charging/discharging power) or a replacement frequency when the power device is a detachable battery 100 and may be a fan operation amount (an operation time or operating power) when the power device is the fan 254. The power detector 258 is an example of a "first correlation amount detector." An amount of power consumption indicating the power consumption of the fan 254 detected by the power detector 258 is an example of an "observed amount" and an example of a "first observed amount." When the power device is the fan 254, the fan operation amount is an example of a "second observed amount." The observed amount is obtained in an observation (detection) process from among the operation amount of the power device and the environmental information of the power device.

The charging power detector 280 detects the charging power for the plurality of detachable batteries 100 accommodated in the battery slot 221. The charging power detector 280 outputs the detected charging power information to the station control device 210. The charging power detector 280 may detect the charging power in any unit. For example, the charging power detector 280 may collectively detect charging power for all detachable batteries 100 accommodated in the battery slot 221 or may detect charging power for each battery slot 221 that is accommodated. The charging power is an example of a "second correlation amount related to the operation amount of the power device."

The number-of-replacements counter 282 measures the number of times the detachable battery 100 accommodated in the battery slot 221 has been replaced (the number of replacements). The number-of-replacements counter 282 outputs information of the measured number of replacements to the fan control board 256. The number-of-replacements counter 282 may measure the number of replacements of the detachable battery 100 in any unit. For example, the number-of-replacements counter 282 may collectively measure the number of replacements of the detachable battery 100 in all battery slots 221 or may measure the number of replacements of the detachable battery 100 for each battery slot 221.

The fan control board 256 calculates the number of replacements (hereinafter referred to as a replacement frequency) of the detachable battery 100 per unit time on the basis of output information of the number of replacements. The fan control board 256 outputs information of the calculated replacement frequency of the detachable battery 100 to the station control device 210. The replacement frequency of the detachable battery 100 is an example of a "second correlation amount related to the operation amount of the power device."

The station control device 210 transmits information of an external temperature, power consumption, charging power, and a replacement frequency output by the external temperature sensor 231, the power detector 258, the charging power detector 280, and the fan control board 256 to the management server device 500 through the information output 214. The battery replacement device 230 is an example of a "power device." The information output 214 is an example of a "transmitter."

As in the first embodiment, an intake port 252 that takes in air into the housing 251 is open on the front wall 251b of the housing 251 in the battery replacement device 230 and an exhaust port 253 that exhausts the air from the inside of the housing 251 is open on the rear wall 251c. A space between the intake port 252 and the exhaust port 253 within the housing 251 is a flow path along which air flows. The filter 266 is provided in the intake port 252 of the housing 251. The filter 266 purifies the air flowing into the housing 251. The filter 266 is an example of a "purification device."

Although a fan 254 is provided as a cooling device for cooling the battery replacement device 230 in the present embodiment, a cooling device for cooling the battery replacement device 230 may be provided in place of or in addition to the fan 254. As the cooling device, for example, a heat exchanger such as another air-cooled device or a water-cooled radiator may be used. Alternatively, a heating device such as a heater that heats the battery replacement device 230 may be provided in the battery replacement device 230 in consideration of a case where the battery replacement device 230 is installed in a cold region and the like.

Figure 20:
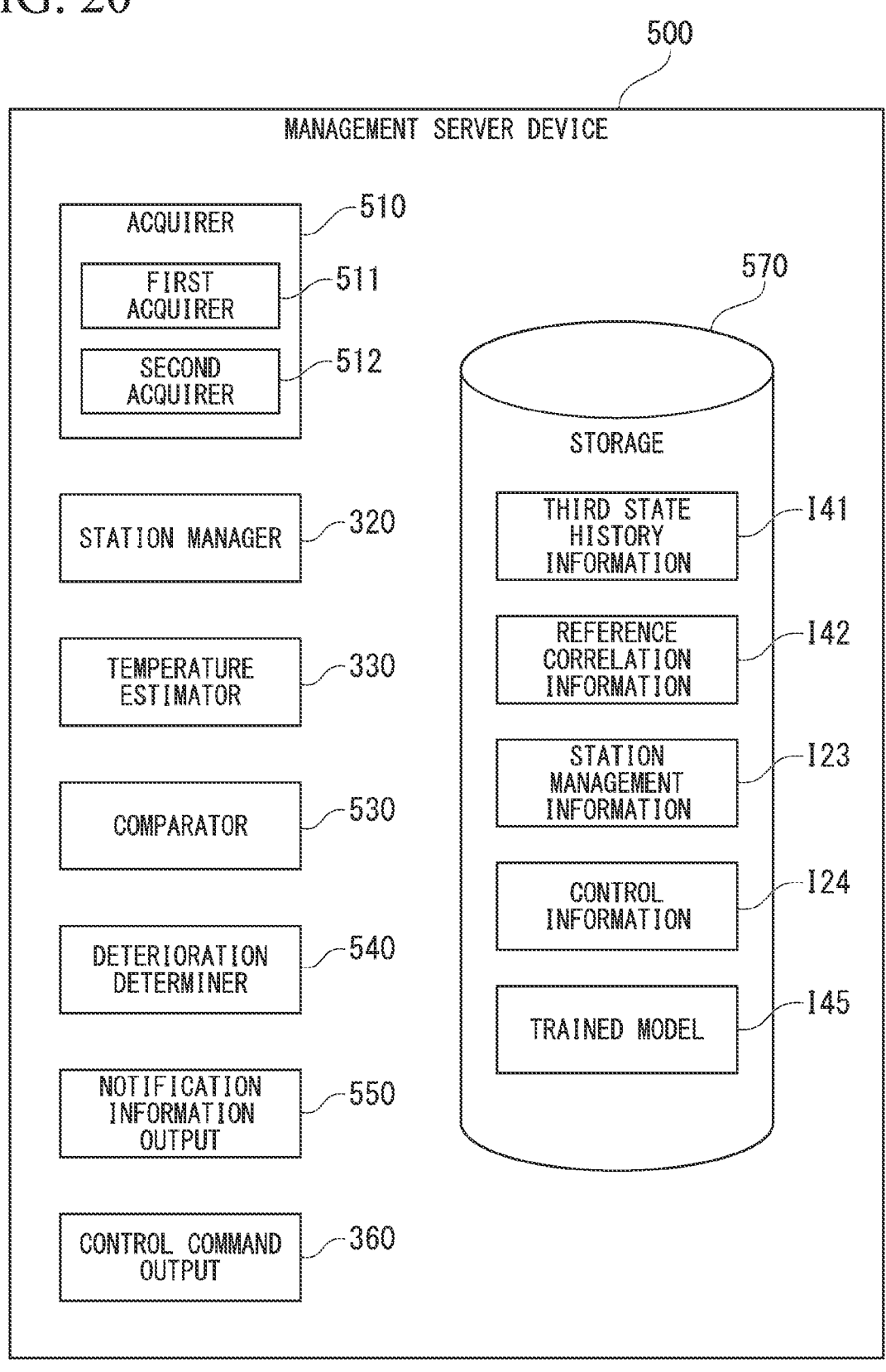
FIG. 20 is a block diagram showing an example of a system configuration of a management server device 500 of the third embodiment.

Next, the management server device 500 of the third embodiment will be described. FIG. 20 is a block diagram showing an example of a system configuration of the management server device 500 of the third embodiment. The management server device 500 of the third embodiment includes, for example, an acquirer 510, a station manager 320, a temperature estimator 330, a comparator 530, a deterioration determiner 540, a notification information output 550, a control command output 360, and a storage 570. The management server device 500 is an example of an "information processing device."

The management server device 500 is connected to a weather server (not shown) via a network NW (FIG. 1). The management server device 500 receives information transmitted by the weather server, for example, meteorological information. The meteorological information transmitted by the weather server may be transmitted to the management server device 500 via the battery replacement station 200. The meteorological information is an example of a "second correlation amount related to the environmental state of the power device" and is an example of an "observed amount." The environmental state is a state related to a surrounding environment of the battery replacement station 200, and includes, for example, an internal temperature, an external temperature, a component temperature, and the like as well as meteorological information. The observed amount includes states related to the surrounding environment of the battery replacement station 200 as well as meteorological information.

The storage 570 stores, for example, a third state history information I41, reference correlation information I42, station management information I23, control information I24, and a trained model 145. The third state history information I41 includes first correlation information I51 and second correlation information I52. The first correlation information I51 includes, for example, information (hereinafter referred to as first correlation information) of power consumption (hereinafter referred to as a first correlation amount) transmitted by the station control device 210.

The second correlation information I52 includes, for example, information (hereinafter referred to as second correlation information) of a plurality of elements (hereinafter referred to as second correlation amounts) such as an external temperature, charging power, and a battery replacement frequency transmitted by the station control device 210 and meteorological information transmitted by the weather server (not shown). The temperature inside of the battery replacement device 230 may be used in place of or in addition to the temperature outside of the battery replacement device 230.

The reference correlation information I42 includes a relationship between the first correlation amount and the second correlation amount (hereinafter referred to as a reference correlation) during the use of the battery replacement device 230. The reference correlation is, for example, a correlation obtained by performing a machine learning process for the relationship between the first correlation amount and the second correlation amount during the use of the battery replacement device 230. The reference correlation is obtained in advance and stored in the storage 570. The reference correlation is an example of a "prescribed relationship." The storage 570 is an example of a "correlation storage." The storage 570 is an example of a "model storage." The station management information I23 and the control information I24 are similar to those of the first embodiment. As in the second embodiment, machine learning is, for example, unsupervised learning. The machine learning may also be supervised learning instead of unsupervised learning.

The acquirer 510 includes, for example, a first acquirer 511 and a second acquirer 512. The first acquirer 511 acquires first correlation information (observed amount) including power consumption information transmitted from each battery replacement station 200. The first acquirer 511 includes the acquired first correlation information in the third state history information I41 and stores the third state history information in the storage 570.

The second acquirer 512 acquires an external temperature, charging power, a fan replacement frequency, and meteorological information transmitted by the weather server transmitted from each battery replacement station 200 as the second correlation information. The second acquirer 512 includes the acquired second correlation information in the third state history information I41 and stores the third state history information I41 in the storage 570. The acquirer 510 may provide a notification to the deterioration determiner 540 as it is without storing the acquired second correlation amount information in the storage 570. The second correlation information stored in the storage 570 is an example of a reference amount. The reference amount becomes a target to be compared with the observed amount. The reference amount may be, for example, a set of values of observed amounts in the past or a previously obtained value of the first correlation amount.

The comparator 530 compares the first correlation amount and the second correlation amount included in the third state history information I41. The deterioration determiner 540 executes a deviation determination process of determining whether or not there is deviation in a relationship between the first correlation amount and the second correlation amount (hereinafter referred to as a determination correlation) included in the third state history information I41 on the basis of a comparison result of the comparator 530. The deviation of the determination correlation includes, for example, the deviation of the determination correlation from the reference correlation included in the reference correlation information I42 stored in the storage 570. The deterioration determiner 540 is an example of a "determiner."

In place of or in addition to a mode in which the presence or absence of deviation of the determination correlation is detected on the basis of the reference correlation included in the reference correlation information I42, the deterioration determiner 540 may determine the presence or absence of deviation in the determination correlation by inputting the first correlation information and the second correlation information included in the third state history information I41 to the trained model 145 stored in the storage 570.

When the trained model 145 is used, the deterioration determiner 540 determines whether or not there is deviation in the determination correlation on the basis of an input result of inputting the determination correlation included in the third state history information I41 to the trained model 145. The trained model 145 is, for example, a model in which the first correlation information and the second correlation information are input data.

The deterioration determiner 540 determines clogging occurred in the filter 266 on the basis of a result of the deviation determination process. The clogging of the filter 266 is an example of "prescribed deterioration or more in the flow path." When clogging occurs in the filter 266, the cooling capacity of the fan 254 decreases because the air permeability between the inside and outside of the housing 251 decreases. Thus, for example, the deterioration determiner 540 determines that clogging has occurred in the filter 266 when a result of the deviation determination process indicates that the determination correlation deviates from the reference correlation and the first correlation amount (power consumption) for the second correlation amount in the determination correlation is larger than the reference correlation. In accordance with the magnitude of the first correlation amount to the second correlation amount in the determination correlation, a degree of clogging of the filter 266 may be determined.

In addition to the process described in the first embodiment, the notification information output 550 generates second notification information for notifying that the filter 266 has been clogged and requesting action for dealing with the clogged filter 266 when a processing result (determination result) of the deterioration determiner 540 indicates that the filter 266 has been clogged. The second notification information is, for example, information for requesting maintenance, ordering of a component, or the like according to the clogging of the filter 266.

The notification information output 550 transmits the generated second notification information to the terminal device T1 used by the administrator P1 who manages the battery sharing service system 1 and the terminal device T2 used by the security guard P2 in charge of each battery replacement station. The notification information output 550 requests maintenance and ordering of a component from the terminal devices T1 and T2 by transmitting the second notification information. Upon receiving the request, the terminal devices T1 and T2 provide a notification of the second notification information in a screen output process or an audio output process. The notification information output 550 is an example of a "countermeasure executer." The station manager 320, the temperature estimator 330, and the control command output 360 are similar to those of the first embodiment.

When the deterioration determiner 540 determines that the filter 266 has been clogged, the notification information output 550 may generate notification information for requesting a process for eliminating the clogging of the filter 266, for example, the cleaning of the filter 266 or the replacement of the filter 266 and transmit the notification information to the terminal devices T1 and T2. When the deterioration determiner 540 determines the deterioration of an electronic component, the notification information output 550 may generate notification information for requesting a process according to the deterioration of the electronic component, for example, maintenance of the electronic component or ordering of a new electronic component, and transmit the notification information to the terminal devices T1 and T2.

Next, a processing flow of the management server device 500 in the third embodiment will be described.

Figure 21:
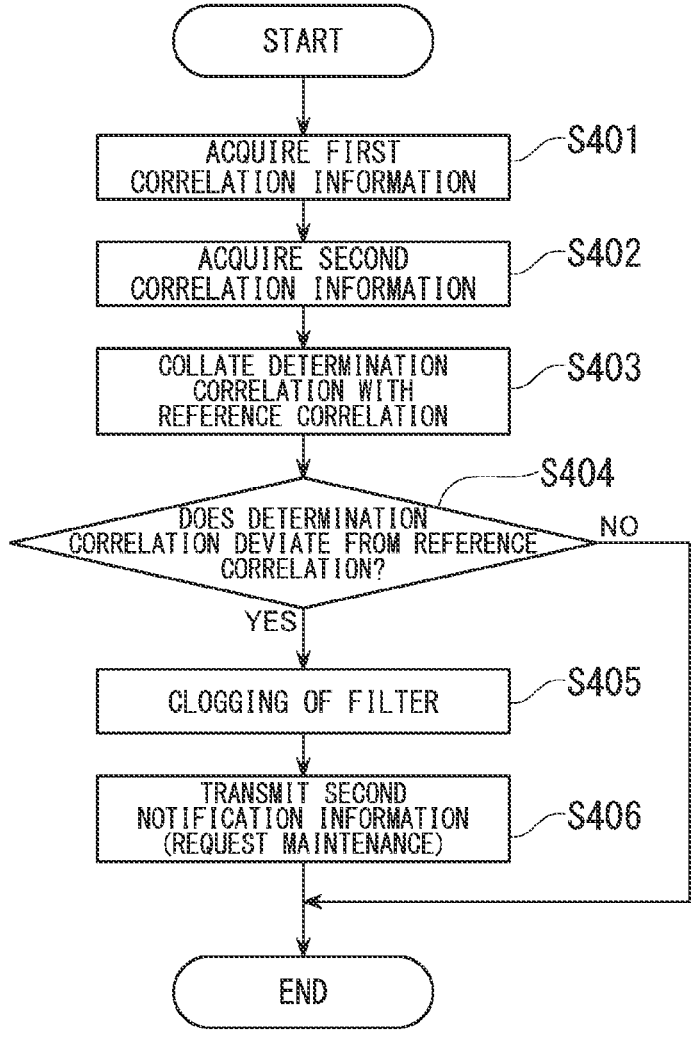
FIG. 21 is a flowchart showing an example of a processing flow of the management server device 500 of the third embodiment.

FIG. 21 is a flowchart showing an example of a processing flow of the management server device 500 of the third embodiment.

When the management server device 500 receives the first correlation information transmitted by the battery replacement station 200, the following flow starts.

The acquirer 510 performs an acquisition process by receiving the first correlation information transmitted by the station control device 210 of the battery replacement station 200 in the first acquirer 511 (S401). The first acquirer 511 includes the acquired first correlation information in the third state history information I41 and stores the third state history information I41 in the storage 570.

In the second acquirer 512, the acquirer 510 receives an external temperature, a charging power amount, and a battery replacement frequency transmitted by the station control device 210 and meteorological information transmitted by the weather server and acquires them as second correlation information (S402). The second acquirer 512 includes the acquired second correlation information in the third state history information I41 and stores the third state history information I41 in the storage 570.

The acquirer 510 acquires the first correlation information acquired in the first acquirer 511 and the second correlation information acquired in the second acquirer 512 at a plurality of different timings with time intervals. The first acquirer 511 and the second acquirer 512 may acquire the first correlation information and the second correlation information at any timing. For example, the first acquirer 511 and the second acquirer 512 may acquire the first correlation information and the second correlation information transmitted in a timely manner at different timings, and the second acquirer 512 may acquire the second correlation information at a timing after the elapse of certain time when the first acquirer 511 has acquired the first correlation information.

Figure 22:
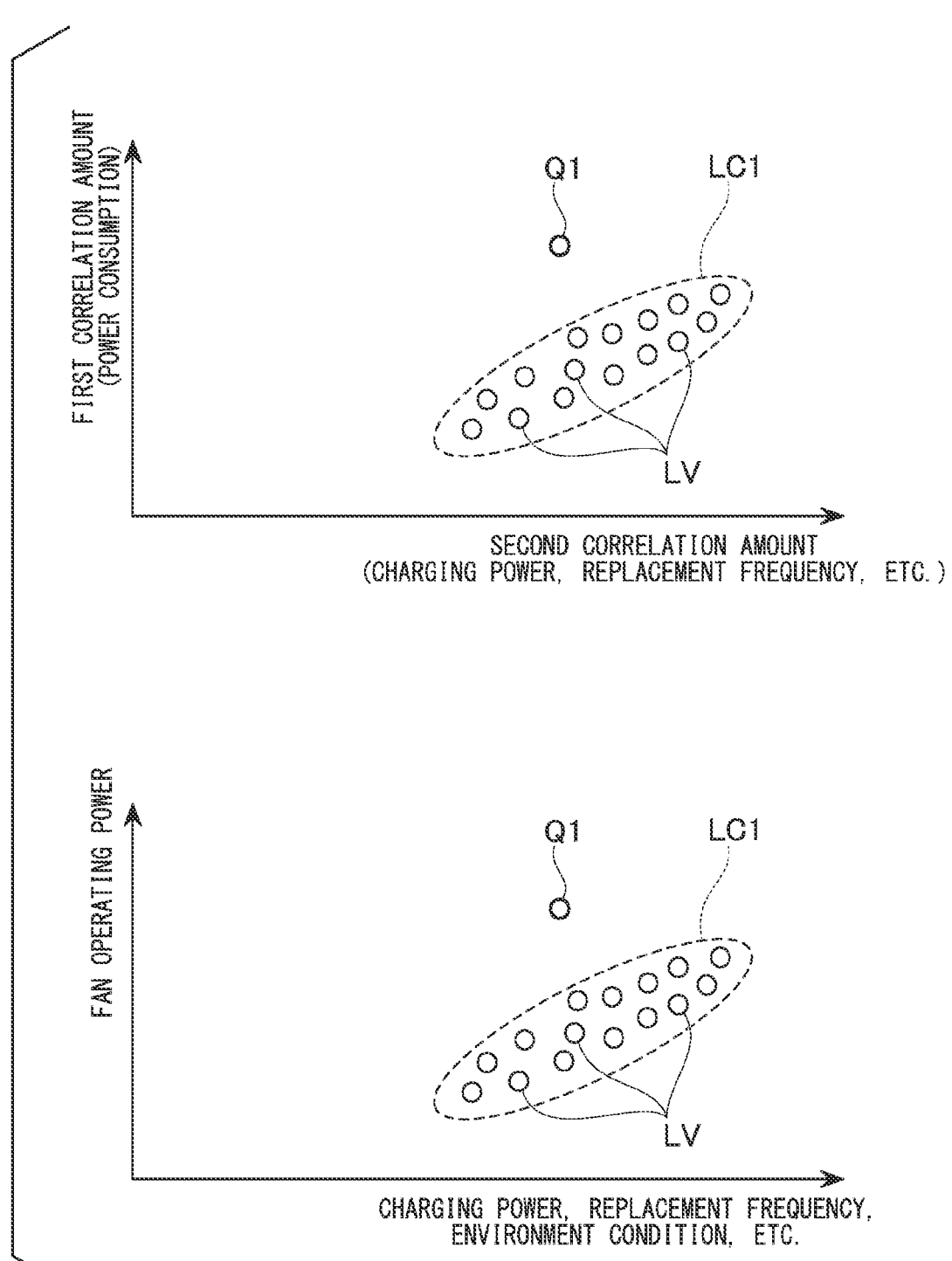
FIG. 22 is a map showing an example of a reference correlation.

The deterioration determiner 540 collates the determination correlation that is the relationship between the first correlation information and the second correlation information included in the third state history information I41 stored in the storage 570 with the reference correlation included in the reference correlation information I42 stored in the storage 570 (S403). The deterioration determiner 540 determines whether or not the determination correlation deviates from the reference correlation (S404). Here, the reference correlation included in the reference correlation information I42 will be described. FIG. 22 is a map showing an example of the reference correlation. In the example of the upper drawing of FIG. 22, the first correlation amount is power consumption and the second correlation amount is charging power, a replacement frequency, or the like. The reference correlation may be set as appropriate. As for the reference correlation, for example, as shown in the lower drawing of FIG. 22, the first correlation amount may be the fan operating power and the second correlation amount may be the charging power, the replacement frequency, the environmental condition, or the like.

The reference correlation included in the reference correlation information I42 includes a learning value group LC1 including a large number of learning values LV of the first correlation amount with respect to the second correlation amount during use of the battery replacement device 230. The deterioration determiner 540 compares the learning value group LC1 with the first correlation amount Q1 of the first correlation information indicated in the determination correlation information included in the third state history information I41. In the example of FIG. 22, the first correlation amount Q1 of the determination correlation information is larger than the first correlation amount for the second correlation amount included in the learning value group LC1 and the first correlation amount Q1 of the determination correlation information deviates from the learning value group LC1. In this case, it is determined that the determination correlation deviates from the reference correlation.

When it is determined that the determination correlation deviates from the reference correlation in step S404, the deterioration determiner 540 determines that the filter 266 has been clogged (S405). When the cooling capacity of the fan 254 decreases, the operation time of the fan 254 becomes relatively long, such that the first correlation amount for the second correlation amount in the determination correlation becomes larger than the reference correlation. Thus, the deterioration determiner 540 determines that an abnormality in which the cooling capacity of the fan 254 decreases has occurred when the first correlation amount for the second correlation amount becomes larger than that in the reference correlation.

The notification information output 550 generates second notification information for requesting maintenance or the like for clogging of the filter 266 determined by the deterioration determiner 540 and transmits the second notification information to the terminal devices T1 and T2 (S406). When it is determined that the determination correlation does not deviate from the reference correlation, the deterioration determiner 540 determines that the filter 266 has not been clogged and the management server device 500 terminates the process shown in FIG. 21.

In the third embodiment, the management server device 500 (information processing device) determines whether or not there is deviation in the determination correlation on the basis of the reference correlation and the previously obtained determination correlation during the use of the battery replacement device 230 (power device). According to such a configuration, the possibility of predicting equipment abnormalities can be increased.

Modified Examples

Although the power consumption of the fan 254 detected by power detector 258 is used as the first correlation amount and the relationship with the second correlation amount is used as the determination correlation in the third embodiment, the first correlation amount may also use the operation time of the fan 254 (hereinafter referred to as a "fan operation time") in place of or in addition to the power consumption of the fan 254 as another element related to the operation amount of the fan 254. The operation time of the fan 254 may be a total amount of operation time or an operation time per unit time.

Although the power consumption of the fan 254 is exemplified as the first correlation amount in the third embodiment, the first correlation amount may be another element related to the operation amount of the fan 254, for example, an operation time of the fan 254 (hereinafter referred to as a fan operation time). The operation time of the fan 254 may be a total amount of operation time or an operation time per unit time. Although charging power, a replacement frequency, a temperature outside of the housing (power device), and meteorological information are exemplified as the second correlation amount, the second correlation amount may be a part thereof or another element related to the operation amount of the power device or the environmental state of the power device.

In this case, the fan control board 256 sets the operation time of the fan 254 per unit time on the basis of, for example, the external temperature detected by the external temperature sensor 231. The fan control board 256 adjusts the fan operation time hereinafter on the basis of the internal temperature estimated by the temperature estimator 330 while the fan 254 is operating. For example, when the fan 254 rotates, the internal temperature decreases and approaches the external temperature. As the internal temperature decreases, the fan control board 256 gradually decreases the operation time of the fan 254. When a degree of decrease in the internal temperature is low, the amount of decrease in the operation time of the fan 254 is reduced.

The fan control board 256 operates the fan 254 intermittently. The fan operation time here is the operation time of the fan 254 per unit time. Therefore, for example, when the fan 254 is operated with constant motive power, the cooling capacity of the battery replacement device 230 due to the operation of the fan 254 increases as the fan operation time increases.

The fan control board 256 terminates control for rotating the fan 254 when the internal temperature drops to a prescribed cooling completion temperature. The cooling completion temperature may be a constant temperature or a temperature adjusted in accordance with an external temperature or the like. The fan control board 256 measures and detects a period of time in which the fan 254 is operating. The information output 214 outputs information of the fan operation time detected by the fan control board 256 to the station control device 210.

The fan control board 256 may be configured to transmit information during an operation indicating that the fan 254 is operating to the management server device 300 as information about an operation and measure the fan operation time period in accordance with a period of time in which the management server device 300 is receiving the information during the operation. The fan operation time is an example of an "operation amount."

Although the deterioration determiner 540 determines the clogging of the filter 266 based on the deviation determination process and the deviation determination process for determining whether or not there is deviation related to the determination target relationship in the third embodiment, the deterioration determiner 540 may determine an abnormal change that has occurred in the flow path of the housing 251 in place of or in addition to these processes. The deterioration determiner 540 may execute a process of determining the occurrence of another abnormal change in the flow path of the fan 254 or the housing 251.

The deterioration determiner 540 may determine, for example, an abnormality of the fan 254 as an abnormal change in the flow path of the fan 254 or the housing 251. Examples of the failure of the fan 254 in this case include a failure in which the cooling capacity is reduced due to the loss of the blades of the fan 254 or the deterioration of the motor.

The deterioration determiner 540 may determine the deterioration of, for example, an electric component accommodated in the housing 251 and disposed in the flow path, for example, the electric circuit or the DC/DC converter 271, as another abnormal change in the flow path of the fan 254 or the housing 251. For example, when a component such as the DC/DC converter 271 deteriorates, even if the air temperature within the housing 251 is the same, the temperature rise increases as compared with the electric component that has not deteriorated. Thus, an abnormal change in an electric component is an abnormality accompanied by heat generation.

When an abnormality occurs in these electric components, the first correlation amount for the second correlation amount in the determination correlation becomes larger than that in the reference correlation. Thus, for example, when the first correlation amount for the second correlation amount in the determination correlation becomes greater than that in the reference correlation, the deterioration determiner 540 determines that an abnormality, which causes the electric component to deteriorate, has occurred. The deterioration degree of the electric component may be determined in accordance with a magnitude of the first correlation amount for the second correlation amount in the determination correlation.

The management server device 500 may include a necessity determiner that determines the necessity of suppressing the operation of the battery replacement device 230 in place of or in addition to the deterioration determiner 540 that determines an abnormal change that has occurred in the flow path of the fan 254 or the housing 251. For example, the necessity determiner may determine whether or not the determination target relationship deviates from the second relationship and may determine to suppress the operation of the battery replacement device 230 when the determination target relationship deviates from the second relationship. The suppression of the operation of the battery replacement device 230 may be, for example, the blockage of the operation of the battery replacement device 230 or the reduction of the operation amount of the battery replacement device 230.

The blockage of the operation of the battery replacement device 230 may be, for example, the blockage of charging and discharging the detachable battery 100 via the battery slot 221. The suppression of the operation of the battery replacement device 230 may be, for example, the reduction in the number of battery slots 221 where the detachable battery 100 can be charged and discharged or the reduction in the available charging/discharging time period.

When the second notification information is transmitted, the notification information output 550 may collectively transmit a station ID of the battery replacement station 200 provided with the battery replacement device 230 in which the fan 254 has failed, geographical location information, and information for performing maintenance work (maintenance information). The notification information output 550 may generate, for example, an image representing information, particularly geographical location information, and transmit the image together with the second notification information.

When the deterioration determiner 540 determines whether or not the suppression of the operation of the battery replacement device 230 is necessary, the notification information output 550 transmits a control command according to a determination result of the deterioration determiner 540 to the battery replacement device 230. The battery replacement device 230 to which the control command is transmitted executes a control process according to the control command through the control board 273 and the fan control board 256.

In the above-described embodiment, some or all of the functions of the acquirer 510, the deterioration determiner 540, and the notification information output 550 in the management server device 500 may be provided in the station control device 210 or the battery replacement device 230 in the battery replacement station 200. These functions may be distributed and provided in, for example, some or all of the management server device 500, the station control device 210, and the battery replacement device 230.

The embodiment described above can be represented as follows.

An information processing device including:
a storage device storing a program; and
a hardware processor,
wherein the hardware processor executes the program stored in the storage device to:
acquire first correlation information of a first correlation amount related to an operation amount of a wind generation unit in a power device including a power storage accommodated in a housing and the wind generation unit that supports a flow of air inside and outside of the housing;

acquire second correlation information of a second correlation amount related to at least one of an operation amount of the power device or an environmental state of the power device; and execute at least one determination process among an abnormal change determination process of determining an abnormal change occurred in a flow path along which air flows in the wind generation unit or the housing, a deviation determination process of determining the presence or absence of deviation in a relationship between the first correlation amount and the second correlation amount, and a suppression determination process of determining necessity of suppression of an operation of the power device on the basis of previously obtained correlation relationship information including the relationship between the first correlation amount and the second correlation amount while the power device is in use, the first correlation information, and the second correlation information.

Fourth Embodiment

Next, a fourth embodiment will be described. As compared with the first embodiment, in a battery sharing service system of the fourth embodiment, the configurations of a battery replacement device 240 (FIGS. 23 and 24) and a management server device 700 (FIG. 25) are mainly different. Hereinafter, the battery sharing service of the fourth embodiment will be described focusing on differences from the first embodiment. In the following description, the description of members and functions identical to those of the first embodiment may be omitted by assigning the same reference signs thereto.

Figure 23:
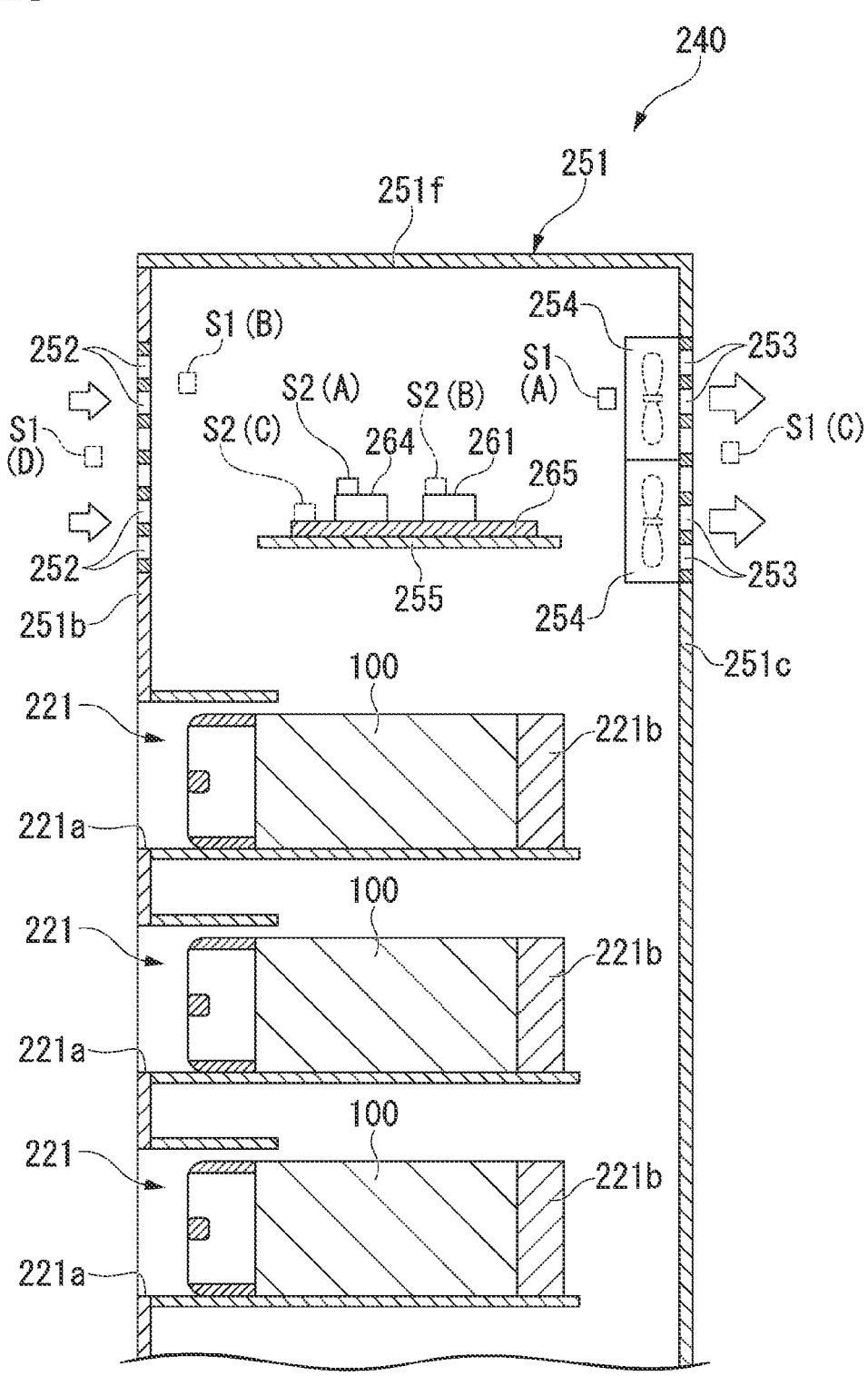
FIG. 23 is a cross-sectional view showing an example of a battery replacement device 220 of a fourth embodiment.

FIG. 23 is a cross-sectional view showing a part of the battery replacement device 240 of the fourth embodiment. The battery replacement device 240 includes an air temperature sensor S1 and a component temperature sensor S2. The air temperature sensor S1 and the component temperature sensor S2 are provided, for example, inside of the housing 251.

The air temperature sensor S1 is a temperature sensor that measures an air temperature that is a temperature related to air inside of the housing 251 (hereinafter simply referred to as an "air temperature"). The "temperature related to air inside of the housing 251" is not limited to the air temperature inside of the housing 251 itself, but may be a temperature related to the air temperature inside of the housing 251 (a temperature that can be used to estimate the air temperature inside of the housing 251 or a temperature proportional to the air temperature inside of the housing 251). An example of such a temperature is an air temperature outside of the housing 251 (for example, an air temperature outside of the housing 251 measured near the intake port 252 or the exhaust port 253), a temperature of the housing 251 itself, or the like. According to a certain viewpoint, the "air temperature" is the temperature (for example, the temperature proportional to the external temperature) affected by the temperature outside of the housing 251 (a room temperature of a space where the battery replacement station 200 is installed, an external air temperature, or an environmental temperature).

In the present embodiment, the air temperature sensor S1 is disposed inside of the housing 251 closer to the exhaust port 253 than the intake port 252 (see position A in FIG. 23). Furthermore, the air temperature sensor S1 is disposed closer to the exhaust port 253 than a heat generation component accommodated inside of the housing 251 (an AC/DC converter 260, a DC/DC converter 271, a detachable battery 100, or the like). According to another viewpoint, the "air temperature" is a temperature of air (for example, the temperature proportional to the heat generation state) to which a part of heat generation of the heat generation component (the AC/DC converter 260, the DC/DC converter 271, the detachable battery 100, or the like) accommodated inside of the housing 251 is transmitted. The measurement result of the air temperature sensor S1 is output to a control board 273.

However, the position of the air temperature sensor S1 is not limited to the above-described example. The air temperature sensor S1 can be disposed near the intake port 252 inside of the housing 251 (see position B in FIG. 23) or can be disposed outside of the housing 251 near the intake port 252 or the exhaust port 253 as described above (see positions C and D in FIG. 23). Two or more air temperature sensors S1 may be provided. In this case, the air temperature may be an average value of the temperatures measured by two or more air temperature sensors S1 or the highest temperature among temperatures measured by two or more air temperature sensors S1 may be adopted.

On the other hand, the component temperature sensor S2 is a temperature sensor that measures a component temperature (a power converter temperature, hereinafter simply referred to as a "component temperature") that is a temperature related to the AC/DC converter 260 (electric component). A "temperature related to an electric component" is not limited to the temperature of the electric component itself, but may be a temperature related to the temperature of the electric component (a temperature that can be used to estimate the temperature of an electric component or a temperature proportional to the temperature of an electric component). An example of such a temperature is an air temperature in the vicinity of the electric component, a temperature of a heat dissipating component to which the electric component is attached, or the like.

In the present embodiment, the component temperature sensor S2 is attached to the capacitor 264 of the AC/DC converter 260 and measures the temperature of the capacitor 264 (see position A in FIG. 23). Alternatively, the component temperature sensor S2 may be attached to a component such as an FET 261, a thyristor 262, and a feedback diode 263 or may be attached to a substrate 265 (see positions B and C in FIG. 23). When the substrate 265 is a metallic plate or the like, a temperature of a component included in the AC/DC converter 260 can be accurately measured by measuring the temperature of the substrate 265. A measurement result of the component temperature sensor S2 is output to the control board 273.

However, the position of the component temperature sensor S2 is not limited to the above-described examples. Instead of being directly attached to the AC/DC converter 260, the component temperature sensor S2 may be disposed at a distance from the AC/DC converter 260 so that the air temperature in the vicinity of the AC/DC converter 260 is measured as described above or may be attached to a heat dissipation component attached to the AC/DC converter 260. Two or more component temperature sensors S2 may be provided. In this case, the component temperature sensor S2 may be attached to each of the capacitor 264, another component (for example, the FET 261) having a higher heat resistance temperature and a higher temperature than the capacitor 264, and the like. In this case, the component temperature may be an average value of the temperatures measured by two or more component temperature sensors S2 or may be a temperature derived from another viewpoint.

Alternatively, a determination process related to deterioration to be described below may be performed for two or more component temperatures measured by the two or more component temperature sensors S2.

[4.2 System Configuration of Battery Replacement Station]

Next, a system configuration of the battery replacement station 200 will be described.

Figure 24:
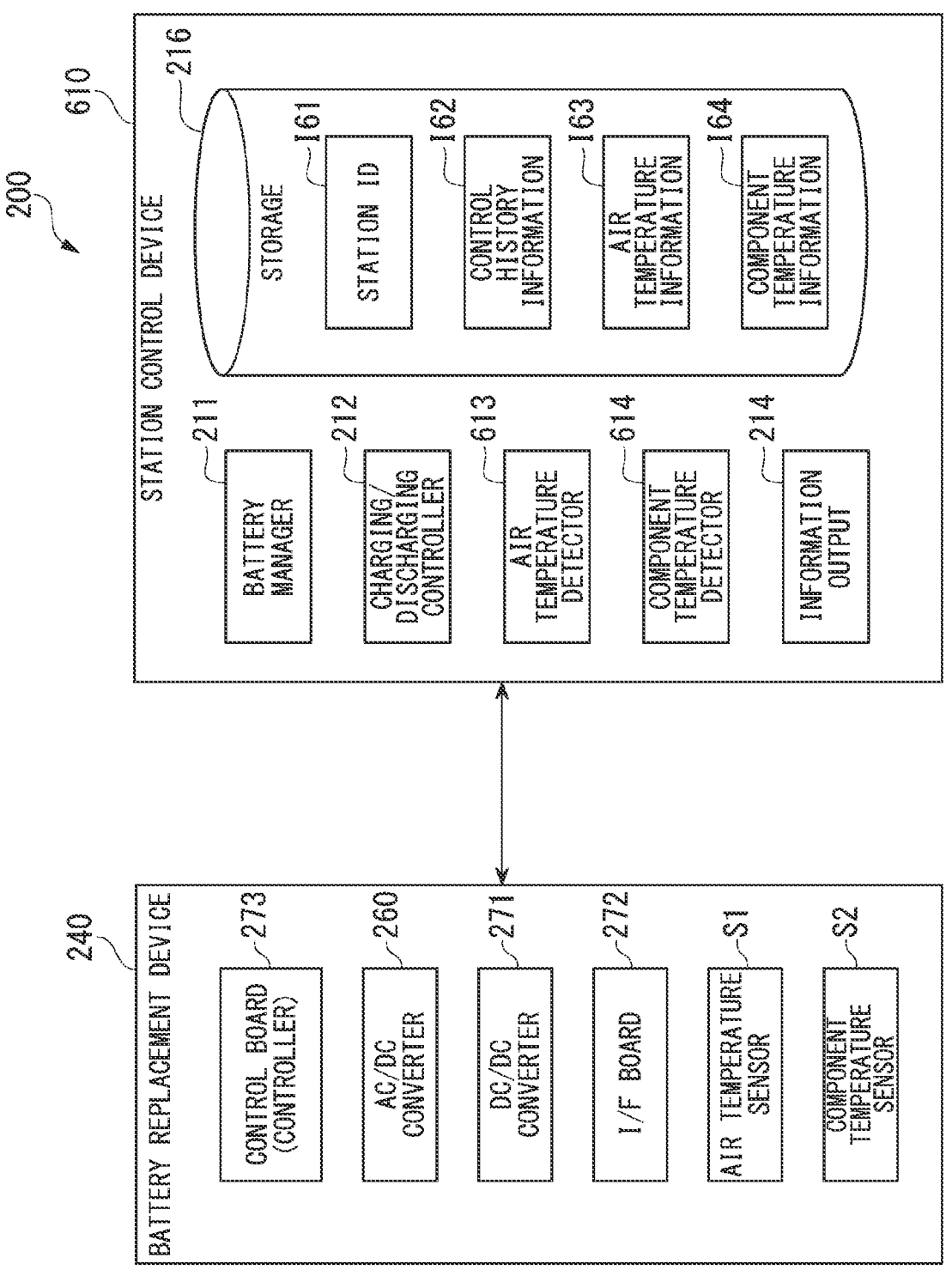
FIG. 24 is a block diagram showing an example of a system configuration of a battery replacement station 200 of the fourth embodiment.

FIG. 24 is a block diagram showing a system configuration of the battery replacement station 200 of the fourth embodiment. In the present embodiment, the station control device 610 includes, for example, a battery manager 211, a charging/discharging controller 212, an air temperature detector 613, a component temperature detector 614, an information output 214, and a storage 216.

Each of the battery manager 211, the charging/discharging controller 212, the air temperature detector 613, the component temperature detector 614, and the information output 214 is implemented, for example, by a hardware processor such as a CPU executing a program (software). Some or all of these components may be implemented by hardware (including a circuit; circuitry) such as an LSI circuit, an ASIC, an FPGA, or a GPU or may be implemented by software and hardware in cooperation. Some or all of functions of these components may be implemented by a dedicated LSI circuit. The program may be pre-stored in a storage device (a storage device including a non-transitory storage medium) such as an HDD or a flash memory provided in the station control device 610 or may be stored in a removable storage medium (the non-transitory storage medium) such as a DVD or a CD-ROM and installed in the HDD or the flash memory provided in the station control device 610 when the storage medium is mounted in a drive device provided in the station control device 610. The storage 216 is implemented by one of storage devices such as an HDD, a flash memory, and a RAM or a combination thereof.

The battery manager 211 manages a plurality of detachable batteries 100 accommodated in a plurality of battery slots 221. For example, the battery manager 211 receives the detachable battery 100 from a user of the electric vehicle 10, determines whether or not the detachable battery 100 needs to be charged/discharged, and manages the provision of the detachable battery 100 that has been completely charged to the user of the electric vehicle 10.

The charging/discharging controller 212 controls the charging/discharging of the detachable battery 100 whose charging is determined to be necessary through the battery manager 211. For example, the charging/discharging controller 212 charges and discharges the detachable battery 100 by controlling the AC/DC converter 260, the DC/DC converter 271, and the like included in the battery replacement device 240. The charging/discharging controller 212 causes the storage 216 to store a control history related to the charging/discharging of the detachable battery 100 as control history information I62. The control history information I62 includes, for example, a charging start time and a charging end time of each detachable battery 100, and information in which the number of detachable batteries 100 during simultaneous charging and date and time information are associated.

The air temperature detector 613 detects an air temperature on the basis of a measurement result of the air temperature sensor S1. For example, when a measurement result of the air temperature sensor S1 does not directly include the air temperature inside of the housing 251, the air temperature detector 613 may estimate the air temperature inside of the housing 251 on the basis of the measurement result of the air temperature sensor S1, a relational expression or a calculation table obtained in advance, or the like. The air temperature detector 613 associates the detected air temperature with the date and time information and causes the storage 216 to store an association result as air temperature information I63. However, as described above, the air temperature outside of the housing 251 may be used as it is without performing the above-described calculation.

The component temperature detector 614 detects the component temperature on the basis of the measurement result of the component temperature sensor S2. For example, when the measurement result of the component temperature sensor S2 does not directly include the component temperature of the AC/DC converter 260, the component temperature detector 614 may estimate a component temperature of the AC/DC converter 260 on the basis of the measurement result of the component temperature sensor S2, a relational expression or a calculation table obtained in advance, or the like. The component temperature detector 614 associates the detected component temperature with the date and time information and causes the storage 216 to store an association result as component temperature information I64. However, as described above, as the component temperature, the temperature in the vicinity of the AC/DC converter 260 may be used as it is in a state in which the calculation is not performed as described above.

The information output 214 transmits state information of the battery replacement station 200 including the control history information I62, the air temperature information I63, and the component temperature information I64 stored in the storage 216 to the management server device 700 at prescribed intervals. The prescribed interval is, for example, 10 minutes, but is not limited to the above-described example. The state information is associated with a station ID 161 stored in the storage 216 and transmitted to the management server device 700. The station ID 161 is identification information for identifying the battery replacement station 200.

[5. Management Server Device]

Next, the management server device 700 will be described in detail.

FIG. 25 is a block diagram showing a system configuration of the management server device 700 of the fourth embodiment. The management server device 700 includes, for example, an information acquirer 310, a station manager 320, a deterioration determiner 730, a deterioration predictor 740, a notification information output 350, a control command output 360, and a storage 370.

Each of the information acquirer 310, the station manager 320, the comparator 720, the deterioration determiner 730, the deterioration predictor 740, the notification information output 350, and the control command output 360 is implemented, for example, by a hardware processor such as a CPU executing a program (software). Some or all of these components may be implemented by hardware (including a circuit; circuitry) such as an LSI circuit, an ASIC, an FPGA, or a GPU or may be implemented by software and hardware in cooperation. Some or all of functions of these components may be implemented by a dedicated LSI circuit. The program may be pre-stored in a storage device (a storage device including a non-transitory storage medium) such as an HDD or a flash memory provided in the management server device 700 or may be stored in a removable storage medium (the non-transitory storage medium) such as a DVD or a CD-ROM and installed in the HDD or the flash memory provided in the management server device 700 when the storage medium is mounted in a drive device provided in the management server device 700. The storage 370 is implemented by one of storage devices such as an HDD, a flash memory, and a RAM or a combination thereof.

The information acquirer 310 acquires state information transmitted from each battery replacement station 200. For example, the information acquirer 310 acquires the control history information I62, the air temperature information I63, and the component temperature information I64 transmitted from each battery replacement station 200. In the present specification, "acquisition" includes a case where information is internally generated (for example, a case where information is generated by performing prescribed calculation on externally received information) in addition to a case where information is externally received and acquired. The information acquirer 310 stores the state information acquired from each battery replacement station 200 as state history information I71 in the storage 370. The information acquirer 310 is an example of an "acquirer."

The station manager 320 manages each battery replacement station 200 on the basis of the state information acquired from each battery replacement station 200. For example, the station manager 320 manages the operating state of each battery replacement station 200, the number of detachable batteries 100 received by each battery replacement station 200, the number of detachable batteries 100 provided from each battery replacement station 200, and the like.

In the present embodiment, the comparator 720 compares previously obtained information including the relationship between the air temperature and the component temperature during the operation of the AC/DC converter 260 with the air temperature and the component temperature acquired by the information acquirer 310. The deterioration determiner 730 determines the deterioration of the AC/DC converter 260 on the basis of the comparison result of the comparator 720. In the present embodiment, the deterioration determiner 730 determines whether or not prescribed deterioration or more has occurred in the AC/DC converter 260. Hereinafter, this content will be described in detail. The deterioration determiner 730 is an example of a "determiner" and an example of a "processor." The prescribed deterioration or more in the AC/DC converter 260 is an example of "an abnormal change in an electric operation unit."

FIG. 26 is a diagram for describing a determination process of the deterioration determiner 730 of the fourth embodiment. In the figure, "♦" indicates a change in a component temperature when six detachable batteries 100 have been charged simultaneously in the battery replacement device 240 and indicates a change in a component temperature when no deterioration has occurred in the AC/DC converter 260. In FIG. 26, "x" indicates a change in a component temperature when two detachable batteries 100 have been charged simultaneously in the battery replacement device 240 and indicates a change in a component temperature when no deterioration has occurred in the AC/DC converter 260. In the figure, "Δ" indicates a change in a component temperature when six detachable batteries 100 have been charged simultaneously in the battery replacement device 240 and indicates a change in a component temperature when prescribed deterioration or more has occurred in the AC/DC converter 260. In the figure, a mark "■" indicates the change in air temperature. The above-described "♦," "x," and "Δ" indicate component temperatures when the same air temperature has been measured.

As shown in FIG. 26, for example, when no prescribed deterioration or more has occurred in AC/DC converter 260 in a case where charging is completed, the component temperature gradually decreases after time t2 under the condition that the measured air temperature is the same. On the other hand, if prescribed deterioration or more occurs in the AC/DC converter 260, when the measured air temperature is the same, the temperature of the AC/DC converter 260 increases and the temperature rise increases even if time t2 is past. Thus, for example, the deterioration determiner 730 can compare a maximum value of the component temperature at normal times (in a non-deterioration state) when the same air temperature has been measured with a maximum value of the component temperature acquired by the information acquirer 310 and can determine that there is prescribed deterioration or more in the AC/DC converter 260 when a difference between the maximum values of these component temperatures is greater than or equal to a prescribed value.

Meanwhile, as shown in FIG. 26, the maximum value of the measured component temperature differs according to the number of detachable batteries 100, which are simultaneously charged. Thus, the deterioration determiner 730 can perform a determination process related to deterioration with higher accuracy by making determination in consideration of the number of detachable batteries 100, which are simultaneously charged.

Hereinafter, an example of a specific process of the deterioration determiner 730 will be described. The deterioration determiner 730 determines whether or not prescribed deterioration or more has occurred in the AC/DC converter 260 (for example, the capacitor 264) on the basis of the relationship information I72 stored in advance in the storage 370 and the air temperature and component temperature acquired by the information acquirer 310.

FIG. 27 is a diagram showing an example of the relationship information I72. The relationship information I72 is previously obtained information including a relationship (for example, correlation) between the air temperature and the component temperature during the operation of the AC/DC converter 260 (electric component). The relationship information I72 according to the present embodiment includes the relationship (for example, correlation) between the air temperature and the maximum value of the component temperature during an operation of the AC/DC converter 260 in a non-deterioration state. The relationship information I72 according to the present embodiment includes a relationship (for example, correlation) between the air temperature and the component temperature according to the number of detachable batteries 100 in which the AC/DC converter 260 simultaneously supplies charging power.

In the example shown in FIG. 27, for each number of detachable batteries 100 that are simultaneously charged, the maximum value of the component temperature at normal times and a threshold value for determining deterioration (a difference value for the maximum value of the component temperature at normal times) are registered. For example, "Tc11max" in the figure indicates a maximum value of the component temperature at normal times (non-deterioration times) when the number of detachable batteries 100, which are simultaneously charged, is 1 and the measured air temperature is "Ta1 [° C.]." Likewise, "Tc12 max" in the figure indicates a maximum value of the component temperature at normal times (non-deterioration times) when the number of detachable batteries 100, which are simultaneously charged, is one, and the measured air temperature is "Ta2 [° C.]." "Tc13max" in the figure indicates a maximum value of the component temperature at normal times (non-deterioration times) when the number of detachable batteries 100, which are simultaneously charged, is one and the measured air temperature is "Ta3 [° C.]." Ta1, Ta2, and Ta3 are temperatures different from each other, for example, Ta3>Ta2>Ta1. In this case, a relationship of Tc13max>Tc12max>Tc11max is established.

"Tth1" in the figure is a threshold value for determining deterioration when the number of detachable batteries 100, which are simultaneously charged, is one. Tth1 is used in combination with each of Tc11max, Tc12max, and Tc13max, which are the maximum values of the component temperature at normal times. For example, when the air temperature acquired by the information acquirer 310 is "Ta1 [° C.]," the deterioration determiner 730 determines that prescribed deterioration or more has occurred in the AC/DC converter 260 in accordance with the maximum value of the component temperature acquired by the information acquirer 310 greater than or equal to a total value (Tc11max+Tth1) of Tc11max and Tth1.

On the other hand, when the air temperature acquired by the information acquirer 310 is "Ta1 [° C.]," the deterioration determiner 730 determines that prescribed deterioration or more has not occurred in the AC/DC converter 260 in accordance with the maximum value of the component temperature acquired by the information acquirer 310 less than the total value (Tc11max+Tth1) of Tc11max and Tth1. In the present embodiment, Tth1 is commonly set for Tc11max, Tc12max, and Tc13max, but different values may be set for Tc11max, Tc12max, and Tc13max. This is true for the other threshold values (Tth2, Tth3, and the like) as well.

Likewise, "Tc21max" in the figure indicates the maximum value of the component temperature at normal (non-deterioration) times when the number of detachable batteries 100, which are simultaneously charged, is two and the measured air temperature is "Ta1 [° C.]." "Tc22max" in the figure indicates the maximum value of the component temperature at normal times (non-deterioration times) when the number of detachable batteries 100, which are simultaneously charged, is two and the measured air temperature is "Ta2 [° C.]." These definitions are true for other component temperatures as well. In the example shown in FIG. 27, a relationship between Tc21max>Tc11max is established and a relationship between Tc22max>Tc12max is established. These relationships are true for other component temperatures as well.

"Tth2" in the figure is a threshold value for determining deterioration when the number of detachable batteries 100, which are simultaneously charged, is two. Tth2 is used in combination with Tc21max, Tc22max, and Tc23max, which are the maximum values of the component temperature at normal times. These definitions are true for other threshold values as well. In the example shown in FIG. 27, relationships between Tth3>Tth2>Tth1 are established. These relationships are true for other threshold values as well.

FIG. 28 is a diagram showing relationship information I72A that is another example of relationship information I72. The relationship information I72A serves as previously obtained information including the relationship (for example, correlation) between the air temperature and the component temperature during the operation of the AC/DC converter 260 (electric component) and directly includes a relationship between the air temperature and the threshold value for deterioration determination (the threshold value related to the component temperature) during an operation of the AC/DC converter 260 instead of the relationship between the air temperature and the maximum value of the component temperature during an operation of the AC/DC converter 260 of the non-deterioration state. Such information also corresponds to "previously obtained information including the relationship between the air temperature and the component temperature during the operation of the electric component" mentioned in the present specification.

In the example shown in FIG. 28, the relationship between the air temperature and the threshold value for deterioration determination is included for each number of detachable batteries 100 that are simultaneously charged. In the example shown in FIG. 28, the threshold value for deterioration determination is an absolute value of the component temperature instead of a difference value for the maximum value of the component temperature as shown in FIG. 27. For example, "Tth11" in the figure is a threshold value for deterioration determination when the number of detachable batteries 100, which are simultaneously charged, is one and the measured air temperature is "Ta1 [° C.]." When the air temperature acquired by the information acquirer 310 is "Ta1 [° C.]," the deterioration determiner 730 determines that prescribed deterioration or more has occurred in the AC/DC converter 260 in accordance with the maximum value of the component temperature acquired by the information acquirer 310 greater than or equal to Tth11. On the other hand, when the air temperature acquired by the information acquirer 310 is "Ta1 [° C.]," the deterioration determiner 730 determines that prescribed deterioration or more has not occurred in the AC/DC converter 260 in accordance with the maximum value of the component temperature acquired by the information acquirer 310 less than Tth11.

Likewise, "Tth12" in the figure is a threshold value for deterioration determination when the number of detachable batteries 100, which are simultaneously charged, is one and the measured air temperature is "Ta2 [° C.]." "Tth13" in the figure is a threshold value for deterioration determination when the number of detachable batteries 100, which are simultaneously charged, is one and the measured air temperature is "Ta3 [° C.]." Here, in the case of Ta3>Ta2>Ta1, relationships between Tth13>Tth12>Tth11 are established.

Likewise, "Tth21" in the figure is a threshold value for deterioration determination when the number of detachable batteries 100, which are simultaneously charged, is two and the measured air temperature is "Ta1 [° C.]." "Tth22" in the figure is a threshold value for deterioration determination when the number of detachable batteries 100, which are simultaneously charged, is two and the measured air temperature is "Ta2 [° C.]." These definitions are true for other threshold values as well. In the example shown in FIG. 28, a relationship between Tth21>Tth11 is established and a relationship between Tth22>Tth12 is established. These relationships are true for other component temperatures as well.

As described above, the deterioration determiner 730 of the present embodiment makes the determination related to the deterioration of the AC/DC converter 260 on the basis of a temperature difference between the maximum value of the component temperature obtained from the relationship information I72 according to the air temperature acquired by the information acquirer 310 and the component temperature acquired by the information acquirer 310 (for example, the maximum value of the component temperature acquired by the information acquirer 310).

Although an example in which the deterioration determiner 730 makes determination on the basis of table information such as relationship information I72 (or relationship information I72A) has been described above, the present invention is not limited to the above-described example. For example, the deterioration determiner 730 may make determination using a calculation formula obtained in regression analysis or may make determination using a trained model (for example, a neural network) obtained in machine learning. The trained model obtained in machine learning is an example of "previously obtained information including the relationship between the air temperature and the component temperature during an operation of an electric component."

In the present embodiment, the deterioration determiner 730 makes the above-described determination when the AC/DC converter 260 supplies charging power to two or more detachable batteries 100. According to such a configuration, because the temperature change of the AC/DC converter 260 increases, the possibility of erroneous determination can be reduced.

In the present embodiment, the deterioration determiner 730 makes the above-described determination when the AC/DC converter 260 supplies charging power to all detachable batteries 100 capable of being charged simultaneously among the plurality of detachable batteries 100 accommodated in the battery replacement device 240. According to such a configuration, because the temperature change of the AC/DC converter 260 is maximized, the possibility of erroneous determination can be further reduced.

When the deterioration determiner 730 determines that prescribed deterioration or more has occurred, the deterioration predictor 740 predicts the speed of subsequent deterioration progress. For example, the deterioration predictor 740 may calculate a rate of deterioration progress on the basis of a time series of the change in the maximum value of the component temperature obtained from the state history information I71 (for example, the change in the maximum value of the component temperature at the same air temperature) and may calculate the time when the AC/DC converter 260 reaches a more serious deterioration level (i.e., the time when the deterioration degree exceeds a prescribed threshold value, for example, the time when the failure can actually occur) on the basis of the calculated rate of deterioration progress. Alternatively, when the deterioration determiner 730 determines that prescribed deterioration or more has not occurred, the deterioration predictor 740 may calculate the time when the prescribed deterioration or more occurs in the AC/DC converter 260 (i.e., the time when the deterioration degree exceeds a prescribed threshold value) on the basis of the rate of deterioration progress calculated as described above.

Also, the deterioration predictor 740 may calculate the rate of deterioration progress on the basis of a charging frequency (the number of times of charging in a prescribed period) in each battery replacement station 200 or the like on the basis of the control history information I62 of each battery replacement station 200 in place of/in addition to the time series of a change in the maximum value of the component temperature.

The notification information output 350 generates prescribed monitoring information on the basis of the state information acquired by the information acquirer 310 and the station management information I73 stored in the storage 370 and transmits the generated monitoring information to the terminal device T1 used by the administrator P1 of the battery sharing service system 1. The monitoring information is information used for monitoring each battery replacement station 200, for example, information including a station ID and a location (installation location) of each battery replacement station 200, changes in the air temperature and the component temperature measured by each battery replacement station 200, and the like. Thereby, the administrator P1 can remotely monitor changes in the air temperature and the component temperature measured by each battery replacement station 200.

Furthermore, when the deterioration determiner 730 determines that prescribed deterioration or more has occurred, the notification information output 350 generates prescribed notification information including a warning label on the basis of the station management information I73. The notification information output 350 transmits the generated notification information to the terminal device T2 used by the security guard P2 in charge of the terminal device T1 and each battery replacement station 200. Thereby, the terminal devices T1 and T2 provide a notification of notification information in a screen output process or an audio output process. The notification information output 350 is another example of a "processor" and is also an example of an "output."

The notification information is information used for maintenance or servicing of the battery replacement station 200, for example, a station ID and a location (installation location) of the battery replacement station 200, the time when the security guard P2 or maintenance personnel should visit the battery replacement station 200, the number of maintenance personnel necessary to repair or replace the battery replacement station 200, the types and number of electric components to be carried, and the like. Furthermore, the notification information includes information used for manufacturing, distribution, or storage of electric components (for example, AC/DC converters) (for example, the required number of electric components to be manufactured, the number of deliveries, the manufacturing time, the storage count, the storage time, and the like). Information for generating the notification information is registered in the storage 370 in advance as a part of the station management information I73. Furthermore, the notification information may include the remaining time until the AC/DC converter 260 reaches a more serious deterioration level (i.e., the remaining time until the deterioration degree exceeds a prescribed threshold value, for example, the remaining time until the failure can actually occur) predicted by the deterioration predictor 740 as information indicating a degree of urgency.

When the deterioration determiner 730 determines that prescribed deterioration or more has occurred, the control command output 360 generates a control command to change the operating state of the battery replacement station 200 and transmits the generated control command to the target battery replacement station 200. The above-described control command is a command for reducing the operating state of the AC/DC converter 260 whose prescribed deterioration or more is determined to have occurred. The command for reducing the operating state of the AC/DC converter 260 is, for example, a command for reducing an amount of current flowing through the AC/DC converter 260, and is, for example, a command to impose a restriction on the number of detachable batteries 100 to be simultaneously charged or the like (only up to 4 detachable batteries 100 are allowed to be simultaneously charged even if there are 8 battery slots 221). Such a control command can be generated on the basis of the control information I74 stored in advance in the storage 370. Thereby, the time until the failure actually occurs in the battery replacement station 200 can be extended. Also, the command for reducing the operating state of the AC/DC converter 260 may be a command for blocking the use of a part or all of the battery replacement device 240. The control command output 360 is another example of a "processor."

Furthermore, the control command output 360 may change the content of the above-described control command in accordance with the remaining time until the AC/DC converter 260 reaches a more serious deterioration level predicted by the deterioration predictor 740 (for example, the remaining time until the failure can actually occur). For example, when the remaining period of time until the AC/DC converter 260 reaches a more serious deterioration level is shorter than a prescribed period of time, a control command for significantly reducing the operating state of the AC/DC converter 260 may be generated.

[6. Processing Flow]

Next, a processing flow related to deterioration determination will be described.

FIG. 29 is a flowchart showing an example of a processing flow related to the deterioration determination of the fourth embodiment. When charging of the detachable battery 100 is started, the deterioration determiner 730 starts the following processing flow.

First, the deterioration determiner 730 identifies the number of detachable batteries 100, which are simultaneously charged, on the basis of the control history information I62 acquired from the battery replacement station 200 (S501).

Subsequently, the deterioration determiner 730 determines whether or not the number identified in S501 is the maximum number of detachable batteries 100 that can be simultaneously charged by the battery replacement device 240 (8 in the example of the present embodiment) (S502). When the number identified in S501 is the maximum number of detachable batteries 100 that can be simultaneously charged by the battery replacement device 240 (S502: YES), the process proceeds to S504.

On the other hand, when the number identified in S501 is not the maximum number of detachable batteries 100 that can be simultaneously charged by the battery replacement device 240 (S502: NO), the deterioration determiner 730 determines whether or not the deterioration determination in a number greater than the number identified in S501 was made within a prescribed period in the past (for example, within 1 week) (S503). For example, when the number identified in S501 is four, the deterioration determiner 730 determines whether or not the deterioration determination in a state in which five or more detachable batteries 100 were simultaneously charged was made within the prescribed period in the past. In the case of YES in S503, the deterioration determiner 730 terminates the processing flow without performing any special processing.

In the case of NO in S503, the deterioration determiner 730 makes the above-described deterioration determination. That is, the deterioration determiner 730 determines whether or not the prescribed deterioration or more has occurred in the AC/DC converter 260 on the basis of the relationship information I72 (or relationship information I72A) stored in the storage 370 and the air temperature and component temperature acquired by the information acquirer 310 (S504).

Also, when the prescribed deterioration or more has not occurred in the AC/DC converter 260 (S504: NO), the notification information output 350 and the control command output 360 terminate the processing flow without performing any special processing. On the other hand, when the prescribed deterioration or more has occurred in the AC/DC converter 260 (S504: YES), the notification information output 350 generates the above-described notification information and transmits the generated notification information to the terminal devices T1 and T2 (S505). Furthermore, the control command output 360 outputs a control command for reducing the operating state of the AC/DC converter 260 (S106). Thereby, the series of processing steps ends.

[7. Advantages]

In the present embodiment, the information processing device (for example, the management server device 700) includes the information acquirer 310 configured to acquire an air temperature and a component temperature; and a processor (for example, the deterioration determiner 730, the notification information output 350, and the control command output 360) configured to perform at least one of a process of making determination related to deterioration of an electric component, a process of outputting a notification indicating that the deterioration has occurred in the electric component, and a process of outputting a command for reducing an operating state of the electric component on the basis of previously obtained information indicating a relationship between an air temperature and a component temperature during an operation of the electric component (for example, the AC/DC converter 260) and the air temperature and the component temperature acquired by the information acquirer 310. According to such a configuration, deterioration can be detected before a failure actually occurs, and the occurrence of a failure related to the power device (for example, the battery replacement station 200) can be suppressed.

For example, in the battery sharing service system, when remote monitoring of the battery replacement device 240 is performed, there may be a significant influence because the service is forced to be stopped or restricted and the component delivery is time-consuming if the AC/DC converter 260 fails. Thus, it is possible to take countermeasures such as holding inventory components in preparation for a case where a failure is detected. However, components are expensive and performance may deteriorate due to long-term storage (excess inventory). On the other hand, according to the above configuration, because the difference between the air temperature and the component temperature increases in accordance with the deterioration of the electric component, the deterioration can be detected before a failure occurs. Thereby, it is possible to provide components quickly and it is possible to suppress restrictions on services.

Fifth Embodiment

Next, a fifth embodiment will be described. The fifth embodiment is different from the fourth embodiment in that the deterioration degree of the electric component is calculated. A configuration other than that described below is similar to that of the fourth embodiment.

FIG. 30 is a block diagram showing a system configuration of a management server device 700A of the fifth embodiment. The management server device 700A includes, for example, a deterioration determiner 730A and a deterioration predictor 740A instead of the deterioration determiner 730 and the deterioration predictor 740 of the fourth embodiment. The deterioration determiner 730A is an example of a "processor." The storage 370 stores deterioration degree determination information I75.

In the present embodiment, the deterioration determiner 730A determines a deterioration degree of the AC/DC converter 260 (a degree of deterioration progress) on the basis of previously obtained information (for example, relationship information I72) including the relationship between the air temperature and the component temperature during an operation of the AC/DC converter 260 and the air temperature and the component temperature acquired by the information acquirer 310. For example, the deterioration determiner 730A determines a deterioration degree of the AC/DC converter 260 at any time on the basis of a temperature difference between the maximum value of the component temperature at normal times (in a non-deterioration state) obtained from the relationship information I72 and the maximum value of the component temperature most recently acquired by the information acquirer 310 in accordance with the air temperature acquired by the information acquirer 310.

In a specific example, the deterioration determiner 730A calculates a temperature difference ΔT between the maximum value of the component temperature of the AC/DC converter 260 at normal times (in a non-deterioration state) when the air temperature is the same and the maximum value of the component temperature most recently acquired by the information acquirer 310 on the basis of the relationship information I72 (see FIG. 27) and the air temperature and the component temperature acquired by the information acquirer 310. Also, the temperature difference ΔT is calculated, for example, according to the number of detachable batteries 100, which are simultaneously charged. Also, the deterioration determiner 730A determines the deterioration degree of the AC/DC converter 260 on the basis of a magnitude of the temperature difference ΔT.

FIG. 31 is a diagram showing an example of the deterioration degree determination information I75. The deterioration degree determination information I75 is registered by associating the magnitude of the temperature difference ΔT and the deterioration degree of the AC/DC converter 260. For example, the temperature difference ΔT1 (for example, the temperature difference ΔT is 1° C.) and the deterioration degree "2" are associated. The temperature difference ΔT2 (for example, the temperature difference ΔT is 2° C.) and the deterioration degree "4" are associated. The deterioration degree "4" indicates a state in which deterioration of more than the deterioration degree "2" has progressed. Hereinafter, the same is true for the temperature difference ΔT3, ΔT4, and the like.

The deterioration predictor 740A calculates the time when the deterioration of the AC/DC converter 260 reaches prescribed deterioration or more (for example, deterioration of the deterioration degree "10") (i.e., the time when the deterioration degree is greater than a prescribed threshold value) on the basis of the deterioration degree determined by the deterioration determiner 730A (for example, a time series of the change in the deterioration degree determined by the deterioration determiner 730A at any time).

Also, in addition to the deterioration degree determined by the deterioration determiner 730A, the deterioration predictor 740A may calculate the time when the deterioration of the AC/DC converter 260 reaches the above-described prescribed deterioration or more on the basis of a charging frequency (the number of times of charging in a prescribed period) at each battery replacement station 200 obtained from the control history information I62 of each battery replacement station 200.

In the present embodiment described above, as in the fourth embodiment, deterioration can be detected before a failure actually occurs and the occurrence of a failure related to the power device can be suppressed.

Sixth Embodiment

Next, a sixth embodiment will be described. The sixth embodiment is different from the fourth embodiment in that determination related to the deterioration of the electric component is made only on the basis of the component temperature without using the air temperature. The configuration other than that described below is similar to that of the fourth embodiment.

FIG. 32 is a block diagram showing a system configuration of a management server device 700B of the sixth embodiment. The management server device 700B includes, for example, a deterioration determiner 730B, instead of the deterioration determiner 730 of the fourth embodiment. The deterioration determiner 730B is an example of a "processor." A storage 370 stores component temperature reference information I82.

In the present embodiment, the deterioration determiner 730B makes determination related to deterioration of the AC/DC converter 260 on the basis of information including a maximum value of a component temperature during an operation in the past of the AC/DC converter 260 (for example, component temperature reference information I82 to be described below) and a component temperature most recently acquired by the information acquirer 310.

FIG. 33 is a diagram showing an example of the component temperature reference information I82. The component temperature reference information I82 includes the maximum value of the component temperature during an operation in the past (non-deterioration state) of the AC/DC converter 260 for each number of detachable batteries 100 to which the AC/DC converter 260 simultaneously supplies charging power.

In the example shown in FIG. 33, for each number of detachable batteries 100 that are simultaneously charged, a maximum value of the component temperature at normal times (in a non-deterioration state) and a threshold value for determining deterioration (a difference value for the maximum value of the component temperature at normal times) are registered. For example, "Tc1max" in the figure indicates the maximum value of the component temperature at normal times (non-deterioration times) when the number of detachable batteries 100, which are simultaneously charged, is one. Likewise, "Tc2 max" in the figure indicates the maximum value of the component temperature at normal times (non-deterioration times) when the number of detachable batteries 100, which are simultaneously charged, is two. These definitions are true for other component temperatures as well. In the example shown in FIG. 33, a relationship between Tc2max>Tc1max is established. This relationship is true for other component temperatures as well.

"Tth1'" in the figure is a threshold value for determining deterioration when the number of detachable batteries 100, which are simultaneously charged, is one. Tth1' is used in combination with Tc1max, which is a maximum value of the component temperature at normal times. For example, when the number of detachable batteries 100, which are simultaneously charged, is one, the deterioration determiner 730 determines that prescribed deterioration or more has occurred in the AC/DC converter 260 in accordance with the maximum value of the component temperature acquired by the information acquirer 310 greater than or equal to a total value (Tc11max+Tth1') of Tc11max and Tth1'. "Tth2'" in the figure is a threshold value for determining deterioration when the number of detachable batteries 100, which are simultaneously charged, is two. Tth2' is used in combination with Tc2max, which is the maximum value of the component temperature at normal times. These definitions are true for other threshold values as well. In the example shown in FIG. 33, a relationship between Tth2'>Tth1' is established. This relationship is true for other threshold values as well.

Also, instead of the above-described example, like the deterioration determiner 730B of the fifth embodiment, the deterioration determiner 730B may determine a deterioration degree of the AC/DC converter 260 at any time on the basis of a temperature difference between a maximum value of the component temperature included in the component temperature reference information I82 and a maximum value of the component temperature acquired by the information acquirer 310.

In the present embodiment described above, deterioration can be detected before a failure actually occurs, and the occurrence of a failure related to the power device can be suppressed.

Seventh Embodiment

Next, a seventh embodiment will be described. The seventh embodiment is different from the fourth embodiment in that determination related to an abnormal change occurred in a filter 266, for example, clogging of the filter 266, is made along with the deterioration of an electric component. The configuration other than that described below is similar to that of the fourth embodiment.

FIG. 34 is a block diagram showing a system configuration of a management server device 700C of the seventh embodiment. The management server device 700C has, for example, an abnormal change determiner 730C instead of the deterioration determiner 730 of the fourth embodiment. The storage 370 stores component temperature reference information I82. The component temperature reference information I82 is similar to, for example, the component temperature reference information I82 of the sixth embodiment shown in FIG. 33.

In the present embodiment, the abnormal change determiner 730C makes determination similar to the determination of deterioration of the AC/DC converter 260 in the deterioration determiner 730 of the fourth embodiment and makes determination related to the abnormal change occurred in the filter 266. As in the fourth embodiment, the abnormal change determiner 730C determines the deterioration of the AC/DC converter 260 on the basis of whether or not the component temperature of the AC/DC converter 260 has increased when time t2 (FIG. 26) is past. Also, the abnormal change determiner 730C determines the abnormal change occurred in the filter 266 on the basis of a degree of decrease when the component temperature of the AC/DC converter 260 decreases after time t2.

FIG. 35 is a diagram for describing a determination process of the abnormal change determiner 730C of the seventh embodiment. In the figure, "◆" indicates a change in the component temperature when six detachable batteries 100 are simultaneously charged in the battery replacement device 240 and indicates a change in the component temperature when deterioration has not occurred in the AC/DC converter 260. In the figure, "Δ" indicates a change in the component temperature when six detachable batteries 100 are simultaneously charged in the battery replacement device 240 and indicates a change in the component temperature when prescribed deterioration or more has occurred in the AC/DC converter 260. In the figure, "○" indicates a change in the component temperature when six detachable batteries 100 are simultaneously charged in the battery replacement device 240 and indicates a change in the component temperature when an abnormal change of the clogging occurs in the filter 266 in a state in which prescribed deterioration or more has not occurred in the AC/DC converter 260. A mark "■" in the figure indicates a change in the air temperature. The above-described "◆," "Δ," and "○" indicate component temperatures when the same air temperature is measured.

As shown in FIG. 35, for example, in a case where charging is terminated at time t2 or the like, when prescribed deterioration or more has not occurred in the AC/DC converter 260, the component temperature gradually decreases after time t2 under a condition that the measured air temperature is the same. At this time, when an abnormal change in clogging has occurred in the filter 266, the component is not cooled and the decreased rate (decreased degree) of the component temperature is lower than when an abnormal change occurs. Thus, the abnormal change determiner 730C determines that there is a difference in a degree to which an abnormal change can be detected when an abnormal change has occurred in the filter 266 and when an abnormal change has not occurred in the filter 266 after the elapse of a certain period of time from, for example, time t2. Therefore, it is possible to determine that there is an abnormal change that has occurred in the filter 266 on the basis of the temperature change when the component temperature decreases after charging is completed or the like.

Next, some modified examples will be described.

First Modified Example

All or some functional portions among the deterioration determiner 730 (or the deterioration determiners 730A and 730B), the deterioration predictor 740 (or the deterioration predictor 740A), the notification information output 350, the control command output 360, and the storage 370 may be provided in the battery replacement station 200 instead of the management server device 700 (the management server devices 700A and 700B). In such a configuration, as in the above-described embodiment, deterioration can be detected before a failure actually occurs and the occurrence of a failure related to the battery replacement station 200 can be suppressed.

Second Modified Example

The above-described embodiment is an example in which the component temperature of the AC/DC converter 260, which is an electric component, is acquired and the deterioration related to the AC/DC converter 260 is determined. Alternatively, the electric component for which the component temperature is acquired and which serves as a deterioration determination target may be a DC/DC converter (for example, the DC/DC converter 271), a DC/AC converter, or an electric component other than a power converter.

Third Modified Example

In the first and second embodiments, determination related to the deterioration of the electric component is made on the basis of a relationship between the air temperature and the component temperature. Here, electric components may include a first component (a component in which a heat resistance temperature is relatively high and an increase in a component temperature due to aging deterioration is relatively small) and a second component (a component in which a heat resistance temperature is relatively low and an increase in a component temperature due to aging deterioration is relatively large). The first component is, for example, an FET 261, a thyristor 262, or a feedback diode 263. The second component is a capacitor 264.

In this case, the information processing device may have the following configuration. That is, the information processing device includes an acquirer configured to acquire a first component temperature that is a temperature related to the above-described first component and a second component temperature that is a temperature related to the above-described second component; and a processor configured to execute at least one process among a process of making determination related to deterioration of the above-described electric component, a process of outputting a notification indicating that the deterioration has occurred in the above-described electric component, and a process of outputting a command for reducing an operating state of the above-described electric component on the basis of information including a previously obtained relationship between the above-described first component temperature and the above-described second component temperature during the operation of the electric component and the above-described first component temperature and the above-described second component temperature acquired by the acquirer.

Although modes for carrying out the present invention have been described above using the embodiments, the present invention is not limited to the embodiments and various modifications and replacements can be applied without departing from the spirit and scope of the present invention.

REFERENCE SIGNS LIST

10 Electric vehicle (moving object)
100 Detachable battery (power storage device)
131 Temperature sensor
200 Battery replacement station
210 Station control device
211 Battery manager
212 Charging/discharging controller
213 Battery temperature detector
214 Information output
220 Battery replacement device (power device and charging device)
251 Housing
252 Intake port
253 Exhaust port
260 AC/DC converter (electric component and power converter)
264 Capacitor
265 Substrate
266, 267 Filter
300, 400, 500 Management server device
310 Information acquirer (acquirer)
320 Station manager
330 Temperature estimator
340 Abnormality determiner
350, 450, 550 Notification information output
360 Control command output
370, 470, 570 Storage
410 Second information acquirer
440 Failure determiner
510 Acquirer
511 First acquirer
512 Second acquirer
540 Deterioration determiner

What is claim is:

1. A temperature estimation device comprising:
an estimator configured to estimate a temperature of a power device to which a power storage device is attached on the basis of a power storage device temperature that is a temperature detected by a temperature detector provided in the power storage device detachably held in the power device,
wherein the power device includes a housing having an accommodation unit configured to accommodate at least a part of the power storage device, and
the estimator estimates an internal temperature inside of the housing on the basis of the power storage device temperature detected by the temperature detector,
wherein the housing includes a plurality of accommodation units configured to respectively accommodate power storage devices, and
the estimator estimates the internal temperature on the basis of the temperature detected by the temperature detector provided in the power storage device that is electrically operating among the power storage devices accommodated in the plurality of accommodation units, and
wherein, when a plurality of power storage devices that are electrically operating are present, the estimator estimates the internal temperature on the basis of a plurality of power storage device temperatures detected by temperature detectors provided in the plurality of power storage devices.

2. The temperature estimation device according to claim 1, wherein the estimator estimates the internal temperature on the basis of an average value of the plurality of power storage device temperatures.

3. The temperature estimation device according to claim 1, wherein the estimator estimates the internal temperature on the basis of a highest power storage device temperature among the plurality of power storage device temperatures.

4. The temperature estimation device according to claim 1, wherein the estimator estimates a temperature of air inside of the housing within the internal temperature inside of the housing.

5. The temperature estimation device according to claim 1,
wherein the power device includes a housing having an accommodation unit configured to accommodate at least a part of the power storage device, and
the estimator estimates an external temperature outside of the housing on the basis of the power storage device temperature detected by the temperature detector.

6. The temperature estimation device according to claim 5,
wherein the housing includes a plurality of accommodation units configured to respectively accommodate power storage devices, and
the estimator estimates the external temperature on the basis of the power storage device temperature detected by the temperature detector provided in the power storage device that is not electrically operating among the power storage devices accommodated in the plurality of accommodation units.

7. The temperature estimation device according to claim 6, wherein the estimator estimates the external temperature on the basis of the power storage device temperature detected by the temperature detector provided in the power storage device in which a prescribed period of time has elapsed from a previous operation end time point among power storage devices that are not electrically operating.

8. The temperature estimation device according to claim 6, wherein, when there is no power storage device that is not electrically operating, the estimator estimates the external temperature on the basis of the power storage device temperature detected by the temperature detector provided in the power storage device having a smallest total operation amount within a prescribed period in a past among the power storage devices that are electrically operating.

9. The temperature estimation device according to claim 1, wherein the estimator further estimates an external temperature outside of the housing of the power device on the basis of the power storage device temperature detected by the temperature detector, and the power device further includes a countermeasure unit configured to determine an abnormal change in the power device or cope with an abnormal change in the power device on the basis of the internal temperature and the external temperature estimated by the estimator.

10. The temperature estimation device according to claim 1, wherein the temperature detector is disposed inside of the power storage device so that the temperature detector is located further inward than an outer edge of the housing in a state in which the power storage device is accommodated in the accommodation unit.

11. The temperature estimation device according to claim 1, wherein the housing includes a connected path configured to connect an inside and an outside of the housing, and the estimator determines that an abnormal change has occurred in the connected path, provides a notification indicating that the abnormal change has occurred in the connected path, or suppresses an operating state of the power device when the internal temperature is greater than or equal to a prescribed temperature or when a difference between the internal temperature and a reference temperature is greater than or equal to a prescribed value.

12. The temperature estimation device according to claim 11, wherein the connected path includes a purification device inside of the housing, and wherein the estimator determines that an abnormal change has occurred in the purification device, provides a notification indicating that the abnormal change has occurred in the purification device, or suppresses an operating state of the power device when the internal temperature is greater than or equal to the prescribed temperature or when the difference between the internal temperature and the reference temperature is greater than or equal to the prescribed value.

13. The temperature estimation device according to claim 11, wherein the estimator estimates the internal temperature on the basis of a temperature detected by the temperature detector provided in the power storage device that is electrically operating.

14. A temperature estimation method comprising steps of:

acquiring a power storage device temperature that is a temperature detected by a temperature detector provided in a power storage device detachably held in a power device; and estimating a temperature of the power device to which the power storage device is attached on the basis of the power storage device temperature, wherein the power device includes a housing having an accommodation unit configured to accommodate at least a part of the power storage device, and wherein the housing includes a plurality of accommodation units configured to respectively accommodate power storage devices, and temperature estimation method further comprising steps of:

estimating an internal temperature inside of the housing on the basis of the power storage device temperature detected by the temperature detector:

estimating the internal temperature on the basis of the temperature detected by the temperature detector provided in the power storage device that is electrically operating among the power storage devices accommodated in the plurality of accommodation units; and wherein, when a plurality of power storage devices that are electrically operating are present, estimating the internal temperature on the basis of a plurality of power storage device temperatures detected by temperature detectors provided in the plurality of power storage devices.

15. A non-transitory computer readable storage medium storing a program for causing a computer to execute the temperature estimation method according to claim 14.

16. A temperature estimation method comprising steps of:

acquiring a power storage device temperature that is a temperature detected by a temperature detector provided in a power storage device detachably held in a power device; and estimating a temperature of the power device to which the power storage device is attached on the basis of the power storage device temperature, wherein the power device includes a housing having an accommodation unit configured to accommodate at least a part of the power storage device, and wherein the power device further includes an operation unit electrically connected to the power storage device, temperature estimation method further comprising steps of:

estimating an internal temperature inside of the housing on the basis of the power storage device temperature detected by the temperature detector; and estimating the internal temperature on the basis of the power storage device temperature detected by the temperature detector when the power storage device is in a charging/discharging state in which the power storage device is discharged with respect to the operation unit or charged by the operation unit.

17. A non-transitory computer readable storage medium storing a program for causing a computer to execute the temperature estimation method according to claim 16.

18. A temperature estimation device comprising:

an estimator configured to estimate a temperature of a power device to which a power storage device is attached on the basis of a power storage device temperature that is a temperature detected by a temperature detector provided in the power storage device detachably held in the power device, wherein the power device includes a housing having an accommodation unit configured to accommodate at least a part of the power storage device, and the estimator estimates an internal temperature inside of the housing on the basis of the power storage device temperature detected by the temperature detector, wherein the power device further includes an operation unit electrically connected to the power storage device, and the estimator estimates the internal temperature on the basis of the power storage device temperature detected by the temperature detector when the power storage device is in a charging/discharging state in which the power storage device is discharged with respect to the operation unit or charged by the operation unit.

\* \* \* \* \*